(12) United States Patent
Anisimovich et al.

(10) Patent No.: US 8,442,810 B2
(45) Date of Patent: May 14, 2013

(54) DEEP MODEL STATISTICS METHOD FOR MACHINE TRANSLATION

(71) Applicants: Maryana Skuratovskaya, Moscow (RU) ABBYY Software Ltd., Nicosia (CY)

(72) Inventors: Konstantin Anisimovich, Moscow (RU); Diar Tuganbaev, Moscow (RU); Vladimir Selegey, Moscow (RU); Konstantin Zuev, Moscow (RU)

(73) Assignee: ABBYY Software Ltd., Nicosia (CY)

( * ) Notice: Subject to any disclaimer, the term of this patent is extended or adjusted under 35 U.S.C. 154(b) by 0 days.

(21) Appl. No.: 13/626,722

(22) Filed: Sep. 25, 2012

(65) Prior Publication Data

US 2013/0024180 A1    Jan. 24, 2013

Related U.S. Application Data

(63) Continuation of application No. 13/407,729, filed on Feb. 28, 2012, now Pat. No. 8,412,513, which is a continuation of application No. 12/388,219, filed on Feb. 18, 2009, now Pat. No. 8,145,473, which is a continuation of application No. 11/548,214, filed on Oct. 10, 2006, now Pat. No. 8,078,450, and a continuation of application No. 11/690,099, filed on Mar. 22, 2007, now abandoned.

(51) Int. Cl.
*G06L 17/28*    (2011.01)

(52) U.S. Cl.
USPC .................... 704/2; 704/277; 704/9; 704/257

(58) Field of Classification Search ............... 704/1–10, 704/277, 251, 255, 257, 270
See application file for complete search history.

(56) References Cited

U.S. PATENT DOCUMENTS

| | | | |
|---|---|---|---|
| 4,706,212 A | 11/1987 | Toma | |
| 5,068,789 A | 11/1991 | Van Vliembergen | |
| 5,128,865 A | 7/1992 | Sadler | |
| 5,146,405 A | 9/1992 | Church | |
| 5,175,684 A | 12/1992 | Chong | |
| 5,268,839 A * | 12/1993 | Kaji | 704/3 |
| 5,386,556 A | 1/1995 | Hedin et al. | |
| 5,418,717 A | 5/1995 | Su et al. | |
| 5,426,583 A | 6/1995 | Uribe-Echebarria Diaz De Mendibil | |
| 5,475,587 A | 12/1995 | Anick et al. | |
| 5,477,451 A | 12/1995 | Brown et al. | |
| 5,490,061 A | 2/1996 | Tolin et al. | |
| 5,497,319 A | 3/1996 | Chong et al. | |
| 5,510,981 A | 4/1996 | Berger et al. | |

(Continued)

OTHER PUBLICATIONS

Mitamura, T., et al. "An Efficient Interlingua Translation System for Multi-lingual Document Production," Proceedings of Machine Translation Summitt III, Washington DC, Jul. 2-4, 1991.

(Continued)

*Primary Examiner* — Huyen X. Vo
(74) *Attorney, Agent, or Firm* — John Meline; LeighAnn Weiland

(57) ABSTRACT

In one embodiment, the invention provides a method for machine translation of a source document in an input language to a target document in an output language, comprising generating translation options corresponding to at least portions of each sentence in the input language; and selecting a translation option for the sentence based on statistics associated with the translation options.

20 Claims, 28 Drawing Sheets

U.S. PATENT DOCUMENTS

| | | | |
|---|---|---|---|
| 5,550,934 | A | 8/1996 | Van Vliembergen et al. |
| 5,559,693 | A | 9/1996 | Anick et al. |
| 5,677,835 | A | 10/1997 | Carbonell et al. |
| 5,696,980 | A | 12/1997 | Brew |
| 5,715,468 | A | 2/1998 | Budzinski |
| 5,721,938 | A | 2/1998 | Stuckey |
| 5,724,593 | A | 3/1998 | Hargrave, III et al. |
| 5,737,617 | A | 4/1998 | Bernth et al. |
| 5,768,603 | A | 6/1998 | Brown et al. |
| 5,784,489 | A | 7/1998 | Van Vliembergen et al. |
| 5,794,050 | A | 8/1998 | Dahlgren et al. |
| 5,794,177 | A | 8/1998 | Carus et al. |
| 5,826,219 | A | 10/1998 | Kutsumi |
| 5,826,220 | A | 10/1998 | Takeda et al. |
| 5,848,385 | A | 12/1998 | Poznanski et al. |
| 5,873,056 | A | 2/1999 | Liddy et al. |
| 5,884,247 | A | 3/1999 | Christy |
| 6,182,028 | B1 | 1/2001 | Karaali et al. |
| 6,223,150 | B1 | 4/2001 | Duan et al. |
| 6,233,544 | B1 | 5/2001 | Alshawi |
| 6,243,669 | B1 | 6/2001 | Horiguchi et al. |
| 6,243,670 | B1 | 6/2001 | Bessho et al. |
| 6,260,008 | B1 | 7/2001 | Sanfilippo |
| 6,266,642 | B1 | 7/2001 | Franz |
| 6,275,789 | B1 | 8/2001 | Moser et al. |
| 6,278,967 | B1 | 8/2001 | Akers et al. |
| 6,282,507 | B1 | 8/2001 | Horiguchi et al. |
| 6,285,978 | B1 | 9/2001 | Bernth et al. |
| 6,330,530 | B1 | 12/2001 | Horiguchi et al. |
| 6,356,864 | B1 | 3/2002 | Foltz et al. |
| 6,356,865 | B1 | 3/2002 | Franz et al. |
| 6,393,389 | B1 | 5/2002 | Chanod et al. |
| 6,463,404 | B1 | 10/2002 | Appleby |
| 6,470,306 | B1 | 10/2002 | Pringle et al. |
| 6,622,123 | B1 | 9/2003 | Chanod et al. |
| 6,658,627 | B1 | 12/2003 | Gallup et al. |
| 6,721,697 | B1 | 4/2004 | Duan et al. |
| 6,760,695 | B1 | 7/2004 | Kuno et al. |
| 6,778,949 | B2 | 8/2004 | Duan et al. |
| 6,871,174 | B1 | 3/2005 | Dolan et al. |
| 6,871,199 | B1 | 3/2005 | Binnig et al. |
| 6,901,399 | B1 | 5/2005 | Corston-Oliver et al. |
| 6,901,402 | B1 | 5/2005 | Corston-Oliver et al. |
| 6,928,448 | B1 | 8/2005 | Franz et al. |
| 6,937,974 | B1 | 8/2005 | D'agostini |
| 6,947,923 | B2 | 9/2005 | Cha et al. |
| 6,965,857 | B1 | 11/2005 | Decary |
| 6,983,240 | B2 | 1/2006 | Ait-Mokhtar et al. |
| 6,986,104 | B2 | 1/2006 | Green et al. |
| 7,013,264 | B2 | 3/2006 | Dolan et al. |
| 7,020,601 | B1 | 3/2006 | Hummel et al. |
| 7,027,974 | B1 | 4/2006 | Busch et al. |
| 7,050,964 | B2 | 5/2006 | Menzes et al. |
| 7,085,708 | B2 | 8/2006 | Manson |
| 7,167,824 | B2 | 1/2007 | Kallulli |
| 7,191,115 | B2 | 3/2007 | Moore |
| 7,200,550 | B2 | 4/2007 | Menezes et al. |
| 7,263,488 | B2 | 8/2007 | Chu et al. |
| 7,269,594 | B2 | 9/2007 | Corston-Oliver et al. |
| 7,346,493 | B2 | 3/2008 | Ringger et al. |
| 7,356,457 | B2 | 4/2008 | Pinkham et al. |
| 7,475,015 | B2 | 1/2009 | Epstein et al. |
| 7,529,656 | B2 | 5/2009 | Miyahira et al. |
| 7,739,102 | B2 | 6/2010 | Bender |
| 2001/0014902 | A1 | 8/2001 | Hu et al. |
| 2001/0029455 | A1 | 10/2001 | Chin et al. |
| 2002/0040292 | A1 | 4/2002 | Marcu |
| 2003/0158723 | A1 | 8/2003 | Masuichi et al. |
| 2003/0176999 | A1 | 9/2003 | Calcagno et al. |
| 2003/0182102 | A1 | 9/2003 | Corston-Oliver et al. |
| 2003/0204392 | A1 | 10/2003 | Finnigan et al. |
| 2004/0098247 | A1 | 5/2004 | Moore |
| 2004/0122656 | A1 | 6/2004 | Abir |
| 2004/0172235 | A1 | 9/2004 | Pinkham et al. |
| 2004/0193401 | A1 | 9/2004 | Ringger et al. |
| 2004/0254781 | A1 | 12/2004 | Appleby |
| 2005/0010421 | A1 | 1/2005 | Watanabe et al. |
| 2005/0015240 | A1 | 1/2005 | Appleby |
| 2005/0080613 | A1 | 4/2005 | Colledge et al. |
| 2005/0086047 | A1 | 4/2005 | Uchimoto et al. |
| 2005/0137853 | A1 | 6/2005 | Appleby |
| 2005/0155017 | A1 | 7/2005 | Bertis et al. |
| 2005/0171757 | A1 | 8/2005 | Appleby |
| 2005/0209844 | A1 | 9/2005 | Wu et al. |
| 2006/0004563 | A1 | 1/2006 | Campbell et al. |
| 2006/0080079 | A1 | 4/2006 | Yamabana |
| 2006/0095250 | A1 | 5/2006 | Chen et al. |
| 2006/0217964 | A1 | 9/2006 | Kamatani et al. |
| 2006/0224378 | A1 | 10/2006 | Chino et al. |
| 2006/0293876 | A1 | 12/2006 | Kamatani et al. |
| 2007/0010990 | A1 | 1/2007 | Woo |
| 2007/0016398 | A1 | 1/2007 | Buchholz |
| 2007/0083359 | A1 | 4/2007 | Bender |
| 2007/0100601 | A1 | 5/2007 | Kimura |

OTHER PUBLICATIONS

Hutchins, Machine Translation: Past, Present, Future, Ellis Horwood, Chichester, UK, 1986.

Bolshakov, I. A. "Co-Ordinative Ellipsis in Russian Texts: Problems of Description and Restoration" Proceedings of the 12th conference on Computational linguistics—vol. 1, pp. 65-67. Association for Computational Linguistics 1988.

\* cited by examiner

DEEP MODEL STATISTICS METHOD FOR MACHINE TRANSLATION

CROSS-REFERENCE TO RELATED APPLICATIONS

This application is a continuation of a co-pending U.S. patent application Ser. No. 13/407,729 filed on 28 Feb. 2012, which is a continuation of Ser. No. 12/388,219 filed Feb. 18, 2009, which in turn is a continuation-in-part of U.S. patent application Ser. No. 11/548,214, filed Oct. 10, 2006, and U.S. patent application Ser. No. 11/690,099, filed Mar. 27, 2007.

BACKGROUND OF THE INVENTION

1. Field of the Invention

Embodiments of the invention generally relate to the field of automated translation of natural-language sentences using linguistic descriptions and various applications in such areas as automated abstracting, machine translation, natural language processing, control systems, information search (including on the Internet), semantic Web, computer-aided learning, expert systems, speech recognition/synthesis and others.

2. Description of the Related Art

Prior machine translation (MT) systems differ in the approaches and methods that they use and also in their abilities to recognize various complex language constructs and produce quality translation of texts from one language into another. According to their core principles, these systems can be divided into the following groups.

One of the traditional approaches is based on translation rules or transformation rules and is called Rule-Based MT (RBMT). This approach, however, is rather limited when it comes to working with complex language phenomena. In the recent years no significant breakthroughs have been achieved within this field. The best known systems of this type are SYSTRAN and PROMPT. The known RBMT systems, however, usually possess restricted syntactic models and simplified dictionary descriptions where language ambiguities are artificially removed.

Rule-based MT has evolved into Model-Based MT (MBMT) which is based on linguistic models. Implementing a MBMT system to produce quality translation demands considerable effort to create linguistic models and corresponding descriptions for specific languages. Evolution of MBMT systems is connected with developing complex language models on all levels of language descriptions. The need in today's modern world requires translation between many different languages. Creating such MBMT systems is only possible within a large-scale project to integrate the results of engineering and linguistic research.

Another traditional approach is Knowledge-Based MT (KBMT) which uses semantic descriptions. While the MBMT approach is based on knowledge about a language, the KBMT approach considers translation as a process of understanding based on real knowledge about the World. Presently, interest in Knowledge-Based Machine Translation (KBMT) has been waning.

Example-Based MT (EBMT) relates to machine translation systems using automated analysis of "examples", which is very similar to Statistics-Based MT (SBMT). In recent years, the SBMT approach has received a strong impetus from the following factors: appearance of Translation Memory (TM) systems and availability of powerful and relatively affordable bilingual electronic resources, such as TM databases created by corporations and translation agencies, electronic libraries, and specialized Internet corpora. The TM systems have demonstrated their practical efficiency when translating recurrent text fragments on the basis of minimal knowledge about languages such that researchers and developers are encouraged to try and create advanced and relatively exhaustive SBMT systems.

Most machine translation systems, both rule-based and statistics-based, concentrate on proper transfer of language information directly between a source sentence and an output sentence and usually do not require any full-fledged intermediary data structures to explicate the meaning of the sentence being translated. For example, a system based on linguistic models would know how to build thousands of syntactic variants of verb phrases-constituents. A system which is based on purely statistical approach would not know anything about the connections between these variants and would not be able to obtain a correct translation of one phrase on the basis of another. In addition, most-used probabilistic (statistic) approaches and statistics-based systems have a common drawback of taking no consideration of semantics. As a result, there is no guarantee that the translated (or generated) sentence has the same meaning as the original sentence.

Thus, even though some linguistic approaches have been proposed, most of them have not resulted in any useful algorithms or industrial applications because of poor performance in translating complete sentences. Complex sentences, which may express different shades of meaning, or the author's attitude and/or have different styles or genre, or which may be very long and contain various punctuation marks and other special symbols, have not been successfully generated/translated by prior art language generation programs, or machine translation systems. It is especially difficult to translate or generate complex sentences, such as those found in technical texts, documentation, internet articles, journals, and the like and is yet to be done.

However, a system for machine translation of natural-language sentences between languages may be geared toward "understanding" sentences if complete syntactic and semantic sentence analysis is used, wherein a complete "model" of the analyzed sentence is built in the process. Examples include the MT system described in U.S. patent application Ser. No. 11/548,214, filed Oct. 10, 2006 and in U.S. patent application Ser. Nos. 11/690,099, 11/690,102, and 11/690,104 filed Mar. 22, 2007. These methods are difficult to implement and require large volumes of data to be processed.

SUMMARY OF THE INVENTION

The present invention generally relates to methods, computer-readable media, devices and systems for translating a sentence from an input language into an output language. In one embodiment, a method of translating a sentence from one source language into another output language includes analyzing the source sentence using linguistic descriptions of the source language, constructing a language-independent semantic structure to represent the meaning of the source sentence, and generating an output sentence to represent the meaning of the source sentence in the output language using linguistic descriptions of the output language. To improve the accuracy of translation, the analysis and/or synthesis stage may include ratings and statistics obtained by analyzing a corpus of parallel texts.

In one embodiment a machine translation system, for example, the Natural Language Compiler (NLC) system—the Model-Based MT system described in U.S. patent application Ser. No. 11/548,214, filed Oct. 10, 2006 and in U.S. patent application Ser. Nos. 11/690,099, 11/690,102, and 11/690,104 filed Mar. 22, 2007, may be used. The system provides syntactically coherent output. Syntactic and morphological descriptions of the input and output languages are used for this purpose.

NLC is an "intelligent" program which can analyze both the syntax and the semantics of a sentence. NLC employs a large number of diverse linguistic descriptions (morphological, syntactic, semantic, pragmatic, etc.) to build a semantic structure of the sentence which represents the meaning of the sentence in language-independent terms, and then to generate a corresponding sentence in the output language.

This process is intelligent, but the main problem of such systems is that the used linguistic descriptions must be exhaustive and complete. The more complete the descriptions, the better the quality of translation. However, the creation of such linguistic descriptions is a long and labor-intensive process, as most of the work must be done manually. Very often, several translation options are available. To select not only the most accurate but also the most probable option, various ratings may be used both at the analysis and at the synthesis stage. Examples of ratings include statistics, a priori assessments of lexical meanings and various syntactical and lexical constructs which may be assigned manually and automatically by means of special rules applying. The statistics may be obtained through analysis of a tagged corpus of parallel texts in a process known as statistical analysis.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide a method and computer systems configured to efficiently and completely translate a document in an input language into an output language. The document may be translated by means of the NLC system, which analyzes each sentence, recognizes its linguistic structure and semantics in order to "understand" its meaning. Exhaustive linguistic descriptions are used to analyze a sentence in the input language and to build its language-independent semantic structure and subsequently generate an output sentence in the output language. Problems of syntactical and semantic ambiguities which may appear during the process of translation can be reliably handled. Syntactically coherent output is provided by system automatically.

Maximum use of linguistic knowledge and natural language descriptions enable generation of a language-independent semantic structure which contains a large amount of various data information about the meaning of the source sentence. The natural language descriptions may be sufficiently comprehensive to cover all of language phenomena manifested in written discourse. The syntactic structures generated for a source sentence and/or an output sentence are limited only by the syntax of an input language or output language without any other artificial restrictions.

Figure 1:
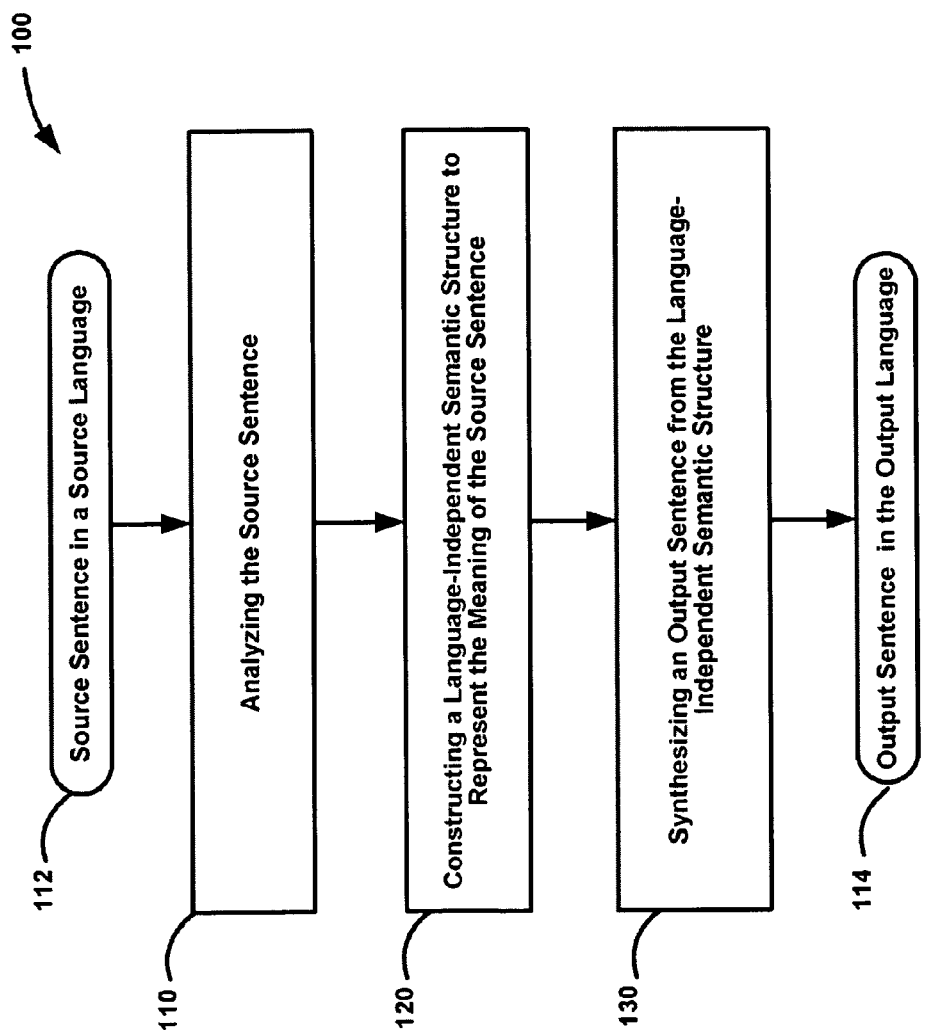
FIG. 1 is a general flow chart of the machine translation process implemented in NLC.
Figure 2:
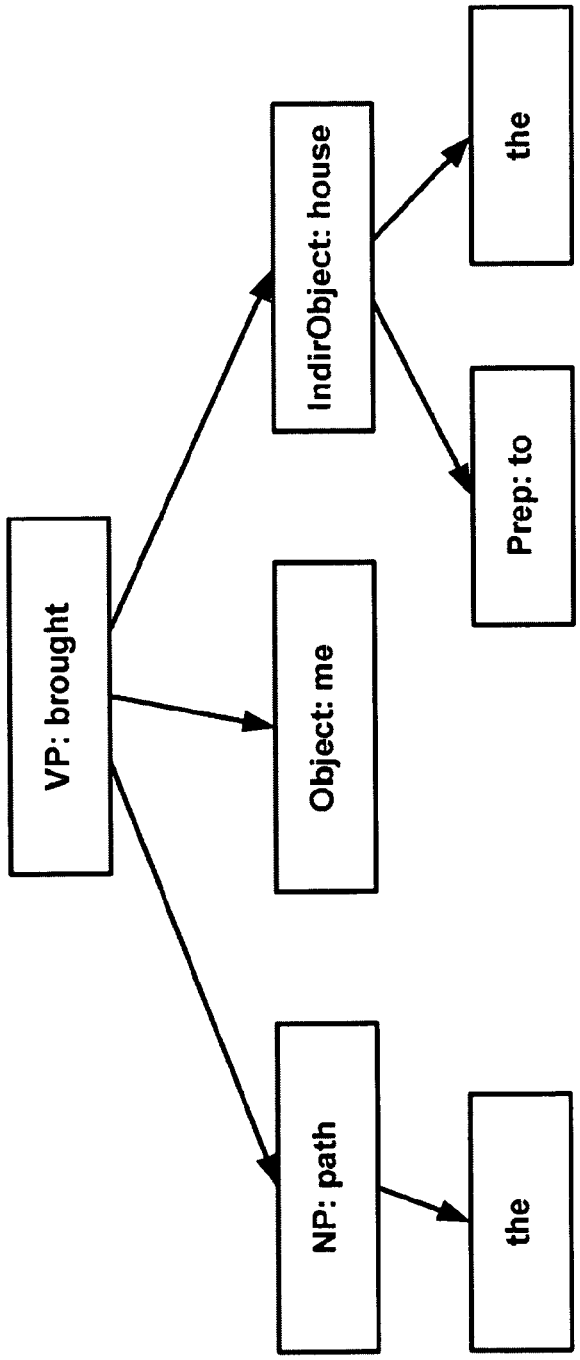
FIG. 2 shows an example of a syntactic structure of the sentence "The path brought me to the house."

FIG. 1 is a general flow chart of the translation process. In most general terms, the translation process consists of the following main stages: sentence analysis 110, construction 120 of a language-independent semantic structure which corresponds to the meaning of the source sentence, and synthesis 130 of a sentence in the output language. The analysis 110 produces the syntactic structure of the sentence, which is a tree-like hierarchy but may also include non-tree links. The nodes in this tree are the lexical units that make up the sentence—lexical meanings, each of which has its specific place in the semantic hierarchy describing the world. The links in this tree are the relations among the parts of the sentence, or surface slots. FIG. 2 shows an example of a syntactic structure of the sentence "The path brought me to the house."

Figure 3:
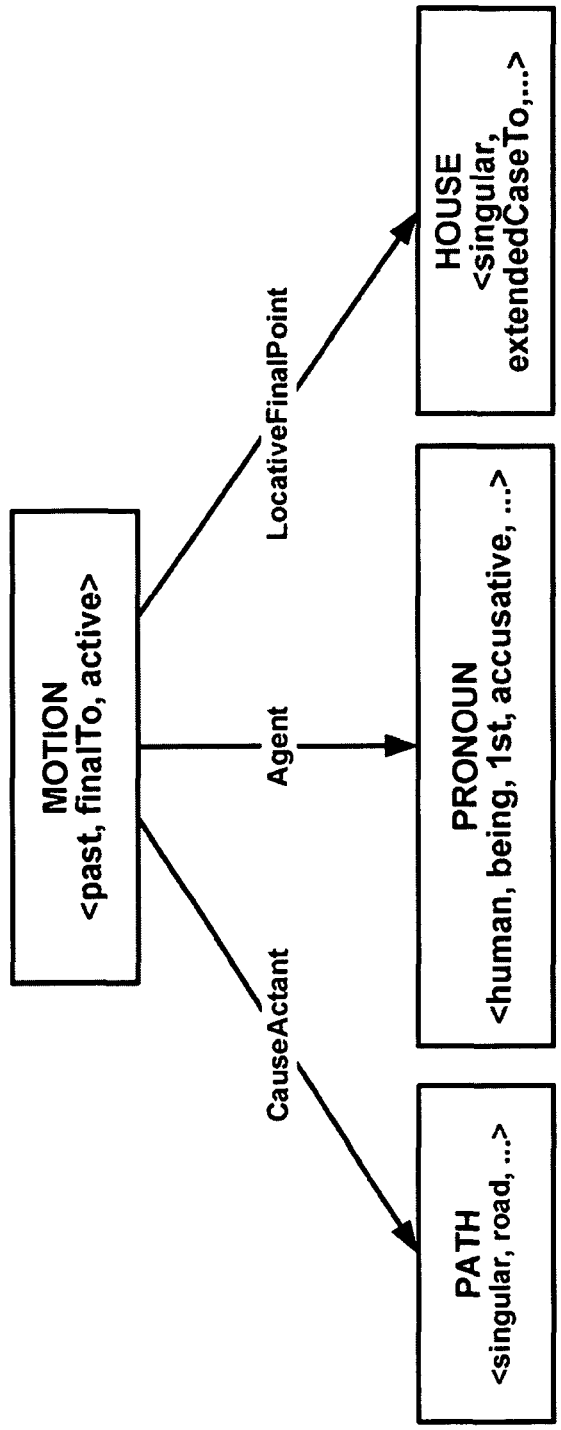
FIG. 3 shows a schematic view of the semantic structure of the source sentence "The path brought me to the house."

Next, at the stage 120, the syntactic structure is transformed into a semantic structure, where the lexical units of the source language are substituted with language-independent semantic classes, preserving the important properties and features of the lexical units. The syntactic relations of the source language are also substituted with language-independent notions. FIG. 3 shows a schematic view of the semantic structure of the source sentence "The path brought me to the house."

As it turns out, the results of the previous analysis may be very useful in analyzing subsequent sentences and texts. Particularly useful is parallel analysis of sentences in two languages, or analysis of so-called parallel texts. The parallel texts are texts in two or more languages where each fragment (sentence or paragraph) in one language has a corresponding fragment in another language. As a rule, the parallel text is an original text in one language translated into another language by human translation.

This is useful, because both at the analysis stage and at the synthesis stage the system has to make certain lexical choices. At the analysis stage, the system has to choose one of multiple homonyms with its corresponding semantic class and one of multiple surface structures with its corresponding deep structure. At the synthesis stage, the system has to choose one of multiple lexical options available in the given semantic class. In most cases, the choices faced by the system are of equal value and are all treated as the most likely ones.

For example, when analyzing the word combination "green hand" (="green specialist"), the system must select the semantic sense "green"="young, inexperienced, etc." but not the sense related to class COLOR.

Often the system has to deal with grammatical homonyms, which are especially common in English. For example, "left house" may be interpreted either as "the house on the left" or as "a house that has been left behind." Taken out of context, both interpretations seem equally likely. On the other hand, for "left hand" the interpretations "the hand which is not right" is much more likely than "a hand that has been left behind."

During the synthesis 130, the system has to choose the most appropriate word from among multiple lexemes that belong to the same semantic class and are very close in meaning. For example, "girl" better combines with "beautiful," "nice," "attractive" or "pretty" than with "picturesque" or "scenic," which belong to the same semantic class but combine with "place," "landscape" or "view."

The use of ratings obtained from parallel (bilingual) texts makes this choice less arbitrary. As indicated, the ratings may comprise statistics. In one embodiment, the system chooses the most appropriate word based on combinatorial ratings of both surface elements (i.e. lexemes, word combinations, lexical meanings, and surface slots) and deep elements (i.e. semantic classes and deep slots).

The linguistic descriptions used cover all the constructions possible in a language. However, not all of them are equally likely to occur in a text. The purpose of the statistical analysis is to select the most frequent ones. A text corpus is used for this purpose. The best solution would be a manually tagged corpus, but large manually tagged corpora are difficult to obtain. A corpus of parallel texts is used, i.e. texts in two or more languages where each fragment (sentence or paragraph) in one language has a corresponding fragment in another language.

Gathering statistics from parallel texts precedes the analysis and translation stages, and in a general case is performed independently of them. Statistics are gathered by comparing the sentences in the source language with their counterparts in the target language. Both sentences are analyzed using the same NLC method and their surface and deep structures are built.

The method is unique because it uses statistics gathered by applying the same NLC method to analyze natural-language sentences and to compare the obtained syntactic and semantic structures. However, also the subject matter and style of texts to be translated may be taken into account, if the translation had been preceded by gathering statistics from texts that belong to the same domain (e.g. law or engineering).

Figure 4:
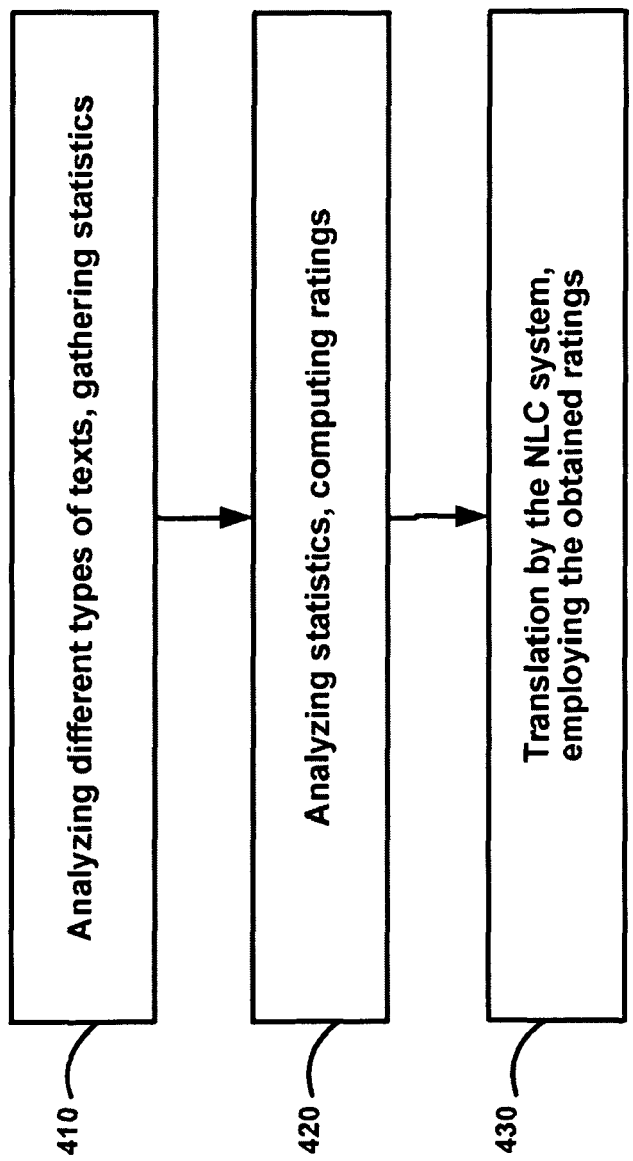
FIG. 4 is a schematic flow chart which shows how statistics are gathered and analyzed to train the NLC system.

FIG. 4 is a schematic flow chart which shows how statistics are gathered and analyzed to train the NLC system. The stage 410 includes parsing (analyzing) different types of texts, including parallel texts, tagged texts, texts with domain indication, etc. At this stage, the syntactic and semantic structures of the analyzed sentences are built and the results are filtered to exclude marginal cases. For the parallel texts, those parsing variants are selected which meet certain predefined requirements.

In one embodiment of the invention, the surface structure of a sentence in the source language is compared with the surface structure of the corresponding sentence in the target language and a correspondence between the surface elements is established. Likewise, the deep structure of a sentence in the source language is compared with the deep structure of the sentence in the target language and a correspondence between the deep structure elements is established. If these deep structures are "almost identical," the analysis results are considered adequate and the combinability of the elements of these structures may be used for operations involving statistics.

In another embodiment of the invention, the deep structures obtained by the analysis are used to compute the probability (relative frequency) of objects of certain semantic classes being combined with objects of another (or the same) semantic class. In still another embodiment of the invention, the deep structures obtained by the analysis are used to compute the probability (relative frequency) of objects of certain semantic classes being combined with certain deep slots (or slots of a certain class). In still another embodiment of the invention, the system computes the probability (relative frequency) of objects of certain semantic classes being combined with certain deep slots (or slots of a certain class), where the given position is filled by an object of another (or the same) semantic class.

At the stage 420 the statistics are gathered and analyzed, and at stage 430 the computed probabilities are transformed into ratings, entered into a dynamically updated lexico-semantic dictionary, and, together with a priori and other ratings, form the ratings of the corresponding constructions. These ratings are used at the corresponding analysis and synthesis stages.

Thus, the machine translation system NLC may be trained on different types of texts with the aid of the same methods of syntactic and semantic analyses. After the training the proper translation is performed by the NLC system, employing the ratings obtained at the statistics processing stage. The use of the obtained statistical ratings is illustrated in the context of the NLC method which is shown in FIG. 5A and in the subsequent figures.

Figure 5A:
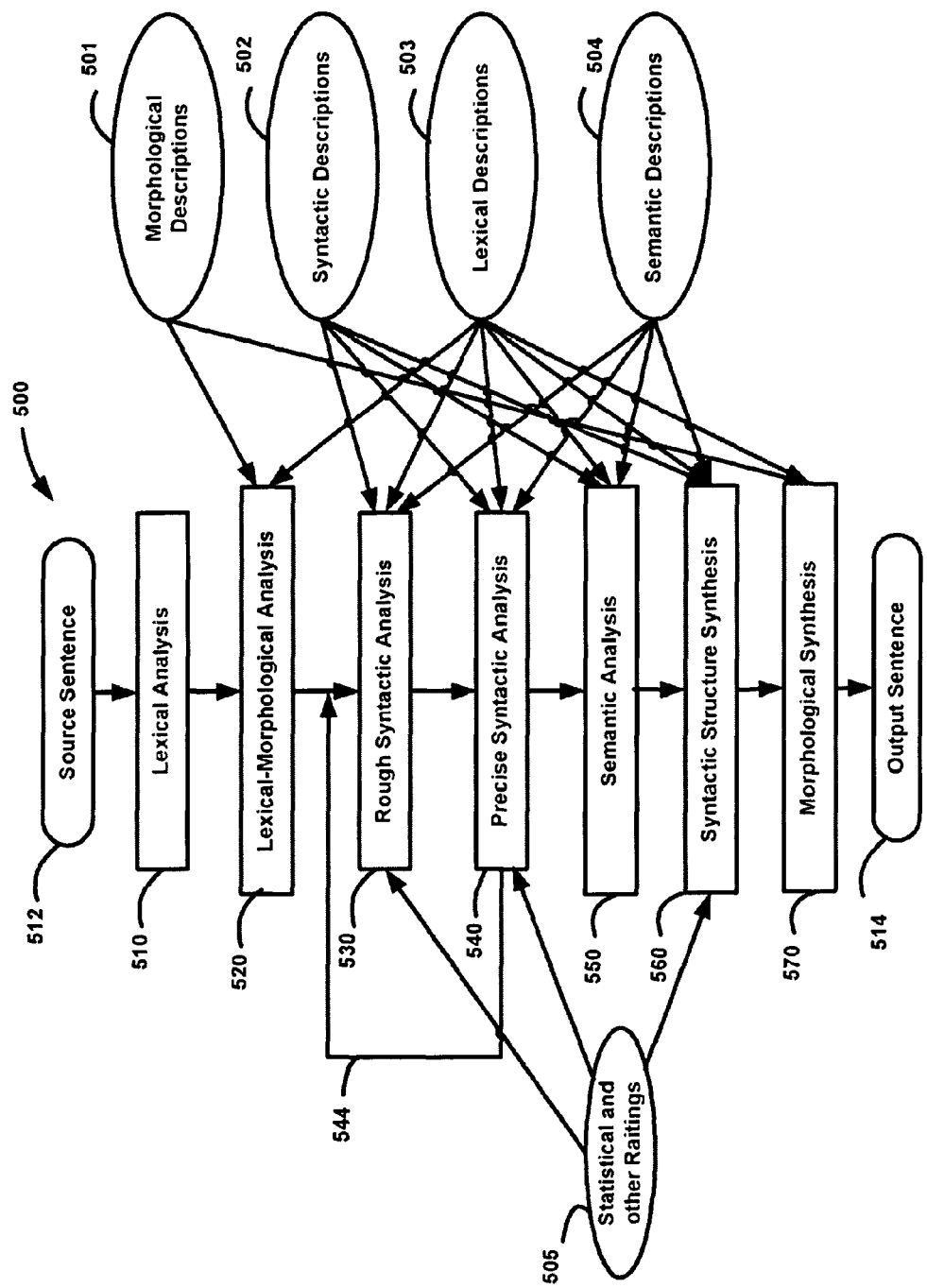
FIG. 5A illustrates a flow diagram of the employing the NLC method which uses linguistic descriptions according to one embodiment of the invention.
Figure 5B:
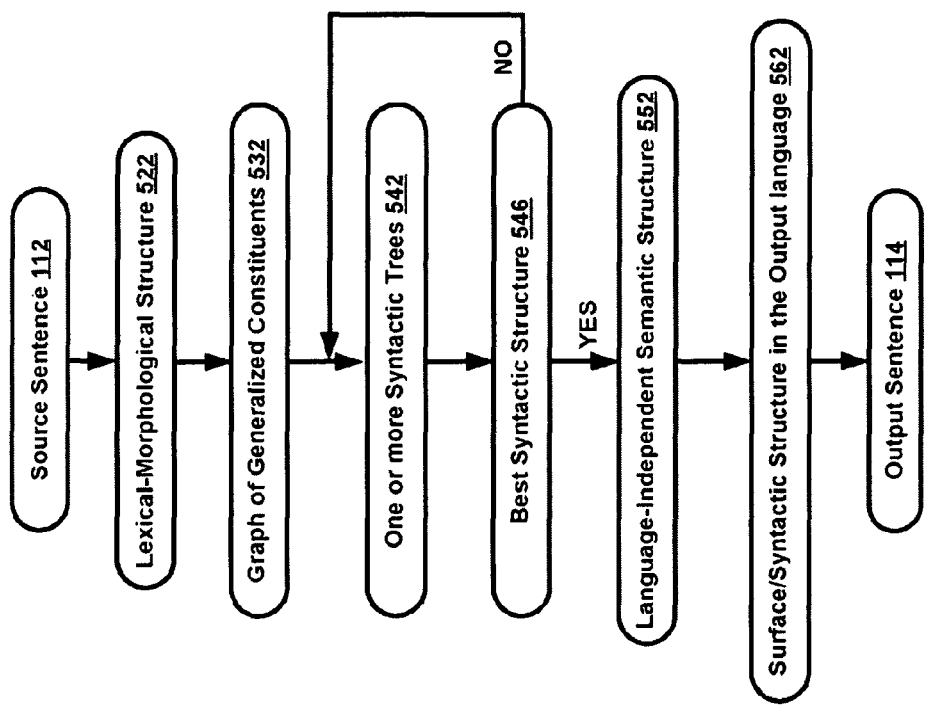
FIG. 5B illustrates converting the source fragment into an output fragment through various linguistic structures employing the NLC method which uses linguistic descriptions according to one embodiment of the invention.

FIG. 5A illustrates the method 500, implemented in the NLC system, for translating a source text, which is divided into sentences 512, from a source language into output sentences 514 in an output language via building language-independent semantic structures according to an exemplary embodiment of the invention. FIG. 5B illustrates transforming of the source sentence 512 into the output sentence 514 through various structures according to an exemplary embodiment of the invention. FIG. 5A also shows the linguistic descriptions 501-504 and the steps which use the statistical and other ratings 505.

As shown in FIGS. 5A and 5B, the method 500 for translating a source sentence 512 in a source/input language into an output sentence 514 includes using linguistic descriptions adapted to perform various steps of analysis and synthesis. The linguistic descriptions may include morphological descriptions 501, syntactic descriptions 502, lexical descriptions 503, and semantic descriptions 504.

At step 510, a lexical analysis is performed on the source sentence 512 in a source/input language. At step 520, a lexical-morphological analysis is also performed on the source sentence 512 to generate a lexical-morphological structure 522 of the source sentence 512 using information from the morphological descriptions 501 and the lexical descriptions 501 of the source language.

Then, a syntactic analysis is performed on the lexical-morphological structure 522 of the source sentence 512. In one embodiment of the invention, the syntactic analysis includes a rough syntactic analysis and a precise syntactic analysis. When analyzing the meaning of the source sentence, a two-step analysis algorithm (e.g., rough syntactic analysis and precise syntactic analysis) is implemented.

At step 530, the rough syntactic analysis is performed on the lexical-morphological structure 522 of the source sentence 512 to generate a graph of generalized constituents 532. Performing the rough syntactic analysis may require the use of the syntactical descriptions 502, the lexical descriptions 503 of the source language, and the semantic descriptions 504.

At step 540, the precise analysis is performed on the graph of generalized constituents 532. The precise analysis may include, but not limited to, generating one or more syntactic trees, obtaining precise rating scores on the base of statistical and other a priori ratings 505, for the one or more syntactic trees, generating non-tree links, and building a best syntactic structure 546. Performing the precise syntactic analysis may require the use of the syntactical descriptions 502, the lexical descriptions 503, and the semantic descriptions 504. Step 544 indicates that the syntactic analysis is performed repeatedly if the best syntactic structure 546 is not successfully built.

A precise syntactic analysis is performed on the graph of generalized constituents to generate one or more syntactic trees to represent the source sentence from the graph of the generalized constituents. This novel two-step syntactic analysis approach ensures the meaning of the source sentence to be accurately represented into a best syntactic structure which is chosen from the one or more syntactic trees. In addition, hypotheses for a portion of a sentence for analyzing its meaning and generating an appropriate language structure are verified within the hypotheses about the language structure for the whole sentence. Hypotheses are advanced and evaluated based on a system 505 of ratings, which include both a priori assessments, the more complex computing ratings and the statistics reflecting the frequency of constructions and combinability of the syntactic structure elements. This approach avoids analyzing numerous parsing variants which are known to be invalid, such that one or more syntactic trees are rated, each syntactic tree representing the whole sentence, in order to select the best syntactic structure. The best syntactic structure is the structure which, when verified, was given the highest integral rating.

At step 550, a semantic analysis is performed to transition the best syntactic structure 546 of the source sentence in the natural language into a language-independent semantic structure 552. The language-independent semantic structure 552 is generated to fully convey the meaning of the source sentence in the source natural language and represent the source sentence in a language-independent form.

At step 560, syntactic structure synthesis is performed on the language-independent semantic structure 552 to build a surface/syntactic structure 562. The syntactic structure synthesis may include, but not limited to, performing a lexical selection on the language-independent semantic structure 552 using the linguistic descriptions of the output language. The syntactic structure synthesis may require the use of the syntactical descriptions 502, the lexical descriptions 503, and the semantic descriptions 504 of the output language.

In the process of syntactic structure synthesis 560, from the semantic classes, which form the nodes of the semantic structure, specific representatives of the classes and the specific lexemes corresponding to them are selected. The selection is done taking into account the available semantic data. At this stage, the accuracy of translation and its adequacy in the target language may be increased by taking into account the pragmatic information 940 about the domain that the text belongs to and by selecting the most probable lexemes which combine best with one another, i.e. the lexemes and word combinations with the highest general rating 505 including statistical rating.

At step 570, morphological synthesis is performed on the surface/syntactic structure 562 to generate the output sentence 514. The morphological synthesis may require the use of the morphological descriptions 501 and the lexical descriptions 503 of the output language.

Figure 6:
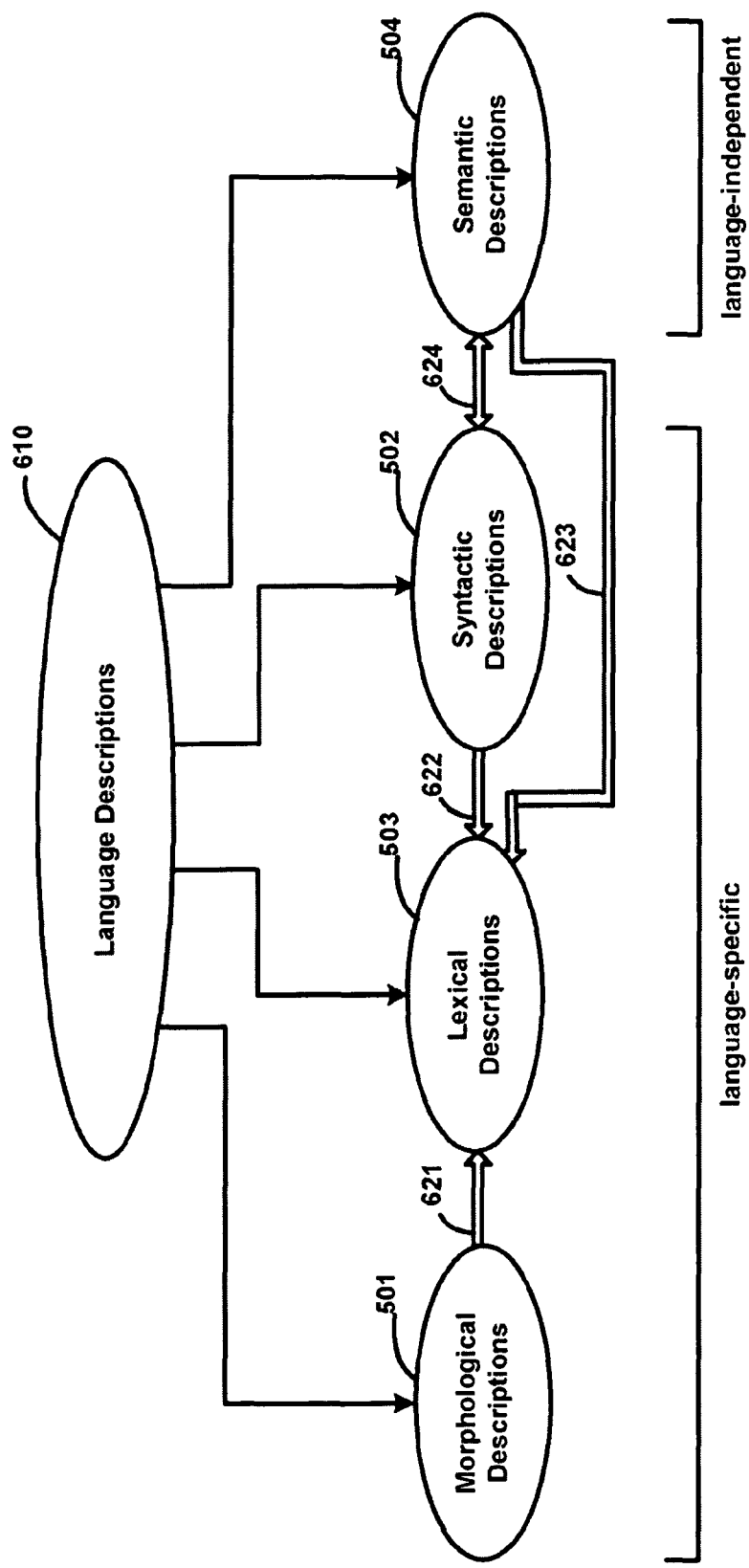
FIG. 6 is a diagram illustrating language descriptions according to one exemplary embodiment of the NLC method.

FIG. 6 illustrates language descriptions 610 including morphological descriptions 501, lexical descriptions 503, syntactic descriptions 502, and semantic descriptions 504, and interrelationship between them. Among them, the morphological descriptions 501, the lexical descriptions 503, and the syntactic descriptions 502 are language-specific. Each of these language descriptions 610 can be created for each source language and, taken together, they represent a model of the source language. The semantic descriptions 504, however, are language-independent and are used to describe language-independent semantic features of objects, meanings, processes, events, etc. in various languages and to construct language-independent semantic structures.

Figure 7:
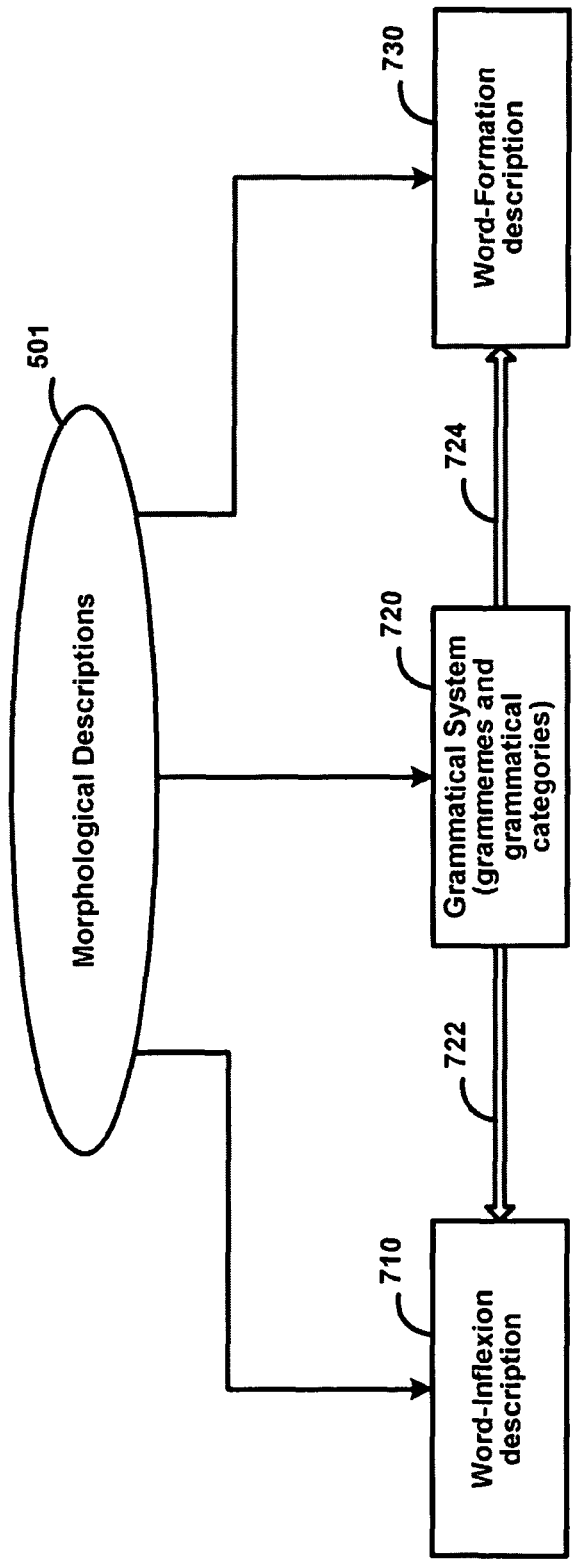
FIG. 7 is a diagram illustrating morphological descriptions according to one exemplary embodiment of the NLC method.

FIG. 7 illustrates exemplary morphological descriptions. As shown, the components of the morphological descriptions 501 include, but are not limited to, word-inflexion description 710, grammatical system 720 (e.g., grammemes), and word-formation description 730. In one embodiment, grammatical system 720 includes a set of grammatical categories, such as, "Part of speech", "Case", "Gender", "Number", "Person", "Reflexivity", "Tense", "Aspect", etc. and their meanings, hereafter referred to as "grammemes". For example, part of speech grammemes may include "Adjective", "Noun", "Verb", etc.; case grammemes may include "Nominative", "Accusative", "Genitive", etc.; and gender grammemes may include "Feminine", "Masculine", "Neuter", etc.

Word-inflexion description 710 describes how the main form of a word form may change according to its case, gender, number, tense, etc. and broadly includes all possible forms for a given word. Word-formation 730 describes which new words may be generated involving a given word. The grammemes are units of the grammatical systems 720 and, as shown by a link 722 and a link 724, the grammemes can be used to build the word-inflexion description 710 and the word-formation description 730.

According to one aspect of the invention, when establishing syntactic relationships for elements of a source sentence, one or more constituent models are used. A constituent may include a contiguous group of words from the source sentence and behaves as one entity. Each constituent may include a core word and can include child constituents at lower levels. A child constituent is a dependent constituent and may be attached to other constituents (as parent constituents) for building the syntactic structure of a source sentence.

Figure 8:
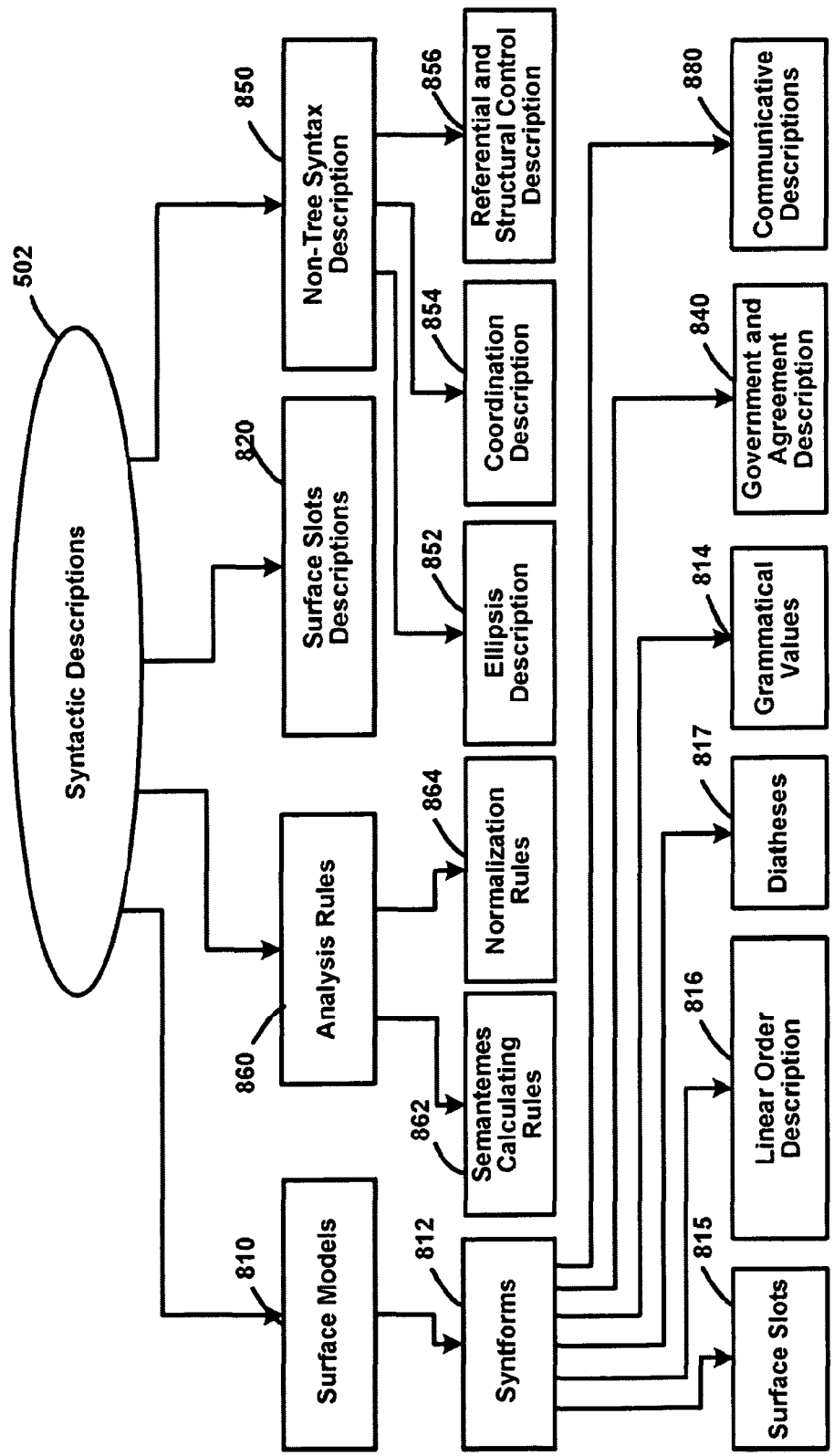
FIG. 8 is a diagram illustrating syntactic descriptions according to one exemplary embodiment of the NLC method.

FIG. 8 illustrates exemplary syntactic descriptions. The components of the syntactic descriptions 502 may include, but are not limited to, surface models 810, surface slots descriptions 820, referential and structural control description 830, government and agreement description 840, non-tree syntax description 850, and analysis rules 860. The syntactic descriptions 502 are used to construct possible syntactic structures of a source sentence from a given source language, taking into account free linear word order, non-tree syntactic phenomena (e.g., coordination, ellipsis, etc.), referential relationships, and other considerations.

The surface models 810 are represented as aggregates of one or more syntactic forms ("syntforms" 812) in order to describe possible syntactic structures of sentences in a given language. In general, any lexical meaning of a language is linked to their surface (i.e., syntactic) models 810, which represent constituents which are possible when the lexical meaning functions as a "core" and includes a set of surface slots of child elements, a description of the linear order, diatheses, among others.

While the surface models 810 may be represented by syntforms 812, each syntform 812 may include a certain lexical meaning which functions as a "core" and may further include a set of surface slots 815 of its child constituents, a linear order description 816, diatheses 817, grammatical values 814, government and agreement descriptions 840, communicative descriptions 880, among others, in relationship to the core of the constituent.

The surface slots descriptions 820 as a part of syntactic descriptions 502 are used to describe the general properties of the surface slots 815 that are used in the surface models 810 of various lexical meanings in the source language. The surface slots 815 are used to express syntactic relationships between the constituents of the sentence. Examples of the surface slot 815 may include "Subject", "Object_Direct", "Object_Indirect", "Relative Clause", among others.

Figure 9:
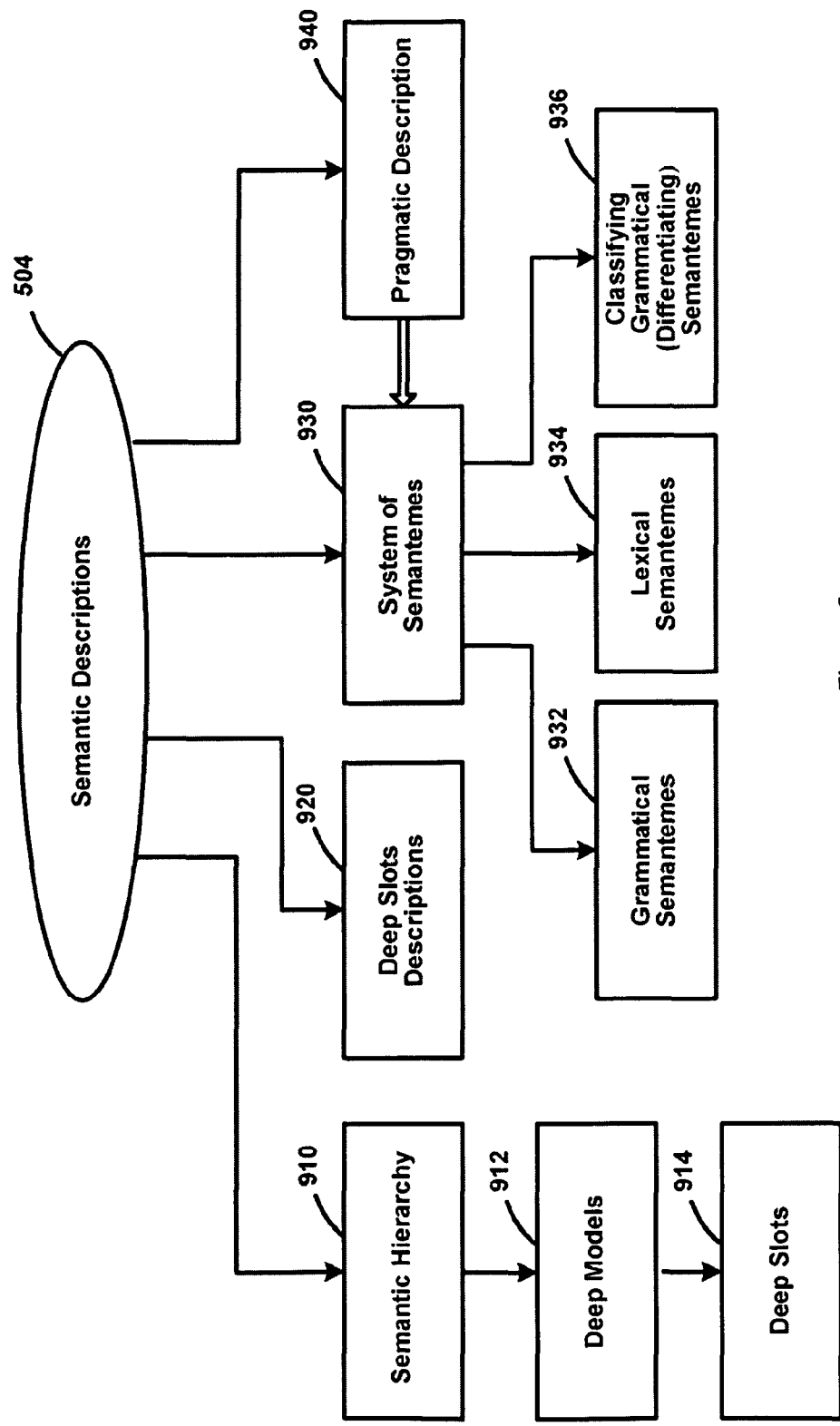
FIG. 9 is a diagram illustrating semantic descriptions according to one exemplary embodiment of the NLC method.

As part of a syntactic description, any constituent model uses a plurality of surface slots 815 of child constituents along with their linear order descriptions 816 to describe the grammatical values 814 of possible fillers of these surface slots 815. The diatheses 817 represent correspondences between the surface slots 815 and deep slots 914 (as shown in FIG. 9). The diatheses 817 are represented by the link 624 between syntactic descriptions 502 and semantic descriptions 504 (as shown in FIG. 6). The communicative descriptions 880 describe communicative order of the words in a sentence.

Any syntactic form, syntform 812, is a set of surface slots 815 coupled with the linear order descriptions 816. One or more possible constituents for a lexical meaning of a word form of a source sentence may be represented by surface syntactic models, e.g., the surface models 810. Each constituent is viewed as the realization of the constituent model by means of selecting a corresponding syntform 812. The selected syntactic forms, the syntforms 812, are sets of surface slots 815 with a specified linear order. Further, each surface slot in a syntform can have grammatical and semantic restrictions on their fillers.

Linear order description 816 is represented as linear order expressions which are built to express a sequence in which various surface slots 815 can occur in the sentence. The linear order expressions may include names of variables, names of surface slots, parenthesis, grammemes, ratings, and the "or" or "and" operators, etc. For example, a linear order description for the sentence, "Boys play football." may be represented as "Subject Core Object_Direct", where "Subject, Object_Direct" are names of surface slots 815 corresponding to the word order. Fillers of the surface slots 815 are present by symbols in the same order as in the linear order expression.

Different surface slots 815 may be in a strict and/or variable relationship in the syntform 812. For example, parenthesis may be used to build the linear order expressions and describe strict linear order relationships between different surface slots 815. SurfaceSlot1 SurfaceSlot2 or (SurfaceSlot1 SurfaceSlot2) means that both surface slots are located in the same linear order expression, but only one order of these surface slots relative to each other is possible; namely, SurfaceSlot2 follows after SurfaceSlot1.

As another example, square brackets may be used to describe variable linear order relationships between different surface slots 815 of the syntform 812 in the linear order expressions. As such, [SurfaceSlot1 SurfaceSlot2] indicates that any linear order of surface slots denoted by the variables SurfaceSlot1 and SurfaceSlot2 is possible.

The linear order expressions of the linear order description 816 may contain grammatical values 814, expressed by grammemes, to which child constituents correspond. In addition, two linear order expressions can be joined by the operator |(<<OR>>). For example: (Subject Core Object)|[Subject Core Object].

Communicative descriptions 880 describe a word order in the syntform 812 from the point of view of communicative acts to be represented as communicative order expressions, which are similar to linear order expressions. The government and agreement description 840 contains rules and restrictions on grammatical values of attached constituents which are used during syntactic analysis.

Non-tree syntax descriptions 850 are related to processing various linguistic phenomena, such as, ellipsis and coordination, and are used in syntactic structures transformations which are generated during various steps of analysis according to embodiments of the invention. The non-tree syntax description 850 include ellipsis description 852, coordination description 854, as well as, referential and structural control description 856, among others.

Analysis rules 860, as a part of the syntactic descriptions 502, may include, but are not limited to, semantemes calculating rules 862 and normalization rules 864. Although analysis rules 860 are used during the step of semantic analysis 550, the analysis rules 860 generally describe properties of a specific language and are related to the syntactic descriptions 502. The normalization rules 864 are generally used as transformational rules to describe transformations of semantic structures which may be different in various languages.

FIG. 9 illustrates exemplary semantic descriptions. As stated above in reference to FIG. 5, semantic descriptions provide language-independent descriptions of deep constituents, deep slots, and semantemes, etc. The components of the semantic descriptions 504 are also language-independent and may include, but are not limited to, a semantic hierarchy 910, deep slots descriptions 920, a system of semantemes 930, and pragmatic descriptions 940.

Semantic hierarchy 910 may include semantic notions or semantic entities named semantic classes, arranged into hierarchical parent-child relationships. In general, a child semantic class inherits most properties of its direct parent and all ancestral semantic classes. For example, semantic class SUBSTANCE is a child of semantic class ENTITY and at the same time it is a parent of semantic classes GAS, LIQUID, METAL, WOOD_MATERIAL, etc.

Each semantic class in the semantic hierarchy 910 is supplied with a deep model 912. The deep model 912 of the semantic class is a set of the deep slots 914, which reflect the semantic roles of child constituents in various sentences with objects of the semantic class as the core of a parent constituent and the possible semantic classes as fillers of deep slots. The deep slots 914 express semantic relationships between constituents, including, for example, "agent", "addressee", "instrument", "quantity", etc. A child semantic class inherits and adjusts the deep model 912 of its direct parent semantic class Deep slots descriptions 920 are used to describe the properties of the deep slots 914 and reflect the semantic roles of child constituents in the deep models 912. The deep slots descriptions 920 also contain grammatical and semantic restrictions on what could be the possible fillers of the deep slots 914. The properties and restrictions for the deep slots 914 and their possible fillers are very similar and oftentimes identical among different languages. Thus, the deep slots 914 are language-independent.

System of semantemes 930 represents a set of semantic categories and semantemes, which represent the meanings of the semantic categories. As an example, a semantic category "DegreeOfComparison", can be used to describe the degrees of comparison expressed by various forms of adjectives, for example, "easy", "easier" and "easiest". So, the semantic category "DegreeOfComparison" may include such semantemes as, for example, "Positive", "ComparativeHigherDegree", "SuperlativeHighestDegree", among others. As another example, a semantic category "RelationToReferencePoint" can be used to describe an order as before or after a reference point relative to some event or object, etc., and its semantemes may include, "Previous", "Subsequent", and the order may be spatial or temporal in a broad sense. As yet another example, "EvaluationObjective", as a semantic category, may describe an objective assessment, such as "Bad", "Good", etc.

The systems of semantemes 930 include language-independent semantic attributes which express semantic characteristics as well as stylistic, pragmatic and communicative characteristics. Semantemes can also be used to express an atomic meaning which finds a regular grammatical and/or lexical expression in a language. By purpose and usage, the system of semantemes 930 may be divided into various kinds, including, but not limited to, grammatical semantemes 932, lexical semantemes 934, and classifying grammatical (differentiating) semantemes 936.

Grammatical semantemes 932 are used to describe grammatical properties of constituents when transforming a syntactic tree (a language dependent object) into a semantic structure (a language independent object) and backwards during syntactic structure synthesis 560 from the semantic structure. Lexical semantemes 934 describe specific properties of objects (for example, "being flat" or "being liquid") and are used in the deep slot descriptions 920 as restriction for deep slot fillers (for example, for the verbs "face (with)" and "flood", respectively). Classifying grammatical (differentiating) semantemes 936 express differentiating properties of objects within a single semantic class. For example, in the semantic class "HAIRDRESSER" the semanteme <<RelatedToMen>> is assigned to the lexical meaning "barber", unlike other lexical meanings which also belong to this class, such as "hairdresser", "hairstylist", etc.

Pragmatic descriptions 940 are used to assign a corresponding theme, style or genre to texts and objects of the semantic hierarchy 910. For example, "Economic Policy", "Foreign Policy", "Justice", "Legislation", "Trade", "Finance", etc. Pragmatic properties can also be expressed by semantemes. For example, pragmatic context may be considered when generating natural language sentences.

Figure 10:
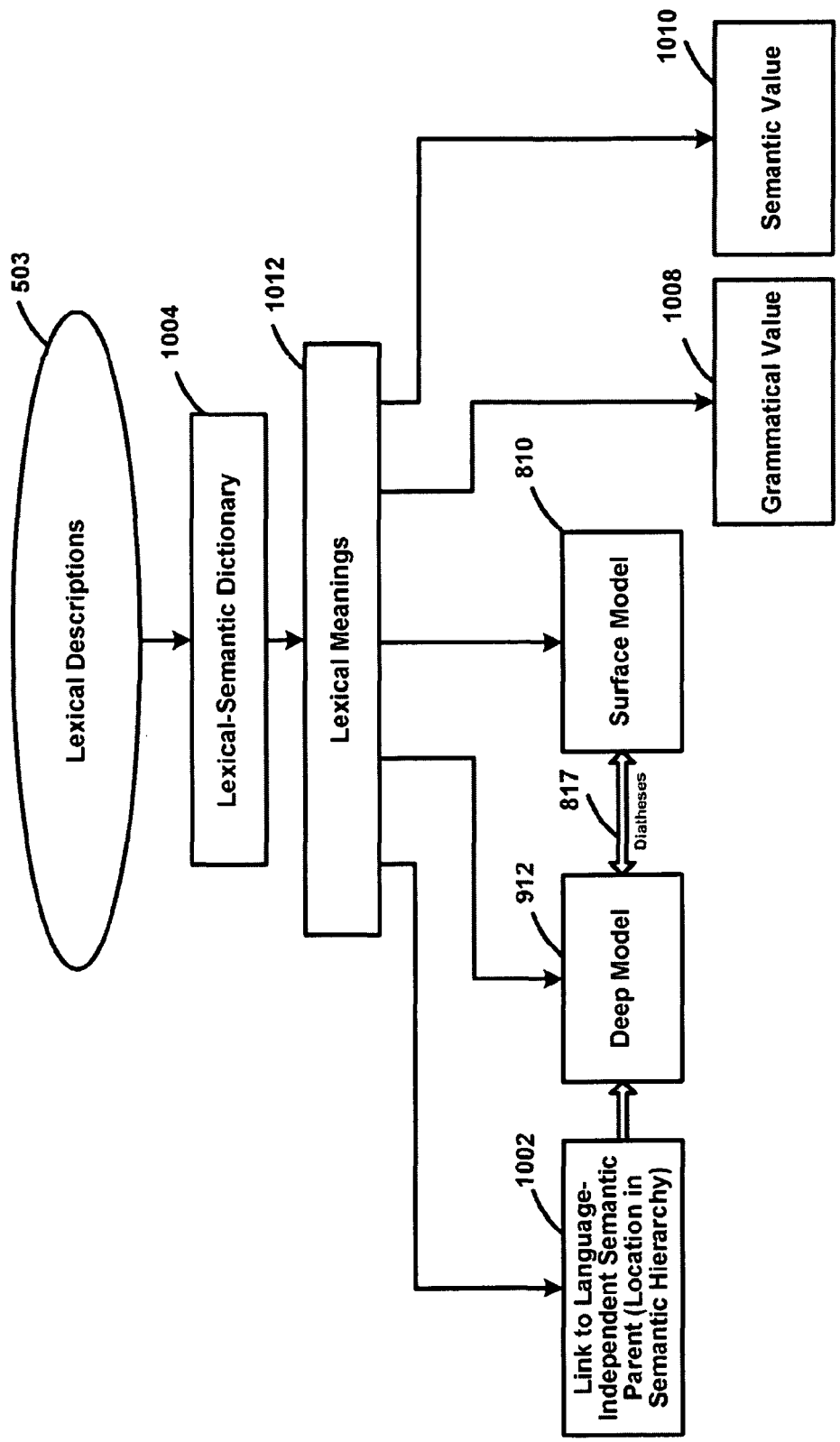
FIG. 10 is a diagram illustrating lexical descriptions according to one exemplary embodiment of the NLC method.

FIG. 10 illustrates exemplary lexical descriptions. The lexical descriptions 503 represent a plurality of lexical meanings 1012 in a specific language. For each lexical meaning 1012, a link 1002 to its language-independent semantic parent may be established to indicate the location of a given lexical meaning in the semantic hierarchy 910.

Each lexical meaning 1012 is connected with its deep model 912, which is described in language-independent terms, and surface model 810, which is language-specific. Diatheses can be used as the interface between the surface models 810 and the deep models 912 for each lexical meaning 1012 or for a part of speech with some specific grammatical value. One or more diatheses 817 can be assigned to each surface slot 815 in each syntform 812 of the surface models 810.

While the surface model 810 describes the syntactic roles of surface slots and their fillers, the deep model 912 generally describes the semantic roles of the surface slots and the fillers. A deep slot description 920 expresses the semantic types of possible fillers and/or the properties or attributes of the objects denoted by the words of any natural language.

Deep slot descriptions 920 are language-independent since different languages may use the same deep slot to describe similar semantic relationships or to express similar aspects of a real-life situation. Typically, the fillers of the deep slots 914 have the same semantic properties even in different languages. Lexical meanings 1012 of a lexical description of a language inherit properties of semantic class from its parent and adjust its deep model 912.

In addition, lexical meanings 1012 may contain their own characteristics as well as inherit other characteristics from language-independent parent semantic class. These characteristics of the lexical meanings 1012 may include grammatical values 1008 and semantic value 1010, which can be expressed as grammemes and semantemes, respectively.

Each surface model 810 of a lexical meaning includes one or more syntforms 812. Every syntform 812 of a surface model 810 may include one or more surface slots 815 with their linear order description 816, one or more grammatical values 814 expressed as a set of grammatical characteristics (grammemes), one or more semantic restrictions on surface slot fillers, and one or more of the diatheses 817. Semantic restrictions on a surface slot filler are a set of semantic classes, whose objects can fill a given surface slot. The diatheses 817 are a part of relationship 624 between syntactic descriptions 502 and semantic descriptions 504, and represent correspondences between the surface slots 815 and the deep slots 914 of the deep model 912.

The use of such an extensive set of linguistic descriptions allows the system to completely parse sentences in any source language and build a language-independent semantic structure which encodes its meaning in language-independent terms. The idea behind the method is to use the data obtained by previous analyses. Usually, only an experienced human translator can evaluate the correctness of a translation obtained with an MT system. This method automates this process.

If the syntactico-semantic parsing of two counterpart sentences, one in the source language and the other in the target language, produces trees which are judged to be identical or near-identical, the translation may be deemed correct. Next, such parsed counterparts are filtered and those tree pairs are selected. Then they may be used to make judgments about the frequency of occurrence of certain elements of the surface and deep structures. Returning to FIG. 4, all the described below actions for gathering statistics and making generalizations based on the obtained data refer to the stages 410 and 420.

Types of Statistics Used

The stage 410 consists in parsing tagged and parallel texts. As the syntactic descriptions are constantly improved, the statistics have to be periodically updated by parsing the texts anew. The simplest types of statistics are the calculation of the number of occurrences of a particular word (lexical meaning) and the calculation of the number of occurrences of a particular deep slot. These statistics are used to compute penalty and bonus points for the lexical choices at the analysis and synthesis stages. Other things being equal, preference is given to the more frequent lexical meaning.

The frequency of a lexeme or a lexical meaning may be computed separately for a selected domain (subject matter), e.g. for texts on law, IT, agriculture, etc. Conversely, if the system has amassed this type of statistics, it can attempt to determine which domain a text belongs to. Several domains for one and the same text may be indicated. Text domain may also be taken into account when making lexical choices. For example, both in Russian and in German the lexemes "зaмOK" (Rus.) and "Schloß" (Ger.) have symmetrical homonyms: 1) castle, 2) lock. It may by assumed sense the meaning "castle" is the more probable one in texts belonging to the domains of history, tourism, travel guides, architecture, etc. Likewise, the lexeme "rock" used in texts about music, culture, adolescents, society is more likely to mean "rock music" rather than "the solid mineral material forming part of the surface of the earth and other similar planets." Another example: in texts on aviation and weapons of war, the lexeme "drone" is much more likely to mean "pilotless plane" than "insect, male bee."

More complex types of statistics may be used. For example, deep language-independent statistics of "semantic class—semantic class" correspondences may be used. If two semantic classes frequently co-occur, lexemes from these classes are very likely to combine together. Consequently, at the stage of lexical analysis, a pair of this type will receive bonus points, and this pair will be selected from among other possible options. For example, the lexeme "hammer" belongs to the semantic class "HAMMER" and the lexeme "heavy" belongs to the semantic class "WEIGHT" with the semanteme PolarityPlus. If a sentences in a source language, e.g. in English, contains the word combination "heavy hammer" and when analyzing the corresponding sentence in a target language, e.g. in Russian, the system obtains the same "HAMMER-WEIGHT" pair of semantic classes, this pair may be marked as highly probable. On the other hand, if the pair of semantic classes "HAMMER-WEIGHT" is regarded as highly probable, then during translating a real sentences any other words from the class "HAMMER", not only in English, maybe, highly probable compatible with words from the class "WEIGHT". For example, "sledgehammer" may be highly probable compatible with "ponderous", "massive", etc.

Another, more sophisticated, type of statistics, is the calculation of triplets of type "semantic class (the lexical core of the parent constituent)-semantic class (the lexical core of the child constituent)-deep slot." The statistics are gathered in the same manner as above, but additionally takes in account the "deep slot" relation which binds semantic classes. Thus, for "heavy hammer," the system will deem the combination of the semantic classes "HAMMER-WEIGHT" with the deep slot "ChParameter_Weight" to be highly probable.

Statistics Gathering Methods

Some of the more sophisticated types of statistics cannot be always obtained experimentally, like, for example, the above calculation of triplets of type "semantic class (the lexical core of the parent constituent>)-semantic class (the lexical core of the child constituent>)-deep slot." The generalizations and calculation of statistical ratings are done at the stage 420. The idea behind the method is that not all triplets are equally probable. To resolve ambiguities, the system must be capable of evaluating the probability of each triplet {A=Parent, B=Child,S=Slot}. Below this probability will be written as P(A,B,S).

Naturally, the total number of all theoretically possible triplets {A,B,S} is impossibly huge and it would be unrealistic to expect that we can obtain a reliable corpus of grammatically tagged parallel texts large enough to evaluate the probability of each possible triplet.

For this reason, we must limit ourselves either to the "very frequent" triplets, or be able to compute approximate probabilities using the method of extrapolation. Below we suggest a possible extrapolation method which consists in calculating complex bonus points as a sum of simple bonus points. Due to the probabilistic nature of P(A,B,S), it can be expanded as a product of more or less "independent" quantities which may be evaluated separately and, if required, on different sample set. In practice, instead of evaluating the quantity itself, its logarithm may be evaluated (a small radix of, say, 1.001 is used, which is then rounded down). This allows adding the bonus points rather than multiplying them.

The quantity P(A,B,S) can be represented as the product $$P(A)P(B)P(S)\frac{P(A \cap B \cap S)}{P(A)P(B)P(S)}.$$

The probabilities P(A) and P(B), which are the absolute frequencies of the classes, may be evaluated separately, taking into account the pragmatic classes 940 (domain) of the analyzed text fragment. We assume that the other probabilities are almost independent of the pragmatic class, and therefore, they are evaluated using the general sample which includes texts belonging to all domains.

The combinability of the class A with the deep slot S is the quantity $$\frac{P(A \cap S)}{P(A)P(S)},$$

which, in most cases, can be evaluated as the quotient of the corresponding numbers of occurrences. Sometimes, if there is not enough data, a generalization based on the semantic hierarchy may be made (see below).

The probability of the deep slot P(S) is evaluated as the quotient N(S)/N (the number of occurrences of the deep slot divided by the total number of tree links). If we continue to expand P(A,B,S), we get an intuitively clear representation of P(A,B,S) as a product of "absolute frequency of A"×"absolute frequency of B"×"absolute frequency of S"×"combinability of the class A with the deep slot S"×"combinability of the class B with the deep slot S"×"combinability of the classes A and B if the deep slot is S" (the corresponding mathematical calculations are fairly trivial).

The combinability of the classes A and B if the deep slot is S is $$\frac{P(A \cap B | S)}{P(A | S) P(B | S)}.$$

This quantity presents the most difficulty, as very often there is not enough statistics to make a reliable evaluation. Below we describe a "generalization" that uses the semantic hierarchy 910 which partly helps solve the problem.

It may be assumed that two classes which are located "close" to each other in the semantic hierarchy 910 have close ratings for "combinability" with other classes and deep slots. For example, if "hammer," "crowbar," "sledgehammer," and other similar tools are often "heavy," it is very probable that any other tool (including those not encountered in the samples) are often qualified as "heavy." This assumption allows the system to evaluate the combinability of a class for which not enough statistics is available via the combinability of its parent.

To evaluate the combinability of a semantic class with a deep slot $$\frac{P(A \cap S)}{P(A) P(S)}$$

when there is not enough statistics, a "simple generalization" is made: the class A' is replaced with its immediate parent in the semantic hierarchy:

$$\frac{P(A' \cap S)}{P(A') P(S)}.$$

The nature of the semantic hierarchy and of the quantity to be computed leads us to believe that calculating errors are negligible.

Next, we evaluate the combinability of the classes A and B if the deep slot is $$\frac{P(A \cap B | S)}{P(A | S) P(B | S)}.$$

For the sake of simplicity, we ignore the division of the tree links according to the various deep slots. Everywhere below in this section we assume that there is only one generalized deep slot S (e.g. a "noun+adjective" combination) and use this slot in our calculations.

To evaluate the combinability of the classes A and B $$\frac{P(A \cap B)}{P(A) P(B)},$$

we could use a "simple generalization" based on one of the classes (e.g. by replacing the class A with its immediate parent, class A'). However, this approach would be asymmetrical as regards the classes A and B. Additionally, all information about the class A would be lost, which may be essential. Therefore, we use a less trivial "partial generalization" approach, which is free of the above drawbacks.

It is easy to see that the "combinability" (logarithm of $$\left. \frac{P(A \cap B)}{P(A) P(B)} \right)$$

is zero for independent classes, is positive for classes that frequently combine, and is negative for classes that usually do not combine. The idea behind the "partial generalization" approach is to expand the combinability of the two classes as a sum of smaller combinabilities, each of which may be evaluated independently, and then substitute with zeros those compatibilities which cannot be evaluated due to lack of data.

Let the considered objects and their corresponding classes be arranged as follows in the semantic hierarchy 910: "HAMMER"->"TOOL"->"OBJECT" and "HEAVY"->"possessing a certain physical property" (each subsequent notion is more general than its predecessor). Suppose we need to evaluate the combinability of "hammer" with the adjective "heavy." The idea is that since we have a semantic hierarchy, we may first consider the "smaller" combinability of "hammer" and "heavy" under an additional constraint: evaluate the combinability only of instruments having a certain physical property rather than the combinability of all objects. This "smaller" combinability is more local, i.e. it does not take into account any words or notions outside the classes "TOOL" or "having a certain physical property" and is independent of them.

The "complete" combinability of the classes A and B can be written as log $$\frac{P(A \cap B)}{P(A) P(B)}$$

and approximately equals log $$\frac{N(A \cap B) N}{N(A) N(B)},$$

where N is the total number of samples. The "smaller" combinability can be written as log $$\frac{P(A \cap B \mid A', B')}{P(A \mid A', B')P(B \mid A', B')}$$

and approximately equals log $$\frac{N(A \cap B)N(A' \cap B')}{N(A \cap B')N(A' \cap B)},$$

where A' and B' are the immediate parents of A and B in the semantic hierarchy. The "complete" combinability of the classes A and B equals the sum of all "smaller" combinabilities of $A_i$ and $B_j$ for all the pairs i and j (where $A_1$, $A_2$, $A_3$, ... are the parents of A in the semantic hierarchy, and $B_1$, $B_2$, $B_3$, ... are the parents of B).

This approach allows the system to arrive at an approximate evaluation of a "combinability" in the absence of sufficient statistics.

Gathering the Statistics

At the stage 420, the statistics are gathered as follows: all the tree links identified in a text corpus with the tagged deep structures are gathered in one array (identical links are grouped together). The array is saved to a file, which can later be used in compiling the statistics.

The main problem lies in obtaining a corpus of correctly tagged texts. As it seems impossible to manually tag a sufficient number of texts to make the statistics reliable, texts are tagged automatically. Tagging is done by the NLC analyzer and is, in fact, the saved results of the syntactic and, in part, semantic analysis operations. All the possible parsing options may be retained, to prevent systematic parsing errors from translating into a similarly systematic error in the statistics. Later on, when the system already has amassed some trained statistics, these statistics may be used to discard unlikely parsing options when gathering new statistics.

Another possible source of correctly tagged texts is a corpus of parallel texts. Supposedly, parallel texts may help resolve a large portion of lexical (and, possible, grammatical) homonymy. However, a significant portion of homonyms will remain unresolved, as in some language pairs, e.g. in English and in Russian, similar homonymy occurs. For example, the list of the senses of "soft" is close to the list of the senses of " мягкий " (Rus.) and the list of the senses of " тяжелый " (Rus.) is close to the list of the senses if "heavy."

Finally, to fine-tune the statistics, manual tagging may be used. When a systematic error is encountered (e.g. a wrong sense for the word "heavy" is selected), the system presents the operator with a list of all the contexts where this word occurs so that the operator may tag the correct senses. For this purpose, the system includes a command which allows the operator, for example, to "tag all instances of "heavy" with lexical meanings from the class "ARTEFACT" as "heavy: WEIGHT"."

The processing of the tree links at the stage 420 consists in generalizing the gathered statistics, computing the "combinabilities" of various generalized classes in the hierarchy. A decision is made as to which of the "combinabilities" are sufficiently different than zero to be stored in memory. It is useful to store only those values for a class in the hierarchy which are significantly different from the corresponding values for its parent. This saves memory resources and increases accuracy, as the combinability values for parents are typically more accurate, having been computed using a greater amount of data. The result is a file containing data which allow the system to evaluate the probability of a tree link, enabling it to select the more probable option if an ambiguity occurs.

Using Domain Statistics

Besides the use of the tree links as described above, another major method of resolving lexical ambiguities at the analysis and synthesis stages is the use of data about the domain to which the text or part of the text belongs (the pragmatic descriptions 940). For example, the system must be aware that in the "Cryptography" domain the word "key" usually means "the code for deciphering encrypted data" rather than anything else. Likewise, at the synthesis stage, the system must be aware that in the "Maritime Transport" domain, the word "kitchen" is never used and "caboose" or "galley" are used instead, even though semantically they are synonymous and the word "kitchen" is much more frequent in lay texts.

To take into account this type of statistics, algorithms may be used similar to those employed for gathering tree-link statistics. Instead of computing "the combinability of a certain semantic class with a certain other semantic class," the system must compute "the combinability of a certain semantic class with a certain domain (pragmatic class)." A separate task is the creation of a corpus of texts or text fragments supplied with pragmatic tags. Manual tagging will most likely produce only a "rough" tagging of classes. More accurate tagging can be achieved automatically, by using predefined marker terms (e.g. the term "rest mass" only occurs in texts related to elementary partide physics). Iterative automated tagging is also possible, when previously tagged texts are used to gather statistics which, in turn, is used to tag further texts, but this approach may result in the snowballing of systematic errors, unless the tagging is verified manually.

Adjusting Statistics Based on a User-Provided Text Corpus

A user of an MT application may amass translations done manually or translations done by an MT system but post-edited by a human translator. Besides, a translator may have many parallel and non-parallel texts belonging to the domains in which he or she specializes. All these texts may be put to good use for MT.

If the user has amassed a sufficiently large amount of texts, they may be used for the full-fledged statistics training as described above. This requires labor-intensive control by the user and regular visual checking on test examples, which is often unrealistic to expect. However, we can limit the use of user-statistics to correcting only systematic errors of the MT application, correcting only systematic translation errors for specific words and word combinations.

For example, a user may have amassed a database of terms which contains multiple rules of the following type: "the word or word combination X when used in a text belonging to domain Y (or to any domain) must always be translated as Z." For example, "to crack a password" should always be translated into Russian as " взломать пароль " (=break-in), or "jet" in texts on aviation must always be translated into Russian as " реактивный " (=jet-propelled). These rules may be simple formulas and may be displayed to the user as a list which the user may edit. e.g. by setting rule priorities, adding new rules, and change the constraints on the domain where the rule applies.

If this approach is used, user-provided material can be used for automated detection of systematic errors (based on the parallel texts) and automated generation of rules of the above type (which the user may edit if required).

First, the corpus of parallel texts is analyzed and all errors are detected (i.e. instances where our system translates differently from the model provided by the parallel texts).

The obtained list of errors is then filtered. First of all, only those errors are retained for which the system has found clear correspondences in the fragments of the two tree structures, one in the original and the other in the model translation. Secondly, those errors are discarded which occur less than a certain predefined threshold N. Other filtering criteria are possible.

For each systematic error, a rule must be created which is a good generalization of the error. Unfortunately, this requires a lot of intellectual skill, as a systematic error in the translation of, say, the word "jet" may be caused by different factors. The following scenario may be used:

If a systematic error in translating the word "jet" may be corrected by adding a domain rule ('the adjective "jet" in texts on aviation should always be translated into Russian as " реактивный "'), then the appropriate rule is created. The domain should always be as wide as possible unless this generalization starts corrupting previously correct translations (i.e. the ideal rule would be 'the adjective "jet" in texts on any subject should always be translated into Russian as " реактивный "').

If a systematic error cannot be corrected in this manner, an attempt should be made to correct it by adding one or more terminological or identifying phrases, e.g. "jet plane" in the case of "jet." Here ambiguities are possible, as in "a jet plane flies" ambiguity in the case of "plane" ("airplane" vs "flat surface") can be resolved by using either the terminological combination "jet plane" or the identifying word combination "plane flies." The best option, perhaps, is to select the more frequent word combination and the one which does not corrupt the previously correct translations.

The training based on user-provided texts must support subsequent additional training as the users text corpus grows. New texts added by the user may lead to a complete change of rules. For example, adding a new set of texts may reveal the fact that the adjective "jet," when used in texts on aviation, may have not one but two correct translations, depending on the noun which it qualifies. For this reason, in the course of additional training based on user-provided texts, all rules must be overhauled. However, as the rules are available for manual editing by the user and as the system may contain rules manually added by the user (for example, if the user is a professional translator who added to the system his/her preferred dictionaries in the form of rules), the old rules should not be removed completely. When additional training is performed, the system marks the rules which contradict the current user text corpus (i.e. "jet" is translated incorrectly) and prompts the user to remove these rules. Separately, a list of new suggested rules is generated.

Using Non-Parallel User-Provided Texts

If the user's corpus of parallel texts is not sufficiently large (perhaps, only translation bureaus are likely to own large corpora of parallel texts), monolingual texts on a given subject may also be used (usually a translator start familiarizing himself/herself with a particular subject by amassing monolingual texts on this subject). Obviously, this type of data is less complete and precise compared to bilingual corpora, but it may prove useful nonetheless.

Similarly to the use of parallel texts provided by the user, an attempt should be made to correct systematic errors made by the application. In the absence of a parallel text, wrong lexical choices made at the analysis stage cannot be identified (i.e. it is impossible to identify which word senses have been selected incorrectly in the case of homonyms). However, synthesis errors can be identified and corrected (i.e. the user may correct the wrong choices made by the system when deciding which word best translates the given notion in the given context). For example, if there are multiple occurrences of "grievous bodily harm" in the texts and no occurrences of "grievous injury," it is probably the former word combination that should be selected when translating texts in this domain. On the whole, the scenario of using monolingual texts provided by the user may be approximately the same as that of using parallel texts.

First, all systematic errors made by the application are detected. To achieve this, each monolingual text is parsed by the analyzer and synthesized again in the same language. If the synthesized result does not coincide with the original text (e.g. if "grievous bodily harm" has become "grievous injury"), the corresponding errors are registered. Next, systematic errors are selected from the overall list of errors.

Next, for each systematic error, a heuristic method is used to create a correcting rule. The rules may be defined as "accepted terms" and look like this: "in texts on elementary particle physics, the word 'mass' is to be preferred to the word 'weight'" or "in texts on any subject, 'grievous bodily harm' is to be preferred to 'grievous bodily injury'."

Lexical Analysis and Lexical-Morphological Analysis

Referring back to FIG. 5, we will describe in detail the stages of the NLC method, noting the ones where statistical and other ratings are possible and useful. The lexical analysis 510 is performed on the source sentence 512 represented in a source/input language, which may be any natural language. In one embodiment, all the necessary language descriptions for the source sentence 512 are created. The source sentence 512 may be divided into a number of lexemes, elements, or units, including all the words, word forms, gaps, spaces, and punctuators, etc. present in the source sentence for building a lexical structure of the sentence. A lexeme is a meaningful linguistic unit that is an item in the vocabulary, such as the lexical-semantic dictionary 1004 of a language.

As shown in FIG. 5B, the lexical-morphological analysis 520 is performed on the source sentence 512. During the lexical-morphological analysis 520 each element of the source sentence 512 are searched in order to find one or more word forms, which is not a space or a punctuator, assign one or more pairs of "lexical meaning-grammatical value" corresponding to each word form, and generate a lexical-morphological structure for the source sentence 512. The lexical-morphological structure of a sentence contains a complete set of pairs of "lexical meaning-grammatical value" for each unit of the lexical structure which is not a space or a punctuator.

The morphological descriptions 501 for the source language (e.g., the word-inflexion description 710 and the word-formation description 730, etc.) are used to provide a set of lexemes for each word form. Each lexeme may correspond to one or more (usually multiple) word forms, one or more corresponding lexical meanings 1012 and grammatical values 1008 obtained from the lexical description 503, and their corresponding grammatical values 1008 obtained from the morphological descriptions 501. The grammatical values 1008 are represented as a set of values of grammatical attributes (expressed in grammemes) of a word form. Examples of these grammatical attributes include, but are not limited to, the part of speech, number, gender, case, etc. A complete set of pairs of "lexical meaning-grammatical value" is generated for each word form in the source sentence 512 and used to build the lexical-morphologic structure for the source sentence 512.

Figure 11:
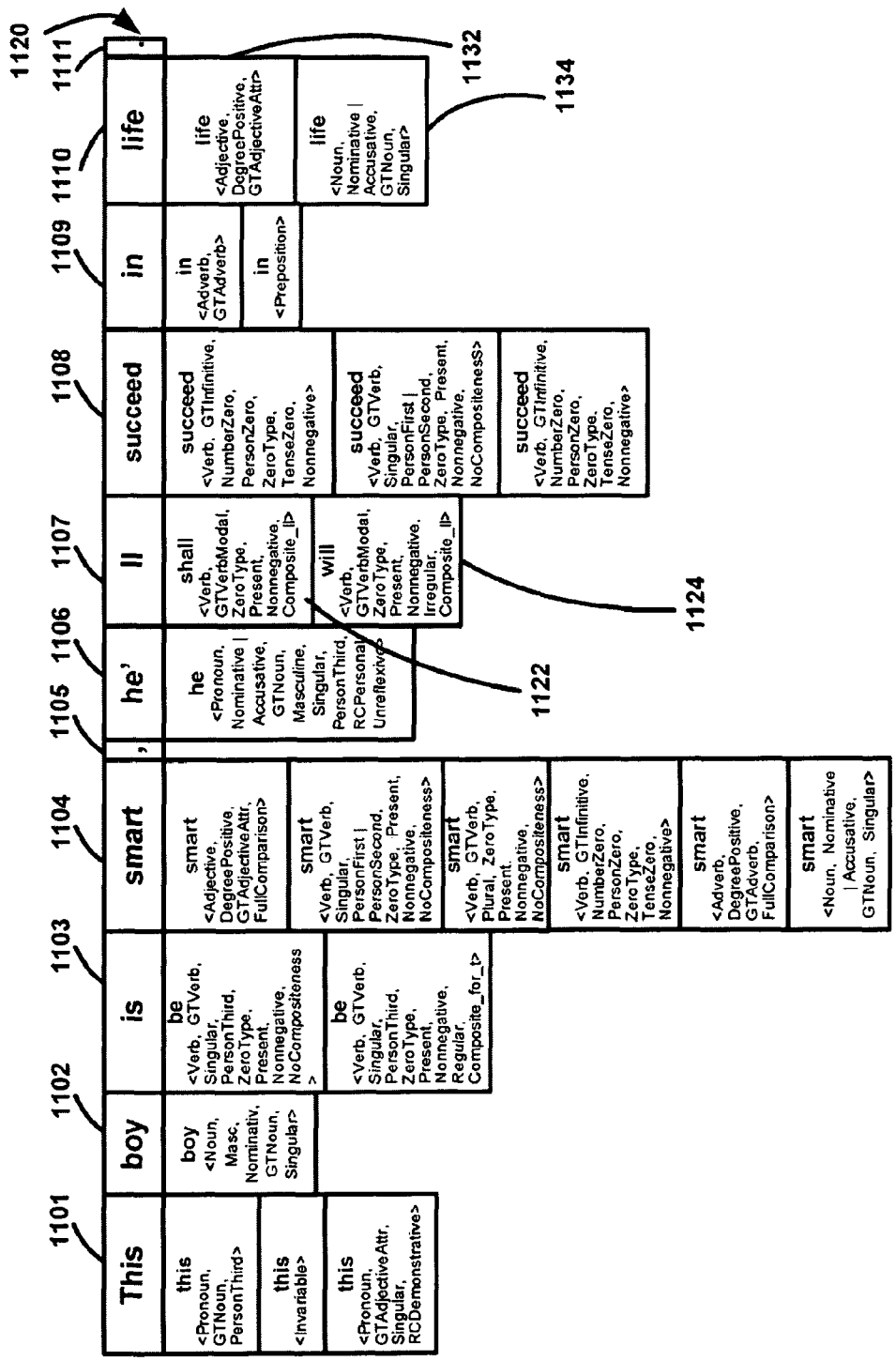
FIG. 11 is a lexical-morphological structure for an exemplary sentence "This boy is smart, he'll succeed in life." according to one embodiment of the NLC method.

FIG. 11 illustrates an example of the lexical-morphological structure for the sentence "This boy is smart, he'll succeed in life." according to one embodiment of the invention. The lexical-morphological structure has a complete set of pairs of "lexical meaning-grammatical value" for each unit of this sentence. For example, "ll" may mean "shall" 1122 and "will" 1124 as its lexical meanings 1012. For the lexical meaning of "shall" 1122, the grammatical values 1008 is <Verb, GTVerbModal, ZeroType, Present, Nonnegative, Composite_II>, as shown in FIG. 11. As another example, the grammatical value 1008 for the lexical meaning "will" 1124 is <Verb, GTVerbModal, ZeroType, Present, Nonnegative, Irregular, Composite_II>.

During the initial stage of the lexical-morphological analysis 520, lemmatization (searching and assigning lexemes) and obtaining pairs of lexical meaning-grammatical value are concurrently made. The lexeme of the word form, its lemma, and morphological grammatical values for all elements for the source sentence 512 are searched and found by using the lexical descriptions 503. If there may be various grammatical values 1008 for a word form found for a single category, the lexical-morphological structure may include all the possible grammatical values 1008 connected by "or".

For example, six pairs of "lexical meaning-grammatical value" are found for the word form "smart", as shown in FIG. 11. As a result, the word form "smart" may have the same lexical meaning of "smart" but six (6) different grammatical values 1008. Depending on its presence in different parts of speech, the word form "smart" may be Adjective, Verb, Adverb, Noun, etc, and there may be three different grammatical values for Verb as the value of the "Part of speech" category, as shown in FIG. 9. As another example, the word form "life" may have two lexical meaning-grammatical value pairs generated having the lexical meaning 1132 of "life" paired with the grammatical value of <Adjective, DegreePositive, GTAdjectiveAttr> and lexical meaning 1134 of "life" paired with <Noun, Nominative|Accusative, GTNoun, Singular>.

In addition, different lexical meanings may correspond to the same lexeme, for example, the lexeme "smart" as an adjective has the following lexical meanings with different semantics (as given, for example, in the Oxford Thesaurus), including 1) "well dressed, well turned out, fashionably dressed, etc."; 2) "fashionable, stylish, high-class, exclusive, chic, fancy, etc."; 3) "clever, bright, intelligent, sharp, sharp-witted, quick-witted, etc.", among others. These different lexical meanings may have different language-independent semantic parents, proper deep models, and proper surface models. During the lexical analysis stage, all these lexical meanings are generalized, but the whole list of these lexical meanings is stored/saved in order to use their surface and deep models for further analysis.

Since every lexical meaning in any given language goes back to the parent semantic class and inherits some its characteristics, a corresponding lexical description 503 with its surface model 810 and deep model 912 can be found in the lexical-semantic dictionary 1004. All the lexical descriptions 503 and the morphological descriptions 501 related to all the lexical meanings 1012 of all word forms of the source sentence 512 are used in the lexical-morphological analysis 520. Once a complete set of pairs of "lexical meaning-grammatical value" for the source sentence 512 are made, merging of the grammatical values 1008 are performed.

Once the lexical-morphological structure is constructed and generalized grammatical values, if generalization/merging is possible, are provided for each word form, a syntactic analysis is performed. The syntactic analysis may be performed in two steps, the rough syntactic analysis 530 and the precise syntactic analysis 540, which are performed bottom-up and top-down, respectively.

Rough Syntactic Analysis

Figure 12:
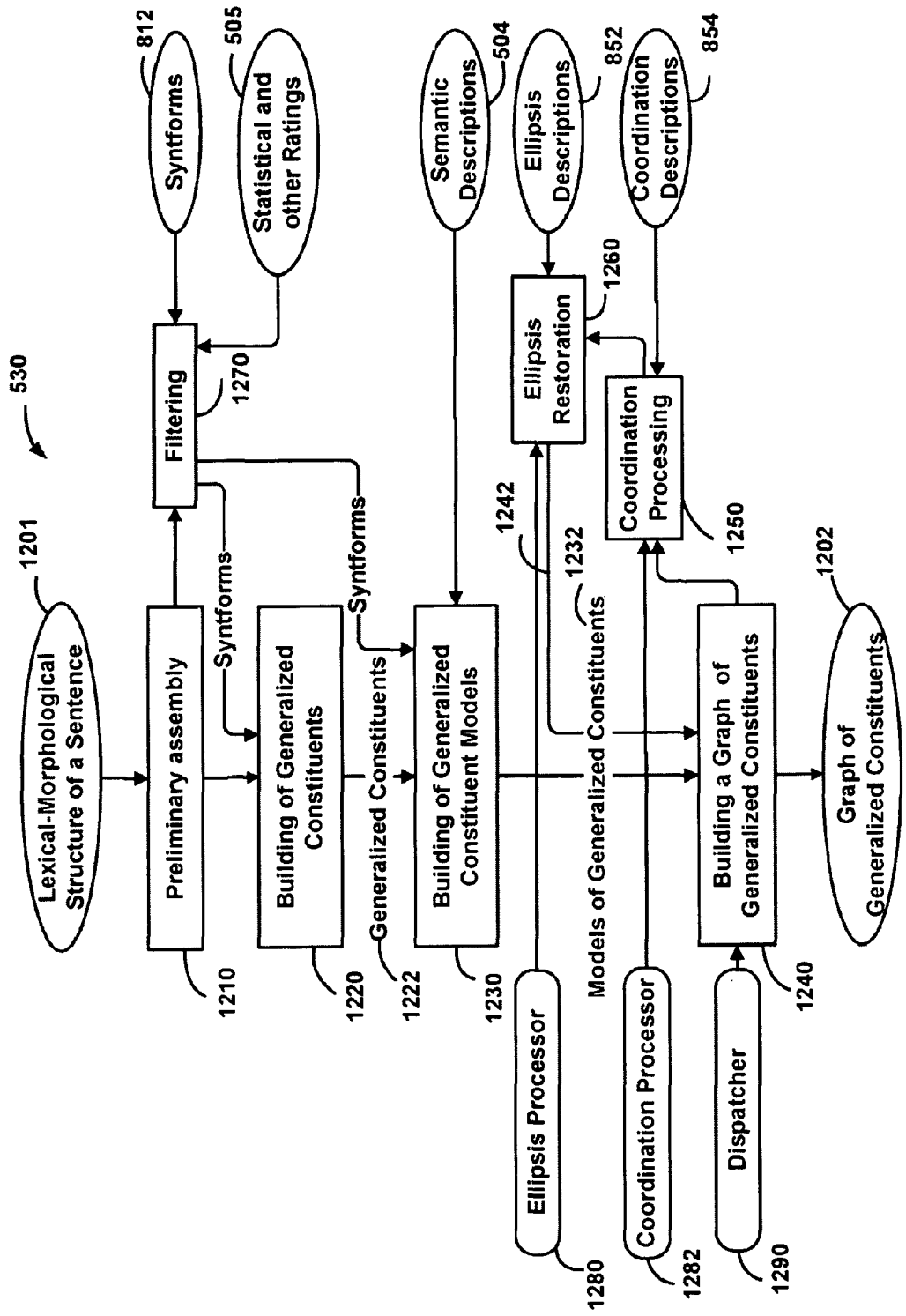
FIG. 12 is a process flow diagram illustrating rough syntactic analysis according to one or more embodiments of the NLC method.

During the rough syntactic analysis, as shown on FIG. 12, a graph 1202 of generalized constituents is build from the lexical-morphological structure 1201 of the source sentence 512. All the possible surface syntactic models for each element of lexical-morphological structure 1201 are applied, and all the possible constituents are built and generalized. A rough syntactic analyzer or its equivalents is adapted to generate the graph 1202 of the generalized constituents from the lexical-morphological structure 1201 using the surface models 810, the deep models 912, and the lexical-semantic dictionary 1004.

In one embodiment, all the possible syntactic descriptions and syntactic structures for the source sentence 512 are considered and generalized. As a result, the graph 1202 of the generalized constituents is built, having each constituent generalized from all the possible constituents for each element of the source sentence 512, and building generalized constituents are performed for all the elements of the source sentence 512. The graph 1202 of generalized constituents reflects, on a surface model level, all hypothetical possible syntactic relationships between the words of the source sentence 512.

To build all possible constituents, every element of the source sentence 512 which is not a space or a punctuator is viewed as a potential core of a constituent. The building of the graph 1202 of generalized constituents starts with building those constituents which have only the core word form and further expands to build constituents of the next level by including neighboring constituents. For each pair of "lexical meaning-grammatical value" which corresponds to a non-trivial arc of lexical-morphological structure, its surface model 810 is initialized, attempting to attach other constituents in the surface slots 815 of the syntforms 812 of its surface model 810 to the right and the left neighboring constituents. If an appropriate syntform 812 is found in the surface model 810 of the corresponding lexical meaning, the selected lexical meaning may be the core of a new constituent.

The building of the graph 1202 of generalized constituents starts with building those constituents which have only the core word form and further expands to build constituents of the next level by including neighboring constituents. For each pair of "lexical meaning-grammatical value" which corresponds to a non-trivial arc of lexical-morphological structure, its surface model 810 is initialized, attempting to attach other constituents in the surface slots 815 of the syntforms 812 of its surface model 810 to the right and the left neighboring constituents. If an appropriate syntform 812 is found in the surface model 810 of the corresponding lexical meaning, the selected lexical meaning may be the core of a new constituent.

The graph 1202 of generalized constituents is first built as a tree, from the leaves to the root (bottom up). Building of additional constituents is performed bottom-up by attaching child constituents to parent constituents via filling the surface slots 815 of parent constituents to cover all the initial lexical units of the source sentence 512.

The root of the tree is the main clause, represented by a special constituent corresponding to various types of maximal units of a text analysis (complete sentences, enumerations, titles, etc.). The core of the main clause is generally a predicate. During this process, the tree actually becomes a graph, because lower-level constituents (the leaves) can be included into different upper-level constituents (the root).

Some of the constituents which are built for the same element of the lexical-morphological structure may be generalized to obtain generalized constituents. Constituents are generalized by the lexical meanings 1012, by the grammatical values 814, for example, by parts of speech, by their boundaries, among others. Constituents are generalized by the boundaries, since there may be very different syntactic relationships in the sentence, and the same word may be included in different constituents. As a result of the rough syntactic analysis 530, the graph 1202 of generalized constituents is built which represents the whole sentence.

FIG. 12 illustrates in further detail the rough syntactic analysis 530 according to one or more embodiments of the invention. The rough syntactic analysis 530 generally includes preliminary assembly 1210 of the constituents, building 1220 of generalized constituents, filtering 1270, building 1230 of generalized constituent models, building 1240 a graph of generalized constituents, coordination processing 1250, and restoring ellipsis 1260, among others.

The preliminary assembly 1210 of the constituents during the rough syntactic analysis 530 is performed on the lexical-morphological structure 1201 of the sentence to be analyzed, including certain word groups, the words in brackets, inverted commas, etc. Only one word in the group (the constituent core) can attach or be attached to constituents outside the group. The preliminary assembly 1210 is performed early during the rough syntactic analysis 530 before building 1220 of generalized constituents and building 1230 of the generalized constituent models to cover all the boundaries of the whole sentence.

Building 1220 of generalized constituents generally require that all possible pairs of the lexical meaning 1012 and the grammatical value 814 are found or assigned for each of the constituents and attach the surface slots of the child constituents thereof to each of the constituents. Lexical units of the source sentence 512 can form into core constituents at bottom levels. Each constituent can be attached to a constituent at a higher level if the surface slots 815 of the constituent at the higher level can be filled. Thus, the constituents are further expanded to include the neighboring constituents built at previous constituent building process until all of the possible constituents have been built to cover the entire sentence.

During rough syntactic analysis 530, the number of the different constituents which may be built and the syntactic relationships among them are considerably large, some of the surface models 810 of the constituents are chosen to be filtered through the process of filtering 1270 prior to and after the building the constituents in order to greatly reduce the number of the different constituents to be considered. Thus, at the early stage of the rough syntactic analysis 530, the most suitable surface models and syntforms are selected on the basis of a priori and statistical rating. Such a priori and statistical rough ratings include ratings of lexical meanings, ratings of fillers, ratings of the correspondence to semantic descriptions, among others.

The filtering 1270 during the rough syntactic analysis 530 include filtering of a set of syntforms 812 performed prior to and during the building 1220 of generalized constituents. The syntforms 812 and the surface slots 815 are filtered a priori, and constituents are filtered after they are built. The process of the filtering 1270 distills out a number of syntforms including, but not limited to, those syntforms that do not correspond to the grammatical values of the constituent, those syntforms where none of the core slots can be filled, those syntforms with special slots which describe grammatical movement, among others. A special slot, such as relativization and question, presupposing a special lexeme (relative or interrogative pronoun), is filtered out if the special lexeme is not present in the sentence.

In general, the syntax forms (syntforms 812) which do not have fillers for at least one surface slot can be filtered and discarded. In addition, those lexical meanings 1012 which do not have syntforms 812 with filled surface slots 815 are filtered and discarded. The rough syntactic analysis 530 is impossible to succeed if there is no syntform and no filled surface slot, and as such the filtering 1270 is performed.

Once all possible constituents are built, the generalization procedure is performed for building 1220 of the generalized constituents. All possible homonyms and all possible meanings for elements of the source sentence which are capable of being present in the same part of a speech are condensed and generalized, and all possible constituents built in this fashion are condensed into generalized constituents 1222.

A generalized constituent 1222 describes all the constituents with all the possible boundaries in a given source sentence which have a word form as the core constituent and various lexical meanings of this word form. Since the constituents are generalized, a single constituent for each lexical meaning corresponding to each entity of a sentence, including homonyms, is built, and their syntactic forms may be analyzed simultaneously.

The building 1230 of generalized constituent models is performed and a set of models 1232 of generalized constituents having generalized models of all generalized lexemes are built. A generalized constituent model of a lexeme contains a generalized deep model and a generalized surface model. A generalized deep model of a lexeme includes the list of all of the deep slots which have the same lexical meaning for a lexeme, together with the descriptions of all the requirements for the fillers of the deep slots. A generalized surface model contains information about the syntforms 812, where the lexeme may occur, about the surface slots 815, about the diatheses 817 correspondences between surface slots 815 and deep slots 914, and about the linear order description 816.

The syntforms 812 and the surface slots 815 that are significant for this lexeme are selected with the help of the bit-mask. In addition, models of the generalized constituents are built because a constituent is generalized not only by lexical meanings and syntactic forms of its core, but also by the fragments it fills. The use of the models of the generalized constituents reduces the number of wrong relationships and helps to optimize the process to extract a syntactic tree so that all possible boundaries are considered.

The generalized diatheses are built during the rough syntactic analysis 530 as the correspondences between generalized surface models and generalized deep models. The list of all possible semantic classes for all the diatheses 817 of the lexeme is computed for each surface slot 815.

As shown in FIG. 12, information from the syntforms 812 of the syntactic descriptions 502 as well as the semantic descriptions 504 are used to build the models 1232 of the generalized constituents. For example, dependent constituents are attached to each lexical meaning of a sentence unit and the rough syntactic analysis 530 may also need to determine whether a "candidate" constituent as a dependent constituent can be a filler of the corresponding deep slot of the deep model 912 for a core constituent. Such compatibility analysis allows the wrong syntactic relationships to be discarded early.

The building 1240 of the graph of the generalized constituents is performed. The graph 1202 of generalized constituents which describes all possible syntactic structures of the entire sentence is built by linking and assembling the generalized constituents 1222 to each other. The building 1240 of the graph of the generalized constituents is organized via generating and processing of the queue of requests to attach one constituent to another constituent. In general, contact pairs of constituents representing contact groups of words in the sentence can be included in the request queue.

A constituent can be attached to different surface slots of another constituent and a child constituent can be attached to different parent constituents. In each case, a request for attachment of one constituent to another constituent can be generated. The requests can be processed by a subsystem, such as a dispatcher 1290. If attachment to the selected surface slot is performed or found impossible, the request is removed from the queue of active request of the dispatcher 1290.

The dispatcher 1290 or any devices, systems, computer-readable media, adapted to perform the building 1240 of the graph of the generalized constituents can wait and search for new constituent pairs in order to put these constituent pairs into the dispatcher queue, such as by keeping the right and left directions of the neighboring constituents of a constituent. For example, during attaching a child constituent to the parent constituents, the left constituent pair of the child constituent is added to the left of the parent constituent and the right constituent pair of the child constituent is added to the right of the parent constituent.

As shown in FIG. 12, the coordination processing 1250 is also performed on the graph 1202 of the generalized constituents. Coordination is a language phenomenon which is presented in sentences with enumeration and/or a coordinating conjunction, such as "and", "or", "but", etc. A simple example of a sentence with coordination—"John, Mary and Bill came home." In this case only one of coordinated child constituent is attached in the surface slot of a parent constituent during building 1240 the graph of the generalized constituents. If a constituent, which may be a parent constituent, has a surface slot filled for a coordinated constituent, all coordinated constituents are taken and an attempt is made to attach all these child constituents to the parent constituent, even if there is no contact or attachment between the coordinated constituents. During coordination processing 1250, the linear order and multiple filling possibility of the surface slot are determined. If the attachment is possible, a proform which refers to the common child constituent is created and attached. As shown in FIG. 12, the coordination processor 1282 or other algorithms, devices, and computer subsystems can be adapted to perform the coordination processing 1250 using coordination descriptions 852 in the building 1240 of the graph of generalized constituents.

The building 1240 of the graph of the generalized constituents can be impossible without ellipsis restoration 1260. Ellipsis is a language phenomenon which is represented by the absence of core constituents. Ellipsis can also be related with coordination. The process of the ellipsis restoration 1260 is also needed to restore a missing constituent. An example of an elliptical English sentence is "The president signed the agreement and the secretary [signed] the protocol." As discussed above, the ellipsis restoration 1260 can be used to generate the new request and new constituent pairs.

As shown in FIG. 12, the ellipsis processor 1280 or other algorithms, devices, and computer subsystems can be adapted to perform the ellipsis restoration 1260. In addition, the ellipsis descriptions 852 which contain proform models can be adapted to aid the ellipsis processor 1280 and process core ellipsis to build the graph 1202 of generalized constituents. Proforms may be auxiliary elements inserted into a sentence when establishing non-tree links. A proform model may include templates (patterns) of syntforms. These proform templates determine the required surface slots and their linear order. All constituents in the sentence for each proform are searched and the possibility to attach the constituent to the first of the required slots of the syntform-template is determined.

The coordination processing 1250 and the ellipsis restoration 1260 are performed during each program cycle of the dispatcher 1290 after the building 1240 of the graph of the generalized constituents and the building 1240 may continue, as indicated by an arrow of returning back 1242. If the ellipsis restoration 1260 is needed and called upon during the rough syntactic analysis 530 due to, for example, the presence of constituents left alone without any parent constituents being attached to, only these constituents are processed.

The dispatcher 1290 stops when the active request queue is empty and cannot be refilled. The dispatcher 1290 can be a device, system, or algorithm, which keeps all the information about the constituents that have been modified. A constituent is considered modified if changes have been introduced to any of its properties which describe the sub-tree, including boundaries and the set of pre-child constituents. In addition, during the building 1240 of the generalized constituents 1222, clause substitution is performed. Clauses for direct speech and proper names are substituted.

Figure 13:
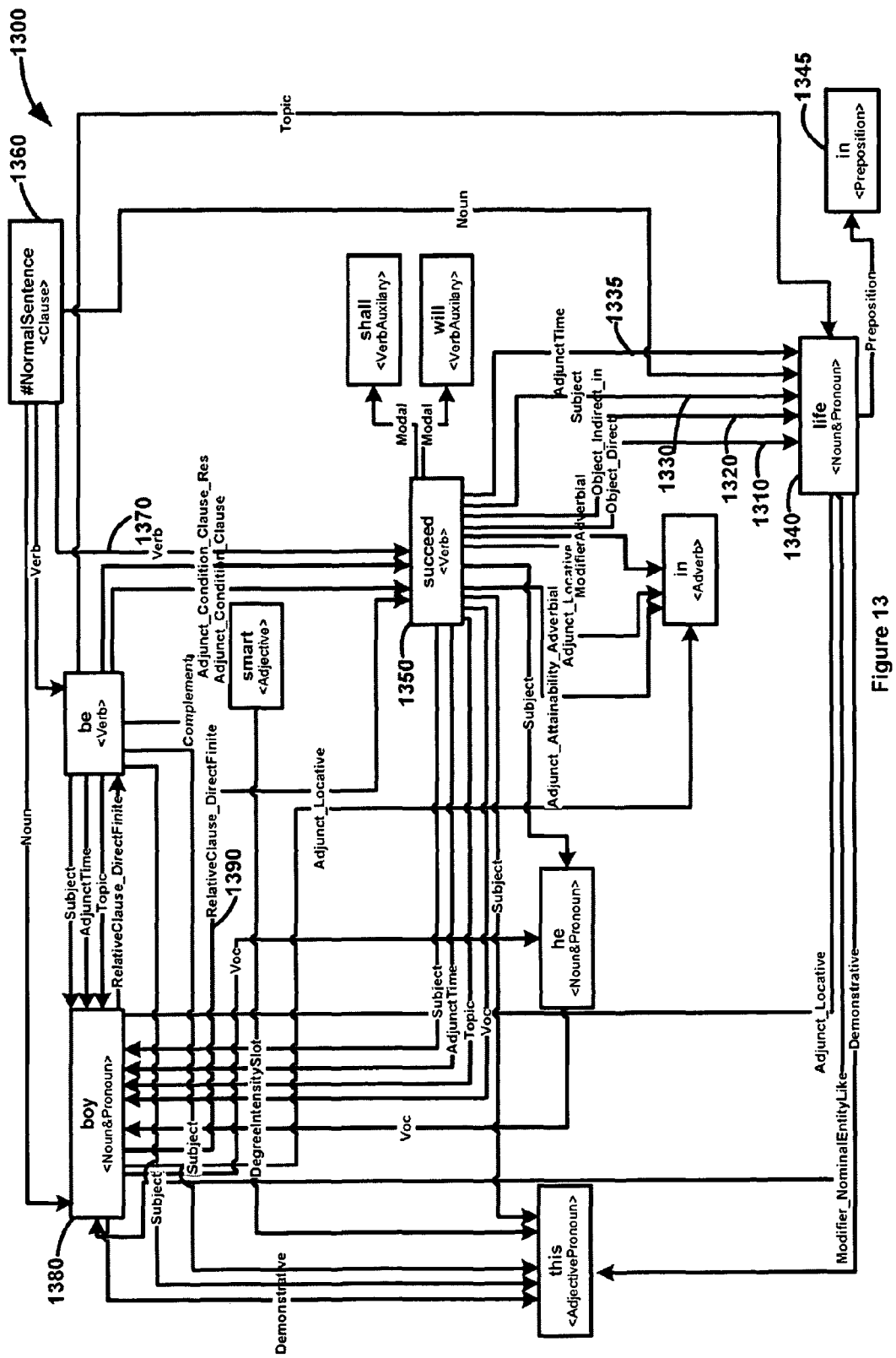
FIG. 13 is an exemplary graph of generalized constituents for the sentence "This boy is smart, he'll succeed in life." according to one embodiment of the NLC method.

FIG. 13 is an example of a graph 1300 of generalized constituents for the sentence "This boy is smart, he'll succeed in life." The constituents are represented by rectangles, each constituent having a lexeme as its core. Morphological paradigm (as a rule, the part of speech) of a constituent core is expressed by grammemes of the part of speech and displayed in broken brackets below the lexeme. A morphological paradigm as a part of word-inflection description 710 of morphological description 501 contains all information about word-inflection of one or more part of speech. For example, since "life" can have two parts of speech: <Adjective> and <Noun> (which is represented by the generalized morphological paradigm <Noun&Pronoun>), two constituents for "life" are shown in the graph 1300.

Links in the graph 1300 represent filled surface slots of constituent cores. Slot names are displayed on the arrows of the graph. Any constituent is formed by a lexeme-core which may have outgoing named arrows which denotes surface slots 815 filled by child constituents. An incoming arrow means attaching this constituent to a surface slot of another constituent. The graph 1300 is so complicated and has so many arrows, because it shows all relationships which can be established between constituents of the sentence "This boy is smart, he'll succeed in life." Among them there are many relationships in the graph 1300 which, however, will be discarded. A value of said rough rating is saved by each arrow denoting a filled surface slot. Surface slot and relationships with high rating scores are selected hierarchically during the next step of syntactic analysis.

Often several arrows may connect the same pairs of constituents. It means that there are different acceptable surface models for this pair of constituents, and several surface slots of the parent constituent may be independently filled by this child constituent. So, four surface slots named Object_Direct 1310, Object_Indirect_in 1320, Subject 1330 and Adjunct-Time 1335 of the parent constituent "succeed<Verb>" 1350 may be independently filled by the child constituent "life<Noun&Pronoun>" 1340 in accordance with surface model of the constituent "succeed<Verb>". Thus, roughly speaking "in <Preposition>" 1345 and "life<Noun&Pronoun>" 1340 form a new constituent with the core "life" and it, in turn, form with "succeed<Verb>" 1350 four variants of another new constituents with the core "succeed<Verb>" which is attached to another parent constituent, for example, to #NormalSentence<Clause> 1360 in the surface slot Verb 1370, and to "boy<Noun&Pronoun>" 1390 in the surface slot RelativClause_DirectFinite 1390 The marked element #NormalSentence<Clause>, being the "root", corresponds to the whole sentence.

Precise Syntactic Analysis

Figure 14:
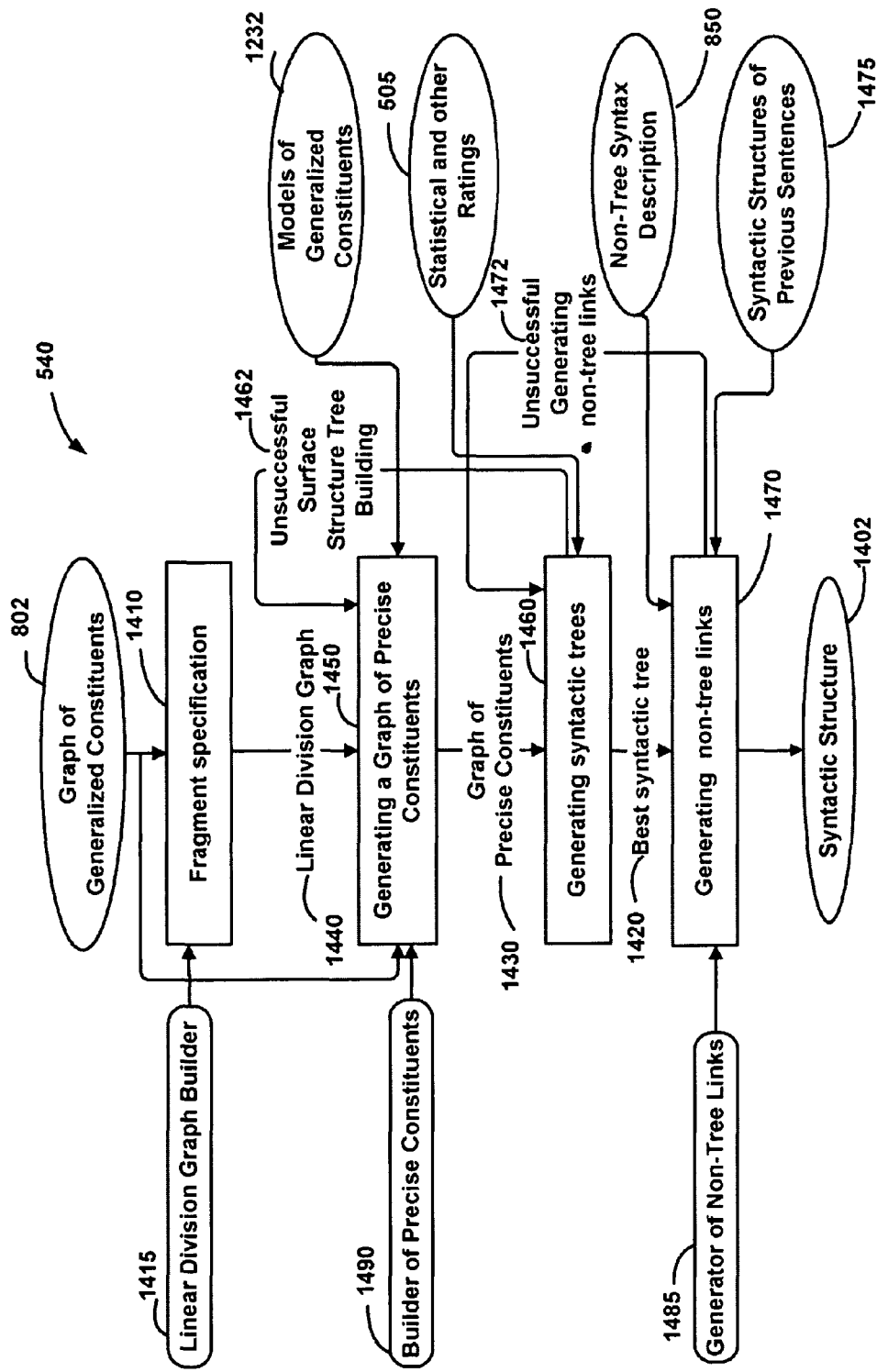
FIG. 14 is a process flow diagram illustrating precise syntactic analysis according to one or more embodiments of the NLC method.

FIG. 14 illustrates in detail the precise syntactic analysis 540 performed to select the best syntactic structure 1402 according one or more embodiments of the invention. The precise syntactic analysis 540 is performed top-down from the higher levels to the bottom lower levels, from the node of the potential top of the graph 1202 of the generalized constituents down to its bottom-level child constituents.

The precise syntactic analysis 540 is performed to build a syntactic tree, which is a tree of the best syntactic structure 1402, for the source sentence. Many syntactic structures can be built and the most probable syntactic structure is obtained as the best syntactic structure 1402. The best syntactic structure 1402 is obtained on the basis of calculating ratings using a priori and statistical ratings 1466 from the graph 1202 of the generalized constituents. The statistical ratings may be obtained through a process of preliminary gathering and processing of statistics, as shown in FIG. 4. The a priori and statistical ratings 1466 may include ratings of the lexical meanings, such as frequency (or probability), ratings of each of the syntactic constructions (e.g., idioms, collocations, etc.) for each element of the sentence, and the degree of correspondence of the selected syntactic constructions to the semantic descriptions of the deep slots 914. During precise syntactic analysis 540 hypotheses about the overall syntactic structure of the sentence and its parts are generated and precise rating scores of such hypotheses are computed and stored.

Each hypothesis about the overall syntactic structure of the sentence is represented by a tree which is a subgraph of the graph 1202 of the generalized constituents to cover the entire sentence, and rating is computed for each syntactic tree. During the precise syntactic analysis 540, hypotheses about the syntactic structure of the source sentence are verified by calculating several types of ratings. These ratings are computed as the degree of correspondence of the fillers of the surface slots 815 of the constituent to their grammatical and semantic descriptions, such as grammatical restrictions (e.g., the grammatical values 814) in the syntforms 812 and semantic restrictions on the fillers of the deep slots 914 in the deep models 912. Another types of ratings are the degree of correspondence of the lexical meanings 1012 to the pragmatic descriptions 940, which may be absolute and/or relative probability ratings of the syntactic constructions as denoted by the surface models 810, and the degree of compatibility of their lexical meanings, among others. Some of these ratings may be obtained through a process of preliminary gathering and processing of statistics as shown in FIG. 4.

The computed rating scores for each hypothesis may be obtained on the basis of rough ratings found during the rough syntactic analysis 530. For example, a rough assessment is made for each generalized constituent in the graph 1202 of the generalized constituents and ratings scores can be computed. There are special rules in NLC which may assign a "bonus" or a "penalty" to a lexical meaning or a syntactic construction. These bonuses and penalties are also taken into account during computing rating scores. Various syntactic trees can be built with different ratings. Rating scores are obtained, and these computed rating scores are used to generate hypotheses about the overall syntactic structure of the sentence. To achieve this, the hypotheses with the highest rating are selected. These hypotheses are generated by advancing hypotheses about the structure of the child constituents which are most probable in order to obtain the most probable hypothesis about the overall syntactic structure of the sentence. Ratings are performed during precise syntactic analysis until a satisfactory result is obtained and a best syntactic tree having highest rating can be built.

Those hypotheses with the most probable syntactic structure of a whole sentence can also be generated and obtained. From syntactic structure 1402 variants with higher ratings to syntactic structure 1402 variants with more lower ratings, syntactic structure hypotheses are generated during precise syntactic analysis until a satisfactory result is obtained and a best syntactic tree which has the highest possible rating can be built.

The best syntactic tree is selected as the syntactic structure hypothesis with the highest rating value available from the graph 1202 of the generalized constituents. This syntactic tree is considered as the best (the most probable) hypothesis about the syntactic structure of the source sentence 512. Non-tree links in the tree are assigned, and accordingly, the syntactic tree is transformed into a graph as the best syntactic structure 1402, representing the best hypothesis about the syntactic structure of the source sentence 512. If non-tree relationships cannot be assigned in the selected best syntactic tree, the syntactic tree with the second-best rating is selected as the best syntactic tree for further analysis.

When the precise syntactic analysis 540 is unsuccessful or the most probable hypotheses cannot be found after initial precise syntactic analysis, returning back 544 denoting unsuccessful syntactic structure building from the precise syntactic analysis 540 back to the rough syntactic analysis 530 is provided and all syntforms, not just the best syntforms, are considered during the syntactic analysis. If no best syntactic trees are found or the system has failed to define non-tree relationships in all the selected "best" trees, additional rough syntactic analysis 530 may be performed taking into consideration "bad" syntform which were not analyzed before for the method of the invention.

As shown in FIG. 14, the precise syntactic analysis 540 may contain various stages, including a preliminary stage, a stage 1450 for generating a graph of precise constituents, a stage 1460 for generating syntactic trees and differential selection of the best syntactic tree, a stage 1470 for generating non-tree links and obtaining a best syntactic structure, among others. The graph 1202 of generalized constituents is analyzed during the preliminary stage which prepares the data for the precise syntactic analysis 540.

The preliminary stage of the precise syntactic analysis 540 may include fragment specification 1410 and generating 1450 of a graph of precise constituents to obtain a graph of linear division 1440 and a graph of precise constituents 1430, respectively. A linear divisional graph builder 1415 and builder 1490 of precise constituents may be adapted to process the fragment specification 1410 for obtaining the graph of linear division 1440 and the graph of precise constituents 1430. In addition, the models 1232 of the generalized constituents can be used during the building 1450 of the graph of precise constituents.

During the precise syntactic analysis 540, the precise constituents are built recursively. Proper constituents are generated backwardly and recursively. The precise constituents are built from the generalized constituents 1222 to initially perform the fragment specification 1410 thereon. The building 1450 of the graph of precise constituents may include reviewing the graph 1440 of linear division, recursively building the graph 1430 of the precise constituents which may contains fixed but not yet filled child slots, recursive performing the fragment specification 1410 for each graph arc lying on the way, and recursive filling a child slot to attach a child precise constituent built previously, among others. The generalized constituents 1222 are used to build the graph 1430 of precise constituents for generating one or more trees of precise constituents. For each generalized constituent, its possible boundaries and its child constituents are marked.

The stage 1460 for generating the syntactic trees is performed to generate the best syntactic tree 1420. The stage 1470 for generating non-tree links may use the rules of establishing non-tree links and the information from syntactic structures 1475 of previous sentences to analyze one or more best syntactic trees 1420 and select the best syntactic structure 1402 among the various syntactic structures. A generator 1485 for generating non-tree links is adapted to perform the stage 1470.

As shown in FIG. 14, the fragment specification 1410 of the precise syntactic analysis 540 is performed initially to consider various fragments which are continuous segments of a parent constituent. Each generalized child constituent can be included into one or more parent constituent in one or more fragments. The graph of linear division 1440 (GLD) can be built as the result of the fragment specification 1410 to reflect the relationships of the parent constituent fragments with the core and child constituents. Additionally, the surface slot for the corresponding child constituents is assigned. The graph of linear division 1440 is the framework for building the graph 1430 of precise constituents. Precise constituents are nodes of the graph 1430 and one or more trees of precise constituents are generated on the basis of the graph 1430 of precise constituents.

The graph 1430 of precise constituents is an intermediate representation between the graph 1202 of generalized constituents and syntactic trees. Unlike a syntactic tree, the graph 1430 of precise constituents can still have several alternative fillers for a surface slot. The precise constituents are formed into a graph such that a certain constituent can be included into several alternative parent constituents in order to optimize further analysis for selecting syntactic trees. Such an intermediate graph structure is rather compact for calculating structural ratings.

During the recursive stage 1450 for generating the graph of the precise constituents, the precise constituents are built traversally on the graph 1440 of linear division via the left and right boundaries of the core constituents. For each built path on the graph 1440 of linear division, the set of syntforms is determined; linear order is checked (verified) and rated for each of the syntforms. Accordingly, a precise constituent is created for each of the syntforms, and the building of precise child constituents is recursively initiated.

When a precise child constituent is built, an attempt is made to attach the precise child constituent to the precise parent constituent. When attaching child constituents, restrictions which the child constituents impose on the set of meanings of a parent constituent are taken into account, and the upper lexical rating of the link is computed. When trying to attach each child constituent, two types of restrictions, which are represented by means of bit masks, are formed: the restriction (mask) on grammatical values of the parent constituent, which is received with the help of the agreement rule, and the restriction (mask) on grammatical values of the child constituent, which is received with the help of the agreement or government rule. For each description of a deep slot which may have diathesis correspondence to the current surface slot, the following restrictions are obtained: the restriction on the lexical meanings of the parent constituent, the restriction on the possible lexical meanings of the child constituent and the restriction on the preferred lexical meanings of the child constituent (the set of preferred semantic classes in the description of the deep slot). Additionally, deep rating is obtained as a degree of conformity of the deep slot with these restrictions.

If there is a suitable identifying word combination in the sentence, for example, an idiom, which meets the restriction on parent lexical meanings, the rating of word combination is added to the deep rating. If none of the lexical meanings of child constituent meets the deep restrictions of this deep slot, attachment to this deep slot is impossible. Then, the possibility of attachment to the other deep slots is checked. A deep slot which has the maximal value of the deep rating is selected.

The masks of grammemes for all child constituents which could be attached are merged. The mask on grammatical values of the parent constituent is used for calculating its grammatical value. For example, when child constituents are attached, the grammatical value of the syntactic form according to its correspondence with the child constituents is defined more precisely.

Coordination is also processed when a child constituent attached during the stage 1450. For slots filled by coordination, there exists a need to check that not only the apex of coordination can be attached but its other components as well.

Additionally, ellipsis is also processed when a child constituent attached during the stage 1450. Surface slots which are required in the syntform and do not permit ellipsis may be empty. In this case, when generating a precise constituent, a proform is placed in the empty slot.

As result of the stage 1450, the graph of the precise constituents 1430, which covers the whole sentence, is built. If the stage 1450 for generating the graph of the precise constituents has failed to produce the graph of the precise constituents 1430 which would cover the entire sentence, a procedure which attempts to cover the sentence with syntactically-separate fragments is initiated. In this case, a dummy (fictitious) generalized constituent is generated, where all generalized constituents of the sentence may be attached.

As shown in FIG. 14, when the graph of precise constituents 1430, which covers the sentence, was built, one or more syntactic trees can be generated at the step of generating 1460 during the precise syntactic analysis 540. Generating 1460 of the syntactic trees allows generating one or more trees with a certain syntactic structure. Since surface structure is fixed in a given constituent, adjustments of structural rating scores, including punishing syntforms which are difficult or do not correspond to the style, or rating the communicative linear order, etc., may be made.

The graph of precise constituents 1430 represents several alternatives according to different fragmentation of the sentence and/or different sets of surface slots. So, the graph of precise constituents represents a set of possible trees—syntactic trees, because each slot can have several alternative fillers. The fillers with the best rating may form a precise constituent (a tree) with the best rating. Thus the precise constituent represents unambiguous syntactic tree with the best rating. At the stage 1460, these alternatives are searched and one or more trees with a fixed syntactic structure are built. Non-tree links in the built trees are not defined yet. The result of this step is a set of best syntactic trees 1420 which have the best rating values.

The syntactic trees are built on the basis of the graph of precise constituents. For these precise constituents, syntactic forms, the boundaries of the child constituents and the surface slots are determined. The different syntactic trees are built in the order of descending of their structural rating. Lexical ratings cannot be fully used because their deep semantic structure is not defined yet. Unlike the initial precise constituents, every resulting syntactic tree has a fixed syntactic structure, and every precise constituent in it has only one filler for each surface slot.

During the stage 1460, the best syntactic tree 1420 may generally be built recursively and traversally from the graph 1430 of precise constituents. The best syntactic subtrees are built for the best child precise constituents, syntactic structure is built on the basis of the given precise constituent, and child subtrees are attached to the generated syntactic structure. The best syntactic tree 1420 can be built, for example, by selecting a surface slot with the best quality among the surface slots of a given constituent and generating a copy of a child constituent whose sub-tree is the best quality sub-tree. This procedure is applied recursively to the child precise constituent.

On the basis of each precise constituent, the best syntactic tree with a certain rating score can be generated. This rating score can be computed beforehand and specified in the precise constituent. After the best syntactic tree is generated, a new precise constituent is generated on the basis of the previous precise constituent. This new precise constituent in its turn generates a syntactic tree with the second-best value of the rating score. Accordingly, on the basis of the precise constituent, the best syntactic tree may be obtained, and a new precise constituent may be built.

For example, two kinds of ratings can be kept for each precise constituent during the stage 1460, the quality of the best syntactic tree which can be built on the basis of this precise constituent, and the quality of the second-best syntactic tree. Also, the rating of the precise constituent includes the rating of the best syntactic tree which can be built on the basis of this precise constituent.

The rating of a syntactic tree may be computed on the basis, but not limited to, of the following values: structural rating of the constituent; upper rating for the set of lexical meanings; upper deep rating for child slots; ratings of child constituents, etc. When a precise constituent is analyzed to compute the rating of the syntactic tree which can be generated on the basis of the precise constituent, child constituents with the best rating are analyzed in every surface slot.

During the stage 1460, rating calculation for the second-best syntactic tree differs, but not limited to, in the fact that for one of the child slots, its second-best child constituent is selected. Any syntactic tree with a minimal rating loss relative to the best syntactic tree must be selected during this stage 1460.

When the stage 1460, additional restrictions on constituents may be taken into account. Each precise constituent which gets into the best tree may be checked for additional restrictions. If a constituent or one of its child constituents does not meet the restrictions, the constituent may receive a mark that its best tree does not meet the additional restrictions. A check may be performed to determine whether this subtree meets the additional restrictions.

The rules of additional restrictions are checked during the stage 1460 to make sure whether a constituent meets the restrictions but also suggest the steps which should be taken in certain slots so that the constituent will meet the restrictions. This approach can also significantly increase task-orientation of the search. The restrictions used during the stage 1460 can be defined for any surface slot and the corresponding deep slot. On the basis of the specified restrictions, the difference in quality between the best and second-best tree for this surface slot is computed. As a result, a generation method is provided whereby a tree which meets the additional restrictions can be found as soon as possible.

Near the end of the stage 1460, a syntactic tree with a fully-defined syntactic structure is built, i.e. the syntactic form, child constituents and surface slots that they fill are defined. Since this tree is generated on the basis of the best hypothesis about the syntactic structure of the initial sentence, this tree is called the best syntactic tree 1420. The returning back 1462 from generating 1460 the syntactic trees to the building 1450 of the graph of precise constituents is provided when there are no syntactic trees with satisfactory rating generated, or the precise syntactic analysis is unsuccessful.

Figure 15:
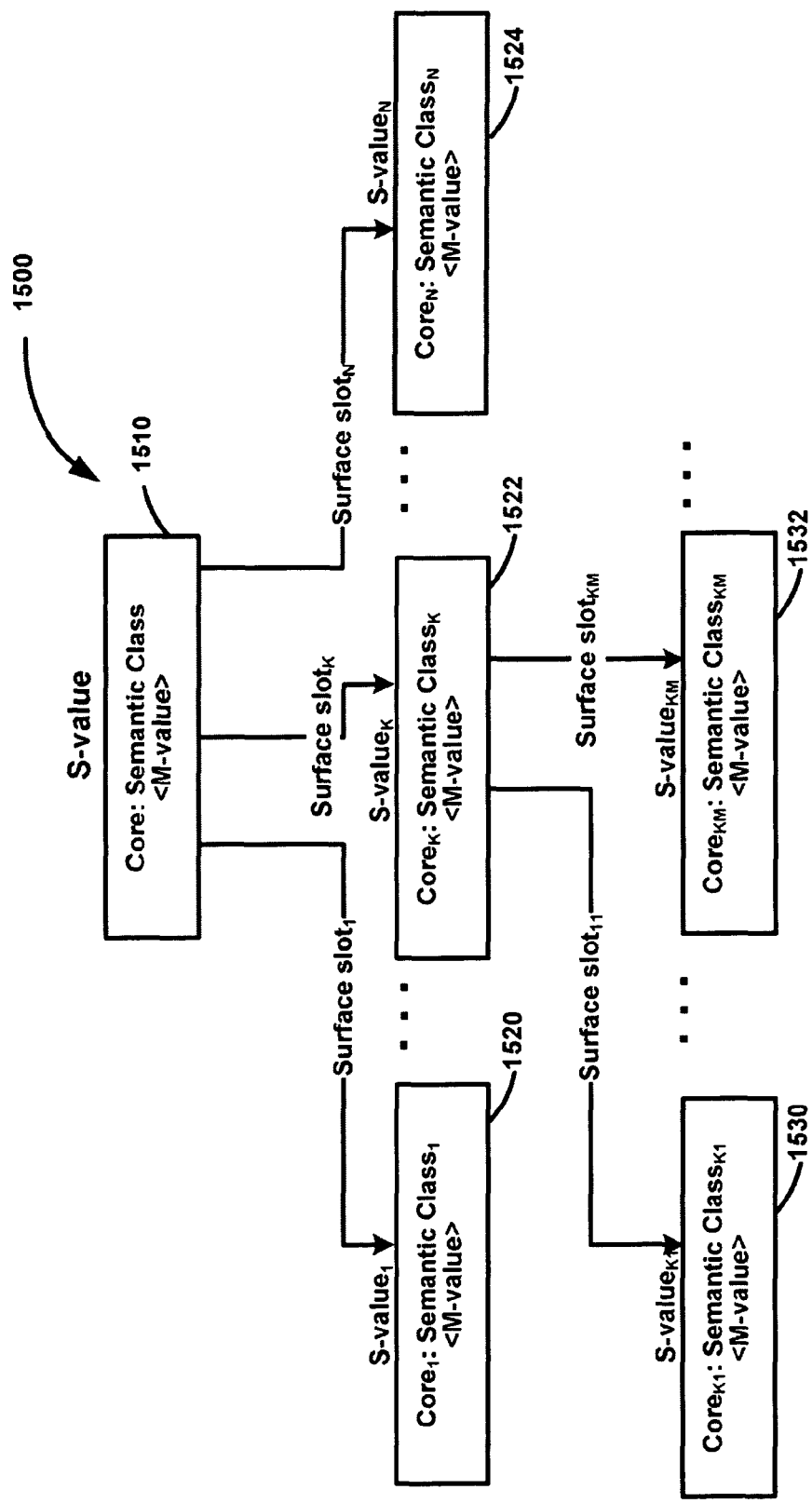
FIG. 15 is an exemplary schematic representation of a syntactic tree according to one embodiment of the NLC method.

FIG. 15 illustrates schematically an exemplary syntactic tree according to one embodiment of the invention. In FIG. 15, constituents are shown as rectangles, arrows show filled surface slots. A constituent has a word at its core (Core) with its morphological value (M-value) and semantic parent (Semantic class) and can have smaller constituents of the lower level attached. This attachment is shown by means of arrows named Surface Slot. Each constituent has also a syntactic value (S-value), expressed as the grammemes of the syntactic categories thereof. These grammemes are the properties of the syntactic forms selected for the constituent during the precise syntactic analysis 540.

Figure 16:
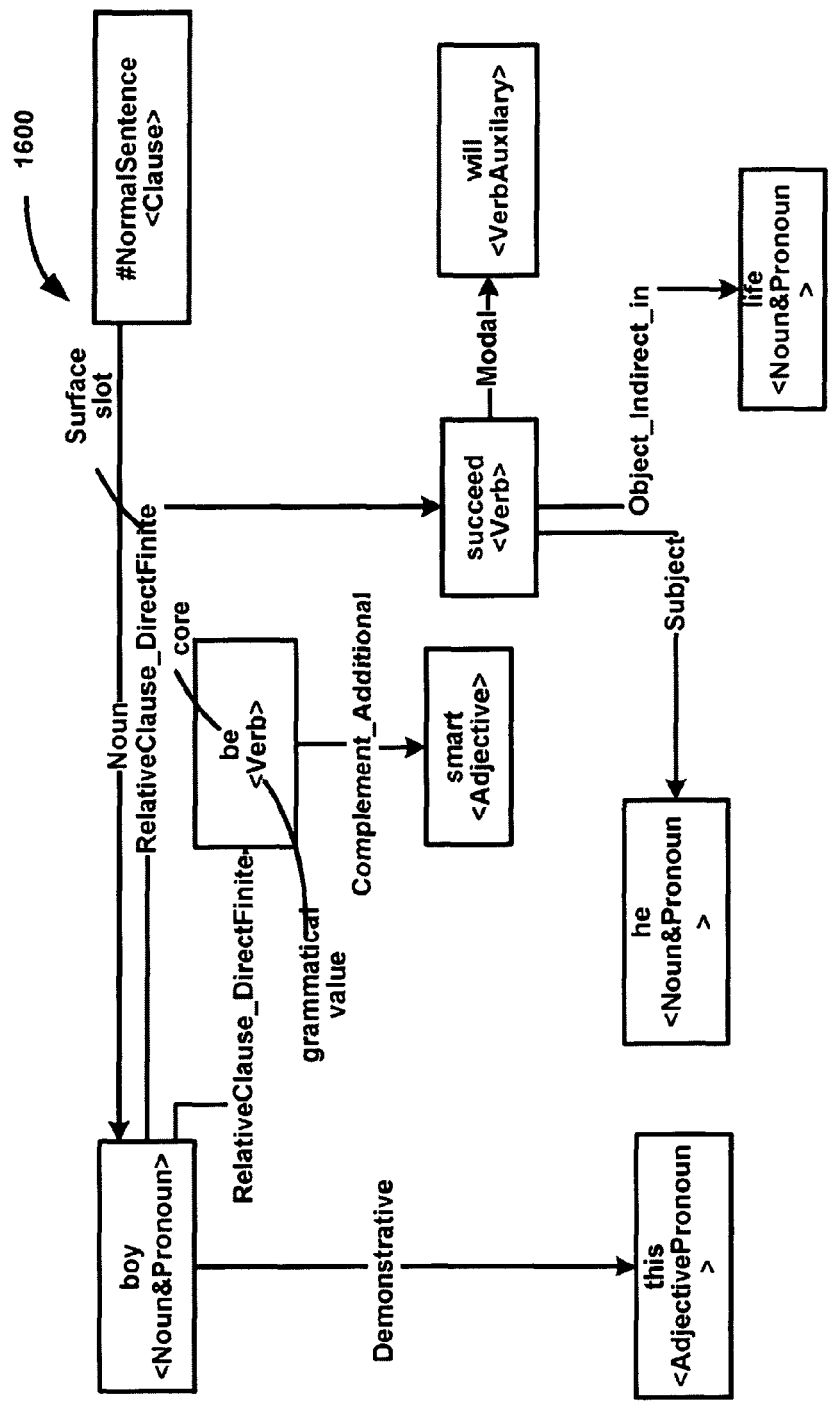
FIG. 16 is an exemplary syntactic tree of the above mentioned sentence "This boy is smart, he'll succeed in life."

FIG. 16 is an example of syntactic tree of the above mentioned sentence "This boy is smart, he'll succeed in life." This syntactic tree is first generated as a result of stage 1460 of generating syntactic trees of the precise syntactic analysis 540 performed on the graph 1300 of the generalized constituents shown in FIG. 13, and can be represented as a subgraph of the graph 1300 of the generalized constituents, according to one or more embodiments of the invention.

A rectangle shows a constituent with the selected lexical meaning of the core and its morphological paradigm in broken brackets, for example, Verb or Noun&Pronoun. The root of the syntactic tree 1600 is a particular value #NormalSentence, which serves as a clause value. The arrows are marked by the names of the surface slots, such as Modal, Verb, Subject, Demonstrative, etc., and for some of the surface slots, the corresponding rating scores are shown.

During the stage 1470, non-tree links are specified for the best syntactic tree 1420. Since, as a rule, non-tree links appear on the syntactic tree, and it is not a tree anymore, it is called a syntactic structure after the stage 1470. Since many different non-tree links may be specified, several syntactic structures with defined non-tree links, i.e. with a fully-defined surface structure, may be obtained. The stage 1470 may result a syntactic structure 1402 with the best rating—the best syntactic structure. During the stage 1470, proforms are inserted into the best syntactic tree 1420, non-tree links are specified, such as by performing ellipsis description 852 and coordination description 854. Additionally, the grammatical agreement between each element of the sentence, which may be as a relationship of control, for example, a controller and a controlled element, using the referential and structural control description 856, is checked. Additionally, syntactic structures 1475 of previous sentences may be used.

Non-tree links are established on the best syntactic tree 1420—the tree of constituents with unambiguously fixed fillers of child slots. However, during the stage 1470, many different non-tree links for the syntactic tree, which may be the best at the current moment, can be generated. Accordingly, several different syntactic structures with non-tree links may be built for each syntactic tree. These syntactic structures or syntactic structure variants generated from different syntactic trees may vary in the inserted proforms, their positions in the tree, and non-tree links. To be able to define an antecedent in the previous text, several of the syntactic structures 1475 of previous sentences from the previous syntactic analysis can be saved. The syntactic structure with the best rating is selected as the best syntactic structure 1402. If the stage 1470 is unsuccessful, the returning back 1472 to the stage 1460 is provided to obtain the next-best syntactic tree 1420 with the next value of rating score.

Figure 17:
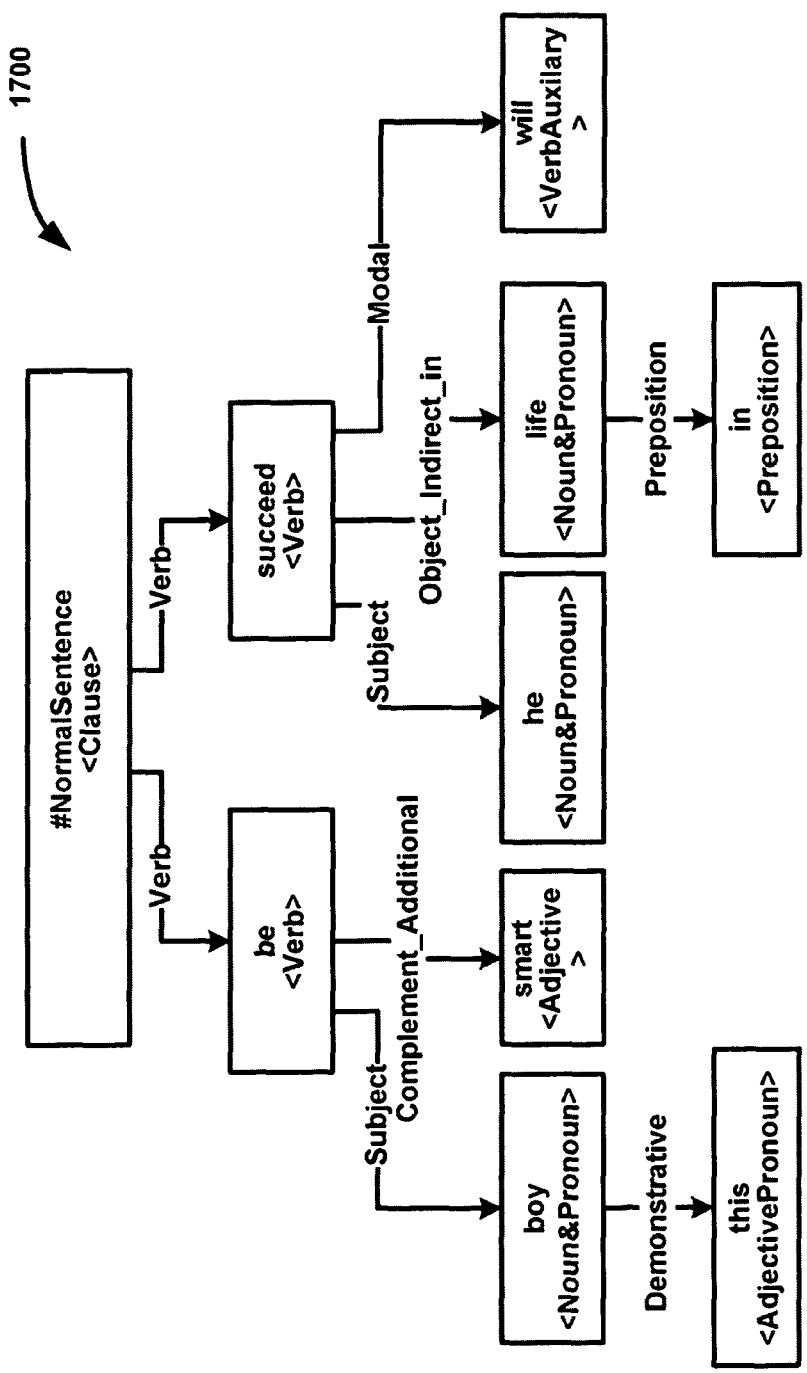
FIG. 17 is a best syntactic tree for the exemplary sentence extracted from the graph of generalized constituents from FIG. 13.

Many other syntactic trees may be generated during precise syntactic analysis 540. These trees can be generated one after another, while the stage 1470 to generate non-tree links on the previous syntactic tree is unsuccessful. The difference between these syntactic trees lies in their structures, filled surface slots for some constituents, and/or the morphological paradigms for some constituents. For example, during the precise syntactic analysis 540 of the above mentioned sentence "This boy is smart, he'll succeed in life." the stage 1470 was unsuccessful on the tree 1600 and some other syntactic trees. FIG. 17 is one of syntactic trees for the sentence extracted from the graph of generalized constituents from FIG. 13, it is the first from generated trees which eventuate successfully of the stage 1470. So, the tree 1700 is considered as the best syntactic tree.

Figure 18:
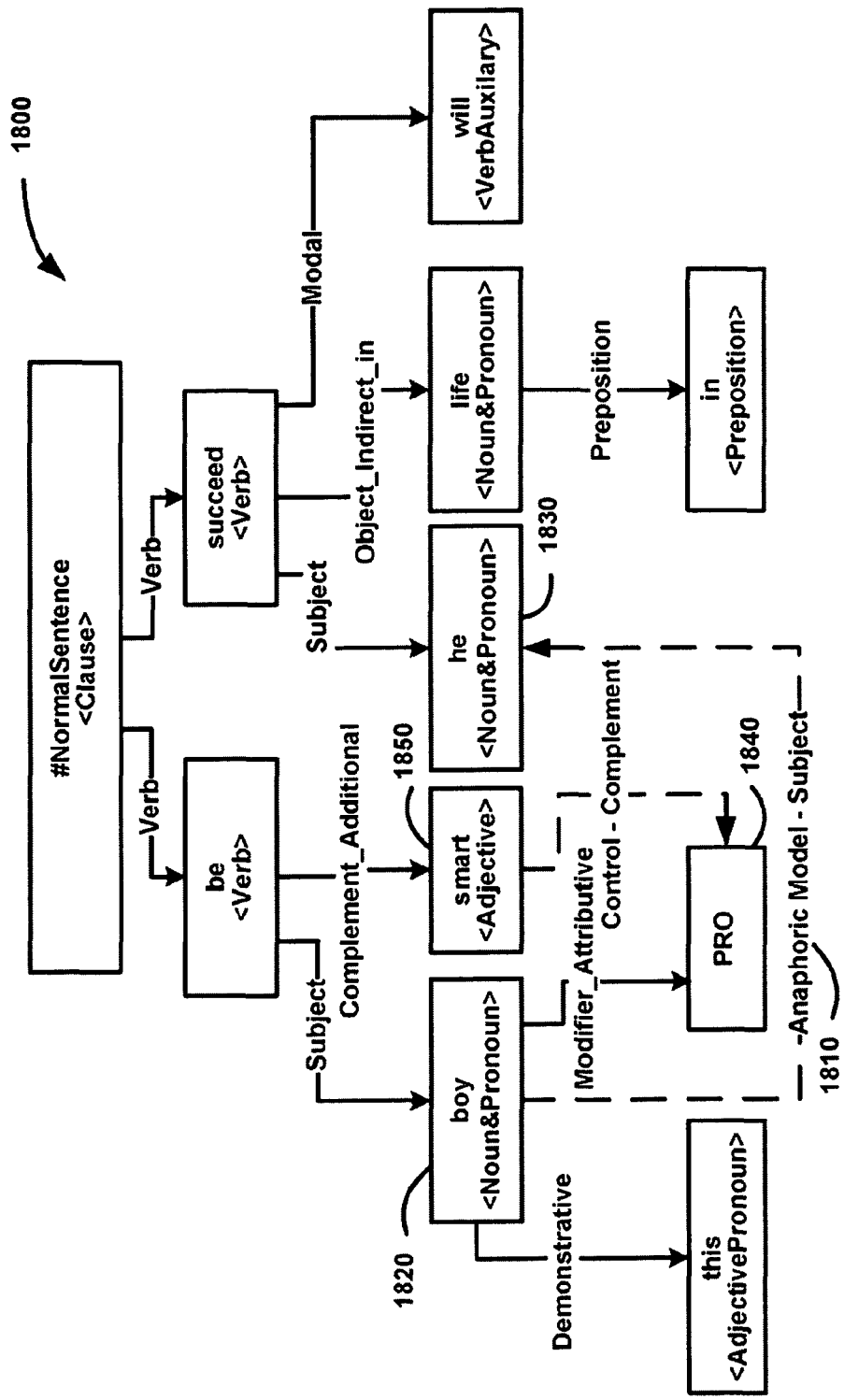
FIG. 18 is an exemplary best syntactic structure for the exemplary sentence with non-tree links generated on the basis of a syntactic tree shown on FIG. 17.

FIG. 18 is one example of a syntactic structure 1402, which is obtained near the end of the stage 1470 for the sentence "This boy is smart, he'll succeed in life." with non-tree links generated on the basis of the best syntactic tree which is shown on FIG. 17. A non-tree link of type "Anaphoric Model-Subject" 1810 is established from the constituent "boy" 1820 to the constituent "he" 1830 to identify the subjects of the two parts of the complex sentence. Additionally, a proform PRO 1840 is inserted to establish a link between the controller ("boy") 1820 and the controlled element ("smart") 1850. As a result, the complement "smart" 1850 fills the surface slot "Modifier_Attributive" 1860 of the controller "child" 1820 by means of a link of type "Control-Complement" 1870.

During the stage 1470, proforms are inserted. For every element of the sentence which can be a controller, its own proform is inserted. If a pronoun (or a proform substituted during the rough syntactic analysis) is controlled, a copy of the pronoun is uniformly made. As a result, every controlled element has a single controller. A controller can have several controlled element variants as different alternatives. Ideally, all available proforms are inserted. However, in the final syntactic tree, there may be only one of the control element variant remained. In addition, the set of meanings for a controlled element may be computed from the controller; for example, a set of lexical meanings may be taken from the controller, a set of grammatical values may be limited by the agreement rule, etc. In general, the initial mask of a proform results in all the available meanings, whereas the initial mask of a pronoun may permit some meanings, e.g., as restricted by the morphological form of each element of the sentence. For example, after checking with agreement rules, the mask of a pronoun can be empty such that any linking or pairing up between the controller and its proform cannot be established. For example, in some cases, the gender of the controller and the pronoun may not agree; in these cases, only limited numbers of proforms inserted.

At the stage 1470, the possibility to attach the controlled element to the surface slot is determined in a similar way as in attaching a child precise constituent in order to narrow the numbers of the qualified meanings of the controlled element. In general, the parent constituent may be left unchanged for a period of time without changing its grammatical value, and the lexical meaning of the parent constituent may be checked again at a later stage. Similarly, the controller may not be modified until a later stage.

The referential and structural control description 856 contains rules which can generate several alternative controlled elements during the stage 1470. The search for controlled elements can be organized as a call of all the rules in the slots of the syntactic tree which have already been filled. Proforms may be sorted by their quality rating. Proforms which were substituted during the rough syntactic analysis but have not received a controller can be deleted from the syntactic structure.

During the stage 1470, for every syntactic tree, a best syntactic structure with attached non-tree links can be generated, as a result. If no valid non-tree links have been generated, the syntactic, structure of the best syntactic tree 1420 may be invalid. In this case, the second-best syntactic tree 1420 may be analyzed. If non-tree links have not been successfully established, a returning back 1472 to the stage 1460 is provided to obtain the next syntactic tree, which may have a different rating score, for generating another syntactic structure with non-tree links as the best syntactic structure. If none of the returning backs 1462 and 1472 for the precise syntactic analysis 140 is successful, the returning back 544 to the rough syntactic analysis 530 is provided. Additional rough syntactic analysis 530 can be performed with additional consideration of any syntforms which may not have been analyzed previously.

As a result of the rough syntactic analysis 530 and the precise syntactic analysis 540, the syntactic structure with specified surface and deep slots is built. There may be some ambiguity left in grammatical values. The syntactic structure represents a full syntactic analysis of the sentence, indicates its surface and deep slots, and lexical meanings which have been unambiguously selected by this stage. Presence of non-tree links in the sentence determines, in the general case, generation of several different final structures according to different variants of establishing non-tree links. Final syntactic structures are sorted in the order of descending rating.

Figure 19:
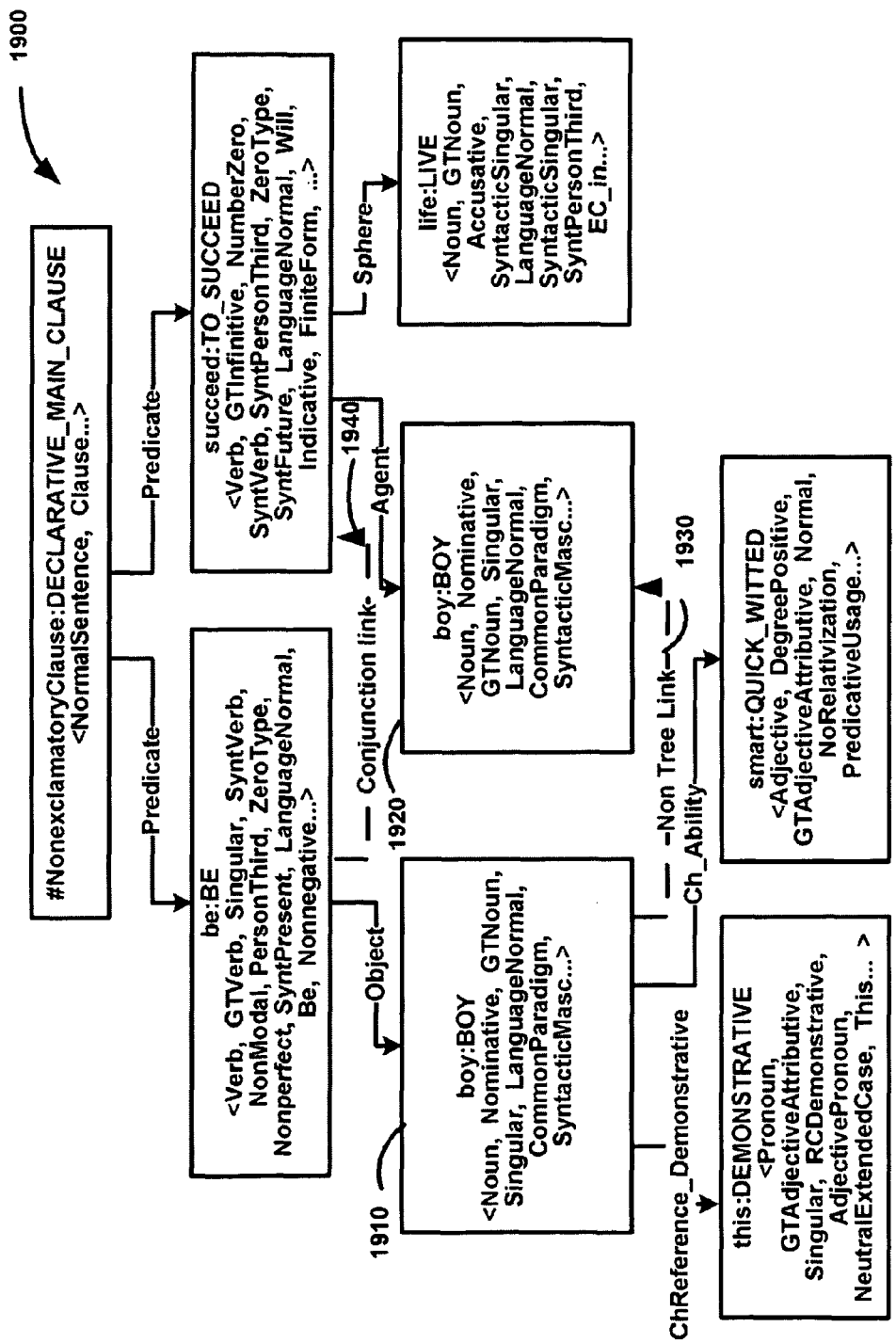
FIG. 19 is one example of the best syntactic structure with semantic parents of lexical meanings and their grammemes, non-tree links generated and deep slots for the exemplary sentence.

FIG. 19 illustrates a best syntactic structure 1900 with semantic parents of lexical meanings and their grammemes generated for the sentence "This boy is smart, he'll succeed in life." during the precise syntactic analysis 540. The best syntactic structure 1900 contains non-tree links 1930 and 1940, the lexical meanings 1012 with semantic classes as their semantic parents (1002), and their grammatical values 1008. The semantic parents of the lexical meanings are shown by means of a colon and capital letters, for example, "life: LIVE". Grammatical values are displayed in broken brackets. Because the deep slots have already been determined in the end of precise analysis 540, instead of the surface slots the corresponding deep slots are displayed in FIG. 19: Agent, Locative, Agent, etc. To identify the elements "boy" 1920 and "he" 1930 by means of the non-tree link 1930, as it was displayed in FIG. 19, the element "boy:BOY" 1910 is copied to the element 1920, keeping the morphological value "Pronoun" in its grammatical value.

Semantic Analysis

Figure 20:
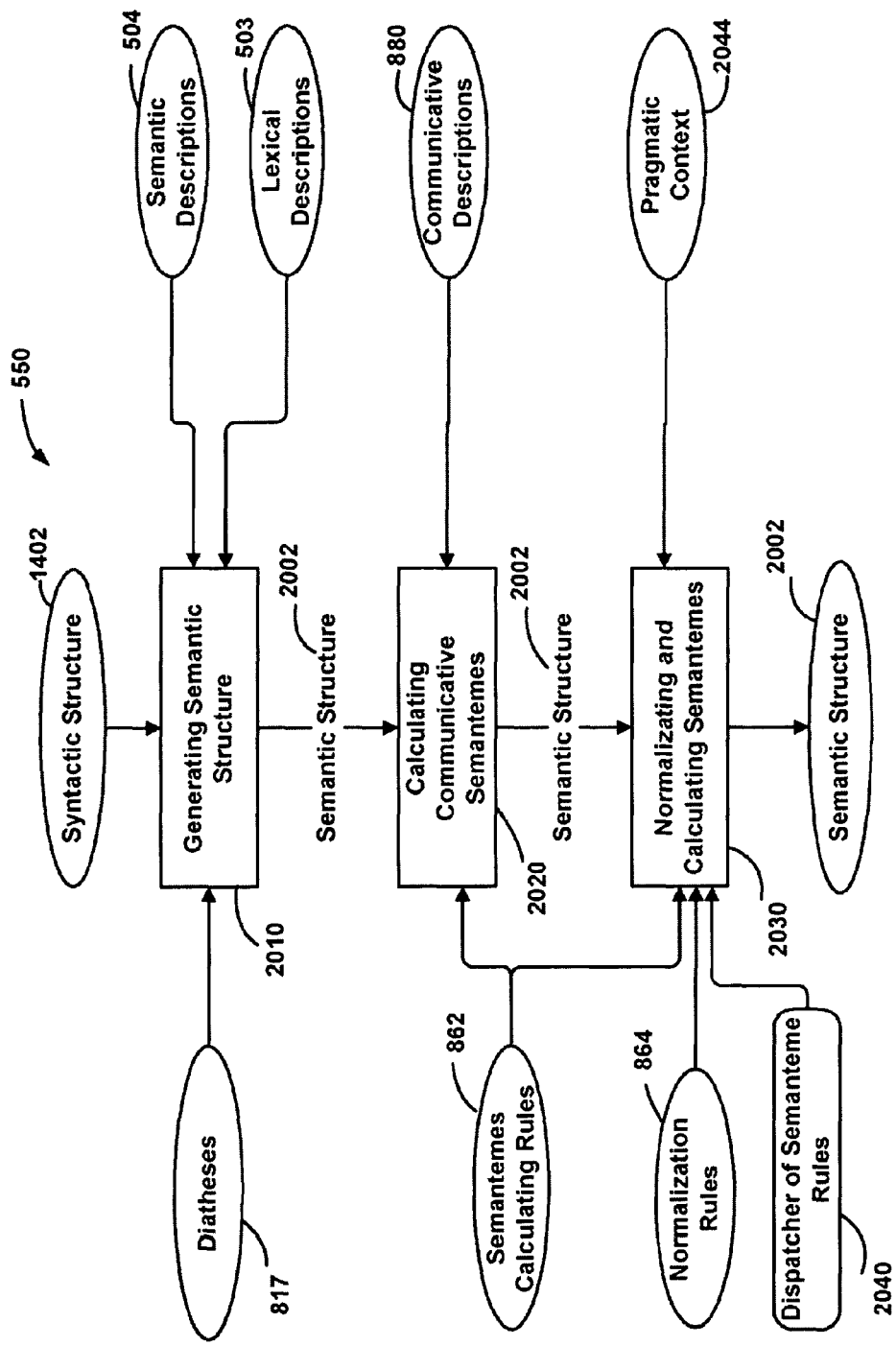
FIG. 20 is a process flow diagram illustrating semantic analysis according to one or more embodiments of the NLC method.

As shown in FIG. 5, the semantic analysis 550 is performed after precise syntactic analysis 540 when one or more the syntactic trees are formed and the best one with the highest rating score found. FIG. 20 is an exemplary process flow diagram illustrating the semantic analysis 550 according to one or more embodiments of the invention. During semantic analysis 550 a semantic structure 2002 of the source sentence 512 is build. The resulting semantic structure 2002 of the source sentence 512 is built from the best syntactic structure 1402 according to various applicable analysis rules. Constituents for the semantic structure 2002 are constructed by applying diathesis correspondences between the surface (syntactic)

and deep (semantic) slots of the constituents from the syntactic structure 1402 and by applying the rules of semantic interpretation of the grammatical values of the constituents against a set of semantemes of various semantic categories. In one aspect, the semantic structure 2002 includes a tree of deep constituents, each deep constituent having one semantic class.

The language-independent semantic structure 2002 is generated during the semantic analysis 550 using the diatheses 817, the deep models 912, the analysis rules 860 (such as semanteme calculation rules 862 and normalization rules 864), semantic descriptions 504 and lexical meanings descriptions 503 of the source language as well as pragmatic context 2044 (as part of pragmatic descriptions 940) and communicative descriptions 880. The semantic analysis treats the syntactic structure of a sentence in any language as a surface representation of a language-independent semantic structure.

A semantic structure 2002 is built from the selected syntactic structure 1402 by performing steps 2010, 2020, 2030 of generating semantic structure, calculating communicative semantemes, and normalizating and calculating semantemes, among others. The syntactic structure 1402 as the input data of the semantic analysis 550 may include specified deep slots and selected lexical meanings, the semantic structure 2002 may be generated by substituting each lexical meaning in the source language with its language-independent semantic class and confirming the linear order of the all the lexical meanings. Once the linear order is confirmed, the surface slots can be deleted when generating the semantic structure 2002 since only the deep slots 914 and deep slots descriptions, etc., are remained during the building of the semantic structure 2002.

During the semantic analysis 550 to transform the syntactic structure 1402 into the semantic structure 2002, deep correspondences for structural elements of the syntactic structure 1402 are established, the grammatical values of the constituents from the syntactic structure 1402 are interpreted against semantemes to represent language-independent semantic meanings, each lexical meaning is substituted with its language-independent semantic class, and semantemes with semantic features are generated. The resulting semantic structure 2002 is a tree (containing established non-tree links), with language-independent semantic classes as nodes and a set of semantemes and deep slots as branches.

During the step 2010, the semantic structure 2002 is generated from the best syntactic structure 1402 using the semantic descriptions and the lexical descriptions 503, and the diathesis correspondences 817 between the surface slots 815 and the deep slots 914 for each constituent of the syntactic structure.

At the step 2020, communicative semantemes for constituents in the semantic structure 2002 are computed using semantemes calculating rules 862 and communicative descriptions 880. The semantemes calculating rules 862 can be used to semantically interpret the grammatical values of the constituents against a set of semantemes of various semantic categories. Once the communicative semantemes are computed at step 2020, all other semantemes can be computed, replacing grammemes with the resulting computed semantemes. The communicative semantemes are used to express the communicative properties of a sentence, such as the standard linear order, the inverse linear order of a relative clause, or the linear order of an interrogative sentence.

At the step 2030 semantemes are normalized and further computed. The pragmatic context 2044 and the analysis rules 860, such as the semantemes calculating rules 862 and normalization rules 864, may be used during semantemes normalization to remove language asymmetries. The semantic normalization rules 864 are applied to remove language asymmetries. For example, "all of any of the following functions" can be normalized to "all of the following functions". As another example, "each of all of us" can be normalized to "each of us". As still another example, "He can do it, can't he?" can be normalized to "He can do it."; since the deep slot of TagQuestion is filled and saved in the semantic structure, the constituents "can't he" are removed.

The semantic normalization rules 864 are lexicalized and linked to specific semantic classes and lexical meanings. There are two types of the semantic normalization rules 864: rules to be used prior to calculating the semantemes for generating the semantic structure 2002; rules to be used after calculating the semantemes. A semantic class is connected with ordered lists of transformation rules of the first and second type. Thus, the semantic normalization rules 864 can be used prior to calculating the semantemes and after calculating the semantemes using the respective semantic normalization rules 864.

In general, rules used during the semantic analysis 550 are applied to the constituents of the semantic structure 2002 from the top down, from a parent constituent to child constituents. A constituent is analyzed with rules connected to the semantic class of its core, in the order of description. Rules connected with a certain class are used for all its children. In a child class there is a possibility to re-define inherited rules: add new rules, change the order of application, forbid inherited rules, etc.

The normalization rules 864 are applied to the semantic structure and modify it. Some of the semantemes calculating rules 862 may be used cyclically as long as their conditions are met. Use of semantemes calculating rules 862 leads, in particular, to substitution of language-dependent characteristics, grammemes, with universal characteristics—semantemes.

When the semantemes for different constituents are computed at the step 2030 of normalizating and calculating semantemes, an additional procedure may be used. A semantemes calculating rule can check the presence of certain semantemes of other constituents. Such a rule can only work after all the semantemes which are specified in this rule have been computed. To cope with this situation, the rules are started from the child constituents to the parent constituents. If a production refers to constituent semantemes which have not yet been computed, the rule stops with a special value which says that the rule completion must be postponed. A traversal of the tree from the top down is made, starting the rules which were postponed at the first stage. Once again, a traversal of the tree from the child constituents to the parent is made by starting the rest of the postponed rules.

The result of the semantic analysis 550 is the semantic structure 2002 of the source sentence built from the best syntactic structure 1402 according to rules for the semantic analysis 550. A semantic structure, unlike a syntactic structure, uses universal language-independent concepts and components, such as semantic classes, semantemes, deep slots, among others.

As shown in FIG. 20, a dispatcher 2040 for dispatching semanteme rules is adapted to execute the normalization of the semantic structure 2002 and calculating semantemes by applying the analysis rules 860. As a result, every lexical meaning in the semantic structure 2002 is substituted with its universal parent—a semantic class. Any possible differences of the child lexical meanings are saved in a list semantemes generated during the application of the analysis rules 860. A description of a constituent in the final semantic structure 2002 includes semantic classes which are parents for lexical meanings represented in the best syntactic structure 1402, semantemes which are computed according to the analysis rules 860 or assigned to corresponding parent semantic classes, and child constituents. When there is a link to a child constituent, the deep slot that can be filled is specified. The semantic structure 2002 is language-independent and may include, but is not limited to, a tree of deep constituents, deep constituents, and semantic classes which are the fillers of deep slots. Accordingly, the semantic structure 2002 can be applied to describe the meanings of a sentence from any natural or artificial languages.

Figure 21:
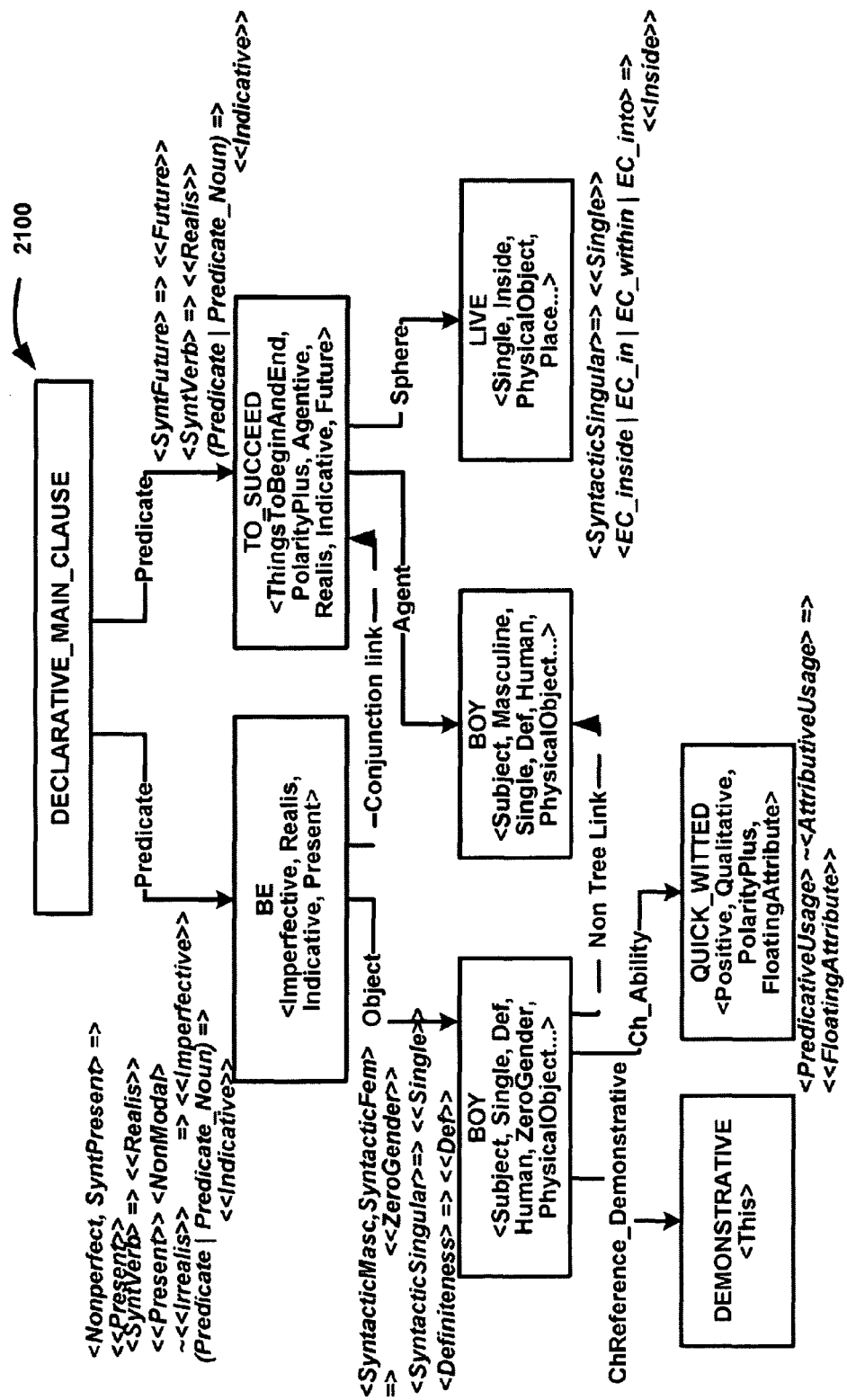
FIG. 21 is an exemplary semantic structure with semantemes and exemplary analysis rules according to one or more embodiments of the NLC method.

FIG. 21 illustrates an exemplary resulting semantic structure 1700 of the sentence "This boy is smart, he'll succeed in life." The deep constituents are represented by rectangles with a semantic class indicated inside, for example, DECLARATIVE_MAIN_CLAUSE, TO_SUCCEED, BOY, LIVE, etc. The semantemes which are computed after applying the analysis rules 860 are displayed in broken brackets for each semantic class. For example, <Imperfective, Realis, Indicative, Present> is the semantemes for the semantic class BE 2110. Some of the applied analysis rules are displayed near rectangles with the semantic class. Deep slots are represented as arrows and named; for example, Object, Agent, Locative, etc. Non-tree links are represented as dotted arrows.

Natural Language Sentence Synthesis

Figure 22:
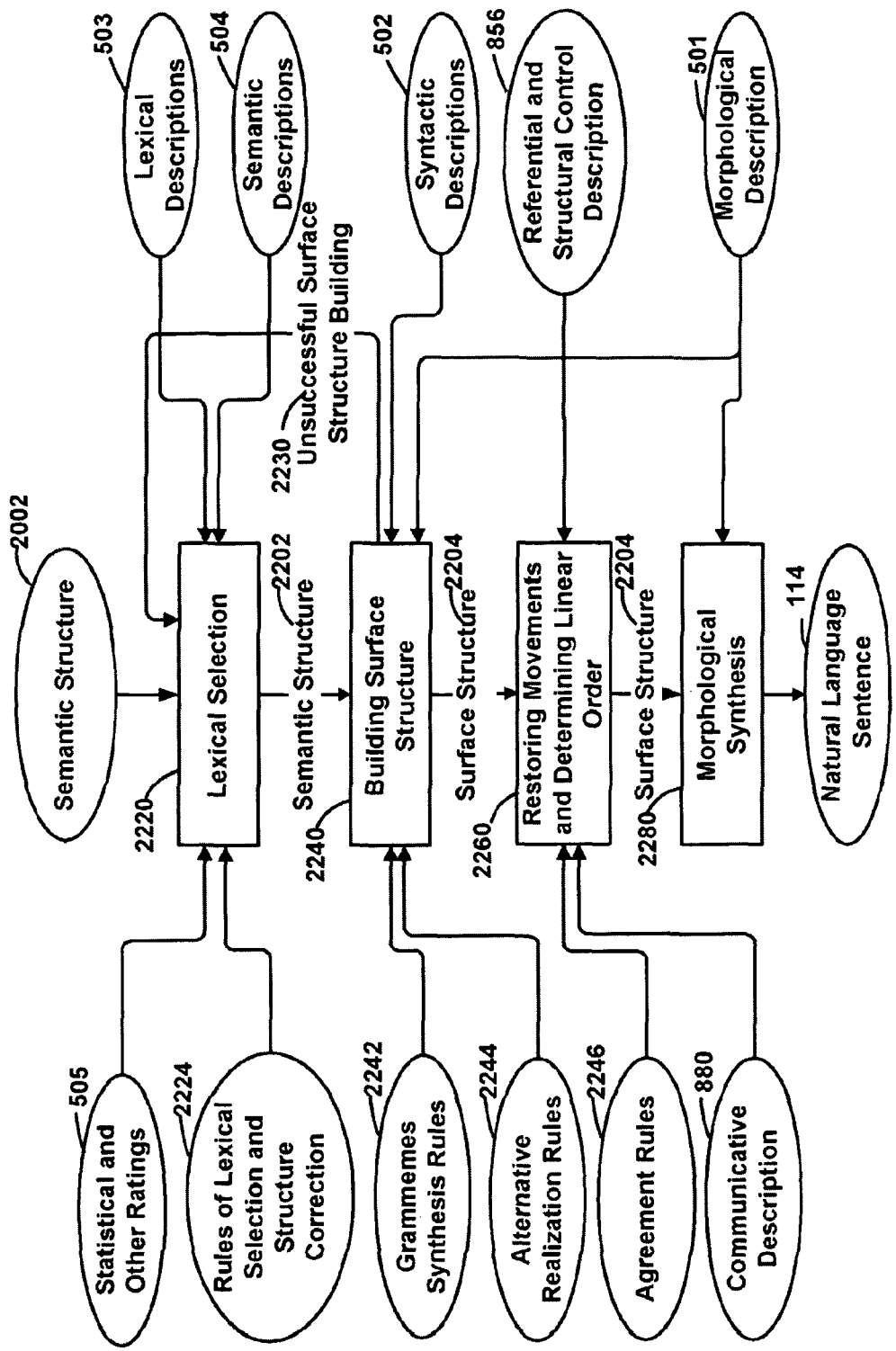
FIG. 22 is a process flow diagram illustrating an output natural language sentence synthesis according to one or more embodiments of the NLC method.

FIG. 22 illustrates one example of a method 2200 exemplifying process flow diagram of synthesis 560 of an output natural language sentence. The step is illustratively described below can be configured to generating a surface syntactic structure of a sentence in an output language from a language-independent semantic structure, such as a language-independent semantic structure generated after analyzing a source sentence in a source language.

The method 2200 for generating a natural language sentence 514 in an output language may include a step 2220 of performing a lexical selection on a semantic structure 2002, a step 2240 of building a surface structure 2204 of a sentence to be generated from the semantic structure 2002 with selected lexical meanings, a step 2260 of restoring movements and determining linear order on the surface structure 2240, and a step 2280 of performing morphological synthesis on the surface structure 2204 in the output language.

For a semantic structure 2002, the lexical selection 2220 and building 2240 a surface structure are performed, and for the obtained surface structure 2204 of a sentence to be generated restoring 2260 movements and determining the linear order are performed, and the morphological synthesis 2280 is executed to generate the output sentence 514 in any natural language, for which all the necessary language descriptions have been created. The output sentence must express that meaning (sense) in the given natural language, which is represented by the source language-independent semantic structure.

Lexical selection 2220 is selecting one or more lexical meanings for a deep constituent core. Any constituent has a word at its core and can include child constituents at lower levels. As a rule, the grammatical, syntactical and morphological properties of the deep constituent, expressed by means of a set of semantemes, are the same as the properties of its core. At the step of the lexical selection 2220 in the semantic class of the core the lexical meanings of the target language is selected. As lexical meanings 1012 in lexical description 503 have their semantic values 1010 which are also expressed by means of a set of semantemes, and those lexical meanings in the semantic class are selected, which have a most number of semantemes of the constituent core.

Also, deep models 912 as a part of semantic description 504 are used at the step of the lexical selection 2220, because semantic classes of the fillers of the child and parent deep slots are taken into account. Accordingly, those lexical meanings in the semantic class are selected, which have deep slots, and those semantic classes of deep slot fillers in their deep models 912, which correspond to the deep slots and semantic classes of deep slot fillers of the constituent core.

As a rule, for the cores only those lexical meanings are selected which are linked to the semantic class in the semantic hierarchy 910 by means the relation of mutual semantic representability. The mutual semantic representability means that it is possible the transition not only from the lexical meaning to the semantic class, but from the semantic class to the lexical meaning. Any semantic class always has at least one such lexical meaning-representative in the given natural language.

Additionally, various ratings 505, including statistical and other ratings, may influence on the lexical selection 2220, such as, rating of the lexical meaning, rating of the deep slots filling, ratings of identifying word-combinations, ratings of deep slots correspondences, bonus for derivational semantemes, rating of correspondence to the local and global pragmatic context, rating of correspondence to the terminological sphere, rating of correspondence to the previous selection. Pair ratings may take into account not only the relations between the parent and child constituents but non-tree links too. The statistical ratings may be obtained through a preliminary analysis of a text corpus and subsequent generalization of the statistics during the steps 420 and 430 shown in FIG. 4. Since there may be many lexical meanings meeting the conditions of lexical selection 2220, lexical meanings having a best rating are selected at first.

As a rule, at the step of lexical selection 2220 among lexical meanings actually the one or more is selected, which realizes the most semantemes assigned to the constituent core, on the basis of ratings 505 of lexical meanings and ratings of pair correspondence. There are cases, however, when the rules 2224 of lexical selection and structure correction have to be used. These rules are used when the semantic structure needs correction in order to overcome the asymmetries between the universal semantic description and the language-specific syntactic structure. Rules 2224 of lexical selection and structure correction are connected with deep slots 914 and transform a sub-tree with the current constituent at the top. During this process the rules can substitute a new parent constituent.

The semantic structure correction rules may be used during the lexical selection in the case when the algorithm of selection of the lexical meaning for a semantic class cannot be described with the standard means, for example, during the lexical selection the system has to take into account the deep slot to be filled, or the semantic class of the child constituent, etc. For example, the rule for the English language named SingleChoice, containing the instructions: <<Elective>>=>"single one:SOLE"; <<ZeroElective>>=>"single:SOLE"; allows the system to make a selection of the lexical meaning "single one" from the semantic class "SOLE" if the semanteme of electiveness is assigned to the constituent, or of the lexical meaning "single" if this semanteme is not assigned. Since the category of electiveness is computed and not assigned in the lexical description 503, this selection condition cannot be described in the semantic hierarchy 910 but can only be specified with the help of the rule 2224 of lexical selection and structure correction.

As another example, when the rules 2224 of lexical selection and structure correction may be used, the deep structure of a certain language differs from the "normalized" language-independent structure, for example, it has an additional constituent or a different direction of government between its constituents, etc. For example, suppose a universal semantic structure has a constituent which has the semantic class "NEWS" as its core and a child constituent filling the "Quantity" deep slot. In order to synthesize the syntactically and stylistically correct English phrase "two pieces of news", the following structure correction rule may be used: "NEWS" [Quantity: x, ?y]=>new "piece:CLASSIFIER" [QuantifiedEntity:this][x][y], which transforms the tree in such a way that the parent constituent has the piece:CLASSIFIER" lexical meaning, while "NEWS" becomes the child constituent and fills the QuantifiedEntity slot of the parent constituent.

If the rules 2224 of lexical selection and structure correction are applied, the lexical selection 2220 may entail the transformation of the semantic stricture 2002; besides, the rule may change the deep properties of some constituents, such as, semantic value, semantic class of the core, etc. These rules are lexicalized, i.e. they are connected with (assigned to) certain objects of the semantic hierarchy 910 and are only called when such an object is the core of the initial constituent.

As a result, during the lexical selection 2202 the source semantic structure 2002 may be transformed and each constituent has one or more lexical meaning selected for its, core. On such specified semantic structure 2002 with specified lexical meanings of the constituents the building 2240 the surface structure is performed. As shown on FIG. 22, various specific language descriptions, such as, syntactic description 502, referential and structural control description 856, grammemes synthesis rules 2242, alternative realization rules 2244, and agreement rules 2246, among others, may be used during the building 2240 the surface structure.

The surface structure 2204 is built by means of a top-down traversal of the semantic structure. During this traversal, semantic, lexical and syntactic properties of each constituent are specified more accurately, and, first of all, the surface slots corresponding to the deep slots are determined, the linear order is defined, movements are restored, structural and referential control are checked.

Figure 23:
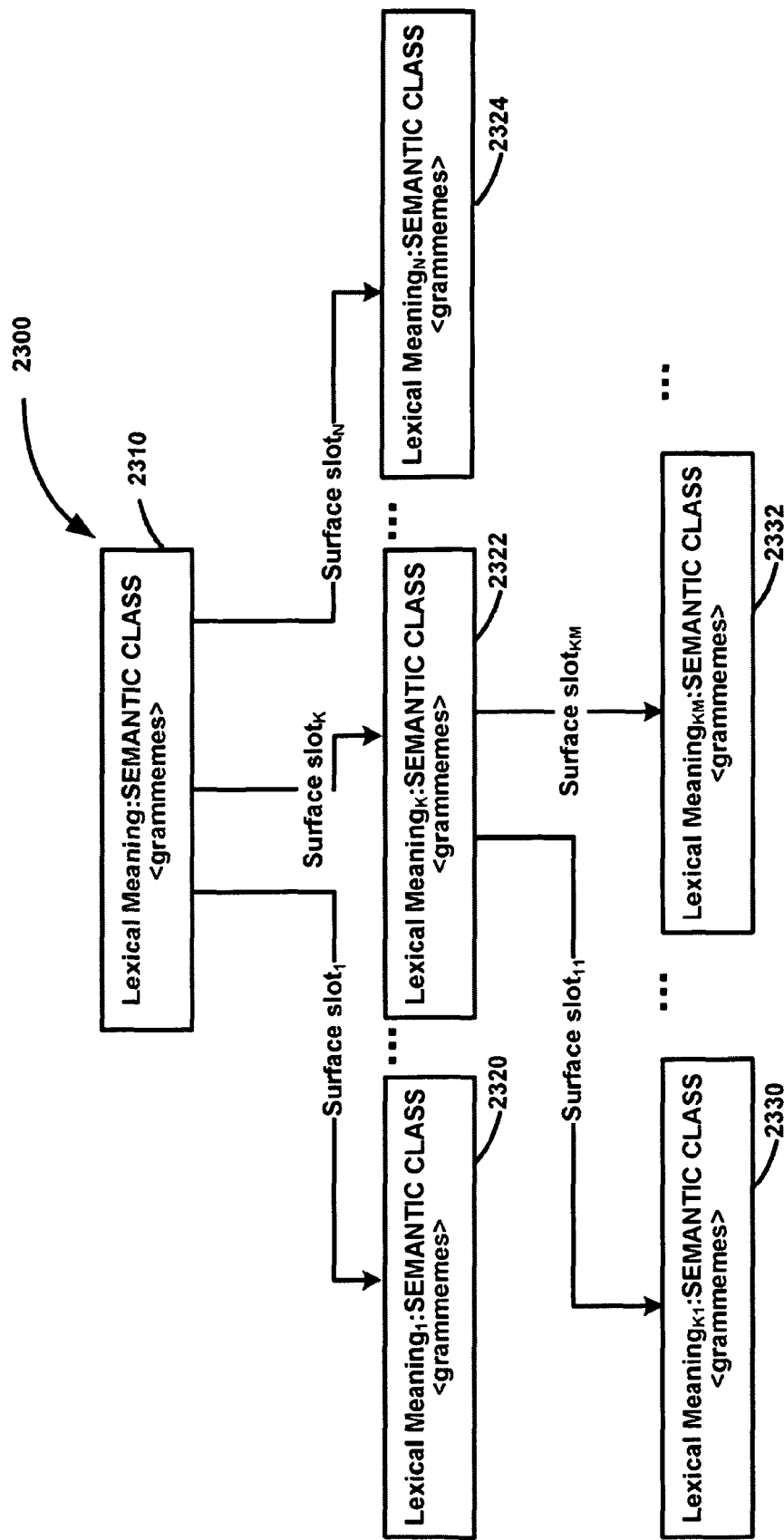
FIG. 23 is a diagram exemplifying various components of a syntactic structure of synthesized sentence according to one or more embodiments of the NLC method.

FIG. 23 is a diagram schematically illustrating the idea of a surface structure 2300 of a synthesized sentence according to one or more embodiments of the invention. In FIG. 23, constituents of the surface structure 2204 are shown as rectangles, arrows show filled surface slots. A constituent has a lexical meaning at its core with its semantic parent (SEMANTIC CLASS) and can have smaller constituents of the lower level attached in some surface slots. This attachment is shown by means of arrows named Surface Slot. Each constituent may also include syntactic values and grammatical values, expressed via the grammemes of the syntactic categories thereof. These grammemes are the properties of the syntactic forms selected for the constituent during the building 2240 the surface structure.

Since any lexical meaning 1012 in its lexical description 503 has a deep model 912 and a surface model 810 connected by means of diatheses 817, for each lexical meaning corresponding to the constituent core, the following actions may be performed. For each deep slot of the parent constituent in its diathesis all surface slots are searched for which meet the diathesis restrictions. At least one slot may be found. If no slot has been found, the returning back 2230 to the stage of lexical selection 2220 is provided, and the lexical meaning which has the next-best rating in the semantic class is selected.

Since there may be many surface slots 815 meeting the conditions of diatheses 817 for each lexical meaning 1012, each of these surface slots may be considered as a hypothesis related to a surface structure of a corresponding constituent. Such hypothesis may have a rating. Those hypotheses that may result in a best rating are served at first. For each surface slot 815, syntactic forms 812 which meet the requirements of the surface slot are searched for. If a suitable syntactic form has not been detected, this hypothesis is penalized by means of rating reduction. An additional rating for the correspondence of the semantemes of the part of speech and the grammatical type to the corresponding grammemes of syntform 812 for each hypothesis is computed.

The hypotheses about surface structure of a constituent are analyzed during building 2240 the surface structure in the order of descending rating. If a suitable syntactic form for an analyzed hypothesis isn't found, an alternative realization rule 2244 may be applied. Such rule is applied if the lexical meaning which during lexical selection 2220 is selected hasn't suitable grammatical forms. Alternative realization rules 2244 usually substitute some semantic class as the parent constituent and/or transform the semantic structure 2002 what enable to build the surface structure with another lexical meaning.

Alternative realization rules 2244 are lexicalized, i.e. they are connected with (assigned to) certain objects of the semantic hierarchy 910 and are a part of lexical description 503. If some alternative realization rule 2244 was applied and its application has resulted in the substitution of a semantic class or a new lexical meaning as the parent constituent, this hypothesis is removed from the queue of hypotheses, all the previous step (searching for syntax forms) are repeated with it, and thus new hypotheses are generated. These hypotheses are added to the list of hypotheses, and ratings of the hypotheses are taken into consideration. The repeated lexical selection is performed as follows: the lexical meanings which have a syntactic form which is suitable for the parent surface slot, and the lexical selection 2220 in the sub-tree of this constituent is started.

During building 2240 the surface structure, grammemes synthesis rules 2242 are applied. Grammemes synthesis rules 2242 compute grammemes, representing grammatical and morphological values of a constituent, on the basis a set of semantemes, taking into account the initial grammatical value of the lexical meaning, parent surface slot and syntactic form. As a result of these rules applying, semantemes may be substituted by grammemes. Generally, this rules may have a production form, a left part of the rule describing a condition of the rule applying—one or more semantemes and, additionally, surface slot name, which a constituent must have, and a right part of the rule containing one or more grammemes, which the constituent are assigned as result of the rule applying. As the order of the grammemes synthesis rules 2242 applying may be determined by presence not only some semantemes, but grammemes too, so, not only semantemes but, additionally, grammemes may be included in the condition of a rule applying.

The grammemes synthesis rules 2242 allow the system to detect a grammatical value of the lexical meaning which realizes as many semantemes as possible, and to compute the value of all semantic grammatical categories. Each applied rule determines more accurately the grammatical meaning of the constituent as it is written in the applied productions. If a production tries to assign to a constituent a grammatical value that contradicts the value that the constituent already has, such a production will not work even if its requirement is met by the current constituent.

Semantemes may be realized not only grammatically but also lexically, namely by substitution of the parent or child constituents. Some semantemes may be realized only by means of substituting auxiliary words into the parent constituent, for example, modal or auxiliary verbs. In this case, the rule creates and substitutes a new parent constituent. The new parent constituent contains a semantic class which is attached to a slot of the initial parent constituent. Additionally, the rule must move the semantemes which must be realized by the syntactic form of the substituted parent constituent (for example, aspect-tense) to the parent constituent and delete these semantemes from the current constituent. The rule must attach the current constituent to the deep slot of the substituted parent constituent. For the semantic class of new parent constituent the lexical selection 2220 in the subtree of this constituent is executed.

During building 2240 the surface structure, for each hypothesis about surface structure of a constituent all syntactic forms which correspond to the computed grammatical value are detected, and each hypothesis is considered separately for each detected syntactic form. Each separated in such a way hypothesis is verified according to morphological description 501 whether the core of this constituent can be synthesized on the basis of its partially computed grammatical value. If this cannot be done, the hypothesis is deleted. A preliminary rating for each hypothesis is computed and they are arranged in the order of descending rating scores.

The syntactic forms are analyzed in the order of descending rating. If a constituent has deep slots which are filled without diathesis correspondence, a corresponding alternative realization rule 2244 is called for each such slot. This algorithm may be performed recursively for each child constituent. During backward recursion the structure control rules (they are a part of referential and structural control description 856), related to the surface slots of this constituent, are checked, and, if the control rule has not detected a suitable non-tree link, the constituent is deleted. Otherwise, the movements which are described in the surface slots of this constituent are restored. If the movement cannot be restored, the constituent is deleted.

In the end of the considering of each hypothesis about surface structure of a constituent final rating of the hypothesis is computed. If the final rating of the current hypothesis is higher than the preliminary rating of the next hypothesis, the search is stopped. This algorithm of building 2240 the surface structure is a two-level search with independent selection and filtering at each level. At the upper level hypotheses are generated and assigned their ratings. These hypotheses consist of three components: lexical meaning, surface slot, and syntactic form. At the lower level hypotheses corresponding to specific syntactic forms are analyzed. The best hypothesis is represented by a best surface structure, which is a tree (best surface tree), the nodes of which are constituents with selected lexical meanings and corresponding syntax forms and the branches are the surface slots. As a result of the step 2240, the surface structure of the sentence to be generated with the best rating is build.

Figure 24:
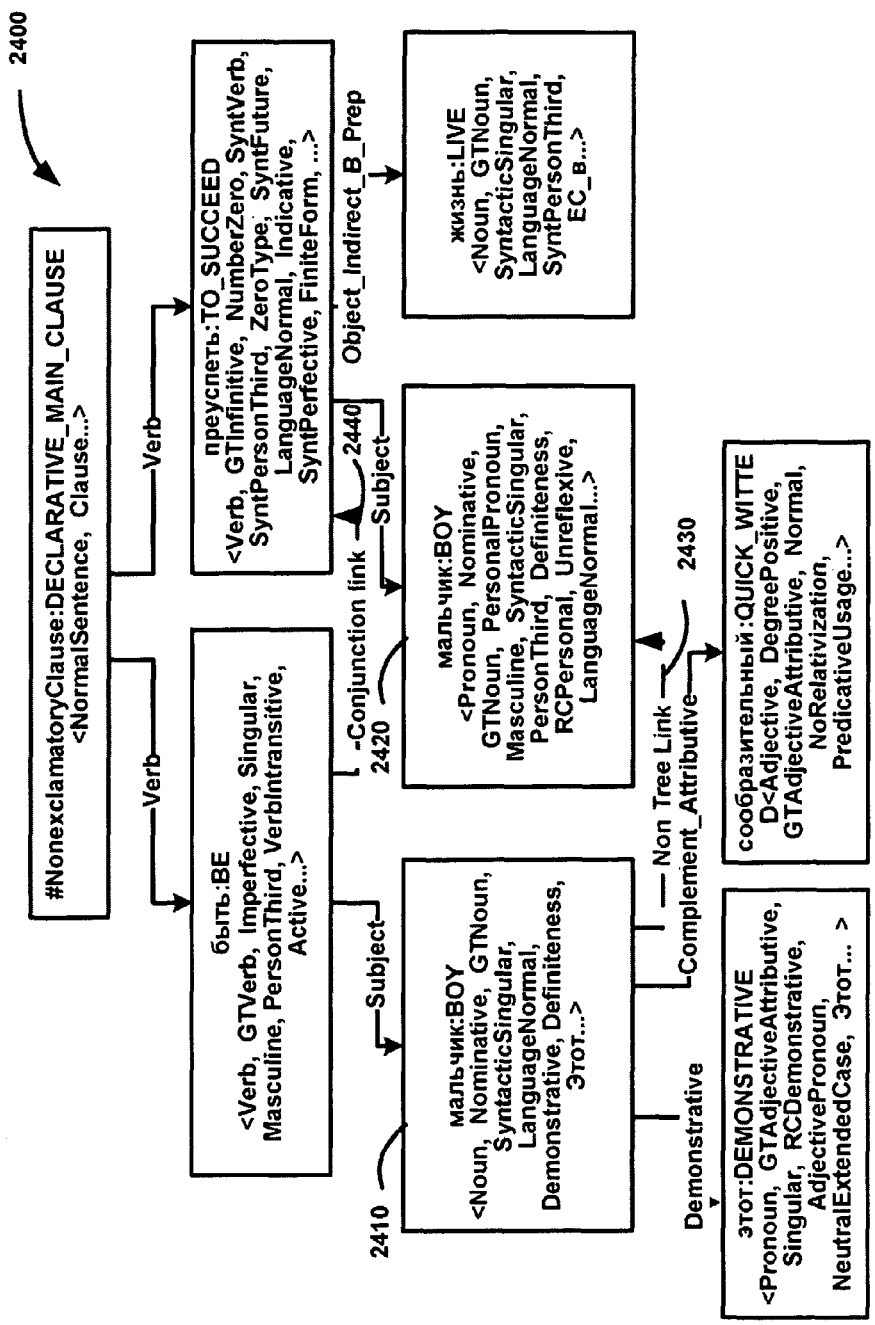
FIG. 24 is an exemplary surface (syntactic) structure for a synthesized Russian sentence which correspond to English sentence "This boy is smart, he'll succeed in life." according to one embodiment of the NLC method.

FIG. 24 is an exemplary best surface (syntactic) structure of the Russian sentence which is obtained as result of translating the English sentence "This boy is smart, he'll succeed in life." according to one embodiment of the invention on the basis of the semantic structure which is shown on FIG. 21. Restoring 2260 movements and determining the linear order is performed for the best surface structure. During this step referential and structural control is checked and movements are restored. The relations of control may be represented in the surface structure by means of non-tree links. Some non-tree links may be described in the semantic structure 2002, for example, in case, when the semantic structure 2002 was obtained as result of analysis of some sentence. The movements may be represented in the surface structure by means of non-tree links too, or otherwise, corresponding non-tree links may be restored by means of special structural control rules.

A movement is a phenomenon of various natural languages. The movements which must be restored, may be of different types, such as, communicative movements (subject rise, cleft-constructions), stylistic movements (object rise), grammatical movements (relativization, interrogatory sentences, etc.), among others. Accordingly, the different types of movement may express different communicative or stylistic aspects, for example, to mark out the focus or emphasis of the sentence to be generated. This may entail a modification of a linear order. As a result, the sentence to be generated may be more colloquial and close to real time situation and a natural language. For example, the sentence "John is a good boy and it seems that John loves Mary." may be generated, but "John is a good boy and seems to love Mary." is more real and spoken, and the later may be generated through movement of "John" because of a co-ordination.

The other example of sentence which may be generated from the language-independent semantic structure formally following the English language rules is "I've met a boy my sister likes [whom]." This sentence may be transformed into more usable variant "I've met a boy whom my sister likes." by movement of "whom".

The referential and structural control description 856 is used in non-tree links generation, during which proforms may be inserted, non-tree links may be established, and all rules of correspondence between the controller and controlled object are checked. Structural control check allows filtering out wrong surface structures. The relations between the controlling constituent—controller—and the constituent controlled by it are checks. For example, a verb attribute of a noun phrase can generally be expressed by a participial clause or a relative clause. This element (the verb attribute) is represented in surface structure by auxiliary element named a proform which is inserted by a structure control rule and may be controlled by the noun phrase. If the controlled proform is related to the subject, both the variants are possible, otherwise only a relative clause is possible. An attempt to use a participial clause in order to realize a verb attribute of a noun phrase in the control rule fails, and thus such a variant is discarded. Non-tree links which have not been interpreted by structure control rules get interpreted by referential control rules at the corresponding proforms. Consequently, every lexical meaning connected with a proform may have its referential control rule.

The non-tree links on the surface (syntactic) structure for the Russian sentence which is obtained as result of translating the above mentioned English sentence "This boy is smart, he'll succeed in life." according to one embodiment of the invention are shown on FIG. 24. The non-tree links are shown as dotted arrows. These non-tree links may be kept in the language-independent semantic structure, for example, in the case when this language-independent semantic structure was obtained as result of analysis of the sentence in the same or another natural language. In the other case, the non-tree links may be restored according the referential and structural control description 856. A non-tree link of type "Anaphoric Model—Subject" 2410 is established from the constituent "мальчик:BOY" 2420 to the constituent "мальчик:BOY" 2430 to identify the subjects of the two parts of the complex sentence. Additionally, a non-tree link of type "Conjunction link" joins two parts of the complex sentence.

Additionally, determining precise values of relational grammatical categories is executed. The relational grammatical categories may express grammatical properties of a child constituent, such as a gender, a number and so on, which depend on properties of the parent constituent. The agreement rules 2246 are used for determining precise values of relational grammatical categories. Sometimes for a full and unambiguous determining a grammatical meaning, control rules have to be taken into account. For example, there is not enough information in the surface structure 2204 to generate sentences "I met Mary with her daughters.", or "I met John with his daughters.", or "I met the Smith couple with their daughters." In these examples the gender or number of a possessive pronoun is determined by a controller (controlling element) therefore only control rules, which are included into referential and structural control description 856, can determine values of these categories. Transforming a proform into a personal, reflexive or relative pronoun, or into an empty proform is also performed at this stage. It is done by means of assigning to the proform a corresponding relational meaning by the control rule.

The linear order is determined after detecting relational grammatical meanings because they may affect the linear order (for example, the type of a pronoun). At this stage the syntform 812 which has corresponding linear order description 816 is already known. A communicative form which realizes communicative semantemes for the syntform must be selected on the basis of communicative description 880, and the order of slots is synthesized. Communicative forms are searched in the order of their description. The first form which meets all the requirements and includes all slots is selected. If the search has been failed to select a suitable communicative form, a neutral order is synthesized.

The result of the stage 2260 is a fully defined (specified) surface (syntactic) structure 2204 of the sentence to be generated where for each constituent a lexical meaning of the core, surface slots and their fillers, and their linear order are specified according to syntactic description 502, referential and structural control description 856, communicative description 880, agreement rules 2246, among others. This stage 2260 and the previous lexical selection 2220 on the basis of rules 2224 of lexical selection and structure correction allow the system to get the surface (syntactic) structure 2204, which express the semantic meaning of the sentence to be generated in the given natural language as fully and precisely (exactly) as possible.

The morphological synthesis 2280 of the constituent cores is performed on the basis of the morphological description 501. The grammatical value of a constituent core is determined on the basis of the grammatical value of the constituent and the already-detected syntactic form. Each syntactic form may have a rule of agreement of the grammatical value of the constituent and the morphological value of the core. This agreement rule determines the morphological value of the core.

Prior to generating a word form with the help of the morphological description 501, a lexeme must be selected which corresponds to the selected grammatical value. It is necessary because each lexical meaning may be associated with a set of lexemes which encode, for example, different dialects or even separate word forms of the lexical meaning. For example, the lexical meaning "cow" in English may be associated not only with the lexeme "cow", but with "bull" and "calf", among others. The required lexeme may be selected according to the value of grammatical category "Gender", and additionally, according to the presence of semanteme "Baby". The morphological value of the core is synthesized according to morphological grammemes, for example, for the noun—according to the grammemes of the number, the case must be taken into account in English, for the verb—the grammemes of the number, person, tense, participle type, among others. As a result of process steps 2220, 2240, 2260 and 2280, a sentence in the output natural language may be generated according to the language-independent semantic structure. For above mentioned example, the result of translating the English sentence "This boy is smart, he'll succeed in life." according to one embodiment of the invention into Russian is the sentence "Этот мальчик сообразителен, он преуспеет в жизни."

During each step shown in FIGS. 1 and 5A the user of the computer system can view and, if necessary, select each of the interim and resulting structures. By performing the lexical, morphological and syntactic analyses of a sentence, a syntactic structure as a tree of generalized constituents can be established. The syntactic structure of a sentence is transformed into a semantic structure by semantic interpretation of language-specific elements of the syntactic structure of the sentence and a tree of surface constituents are transformed into a tree of deep constituents and a language-independent semantic structure is formed. During the building 560 of the output natural language sentence by performing the lexical selection on the semantic structure, building a surface structure of the sentence to be generated in the given natural language the syntactic structure as a tree of surface constituents can be build. On the syntactic structure of a sentence movements are restored and the linear order is determined, the morphological synthesis of the cores of constituents is performed to obtain the natural language sentence.

A computer system implemented as a computer program with its own interface or as part of another system in accordance with the method of the invention includes means for entering natural-language text; means for segmenting text into sentences, words, letters, and non-text symbols; means for searching translations in a database, means for fuzzy search of translations in a database, means for searching translations in dictionaries, means for subsequently replacing the differing parts with translations from a terminology or translation dictionary, means for providing syntactically coherent output, means for lemmatization and finding for each source word form a complete set of its grammatical and lexical meanings; means for constructing, in accordance with the model of each lexical meaning, constituents which are the realizations of these models in a given sentence; means for constructing one or more generalized constituents from constituents constructed by using various models available for each lexical meaning of a source word form; means for building a graph of generalized constituents covering all the hypotheses about the possible syntactic structures of the sentence; means for calculating a rough rating of constituents which are included into generalized constituents; means for generating hypotheses about the most probable precise structure of the sentence based on the rough ratings and for selecting the structure with the highest value of the rating; means for calculating the precise ratings for the selected, most probable syntactic structure constituents which are included into generalized constituents; means for establishing non-tree links; means for establishing correspondences for each surface slot of each constituent in the tree of constituents with deep slots; means for calculating the set of semantemes of each constituent on the basis of the set of grammemes; means for substituting each lexical meaning in the semantic tree with its language-independent semantic class; means for storing in a database the constructed semantic structure for further use in other applications.

Further, the computer system in accordance with the method of the invention includes means for storing and displaying a semantic structure; means for the lexical selection of lexical meaning of the specific language for each constituent core; means for correction of semantic structure in any specific natural language; means for selecting, in accordance with the model of each lexical meaning, surface slots and syntactic forms which realize the deep slots of the semantic structure in the given specific language; means for calculating the set of grammemes of each constituent on the basis of the set of semantemes; means for an alternative realization of the lexical meaning by an another semantic class; means for building the hypotheses about the possible syntactic structures of the output sentence; means for calculating a rating of hypotheses about the possible syntactic structures of the output sentence; means for selecting a structure with the highest rating value; means for restoring movements; means for determining precise values of relational grammatical categories; means for determining the linear order on the basis of the communicative description; means for the selecting the grammatical forms; means for the morphological synthesis; means for displaying the obtained natural language sentence and storing it in a database for further use in other applications, for example, in the translation database. Also, the computer system can implement all the methods, steps, actions automatically.

Figure 25:
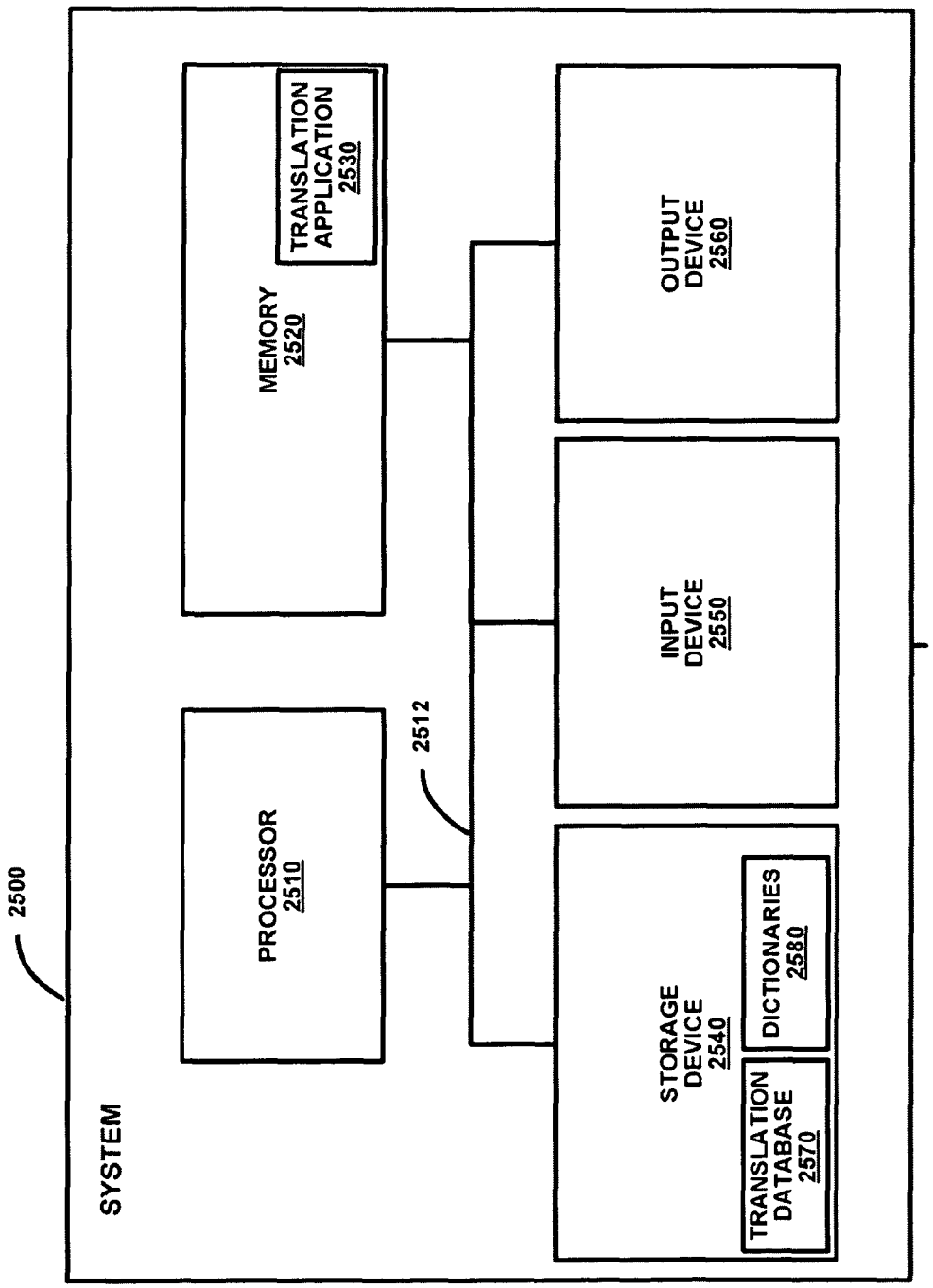
FIG. 25 is a block diagram of one illustrative embodiment of a computer system where the method of translating documents can be implemented.

FIG. 25 illustrates an example of a suitable computing system environment on which the invention may be implemented. A system 2500 is provided and is only one example of a suitable computing environment and is not intended to suggest any limitation as to the scope of use or functionality of the invention. The computing environment or system 2500 should not be interpreted as having any dependency or requirement relating to any one or combination of components as illustrated herein.

The system 2500 may be a general purpose computing device in the form of a computer. Components of the system 2500 may include, but are not limited to, a processing unit, such as a processor 2510, a system memory 2520, and a system bus 2512 that couples various system components including the system memory 2520 to the processing unit 2510. The system bus 2512 may be any of several types of bus structures including a memory bus or memory controller, a peripheral bus, and a local bus using any of a variety of bus architectures.

The system 2500 may generally include a variety of computer readable media. Computer readable media can be any available media that can be accessed by the system 2500 and includes both volatile and nonvolatile media, removable and non-removable media. By way of example, and not limitation, computer readable media may comprise computer storage media (storage device) 2540 and communication media, such as an input device 2550 and an output device 2560.

The invention is operational with numerous other general purpose or special purpose computing system environments or configurations. Examples of well known computing systems, environments, and/or configurations that may be suitable for use with the invention include, but are not limited to, personal computers, server computers, mainframe computers, multiprocessor systems, hand-held or laptop devices, microprocessor-based systems, set top boxes, programmable consumer electronics, network PCs, minicomputers, distributed computing environments that include any of the above systems or devices, and the like.

The invention may be described in the general context of computer-executable instructions, such as program modules, being executed by a computer. Generally, program modules include routines, programs, objects, components, data structures, etc. The invention may also be practiced in distributed computing environments. In a distributed computing environment, program modules may be located in both local and remote computer storage media including memory storage devices. In one embodiment, various program applications, program modules, etc., such as a translation application 2530 are loaded into the memory 2520 and run by the processor 2510. The translation application may be adapted to perform the steps of the methods as described herein. A translation database 2570 and dictionaries 2580 may be located in a storage device 2540.

Figure 26:
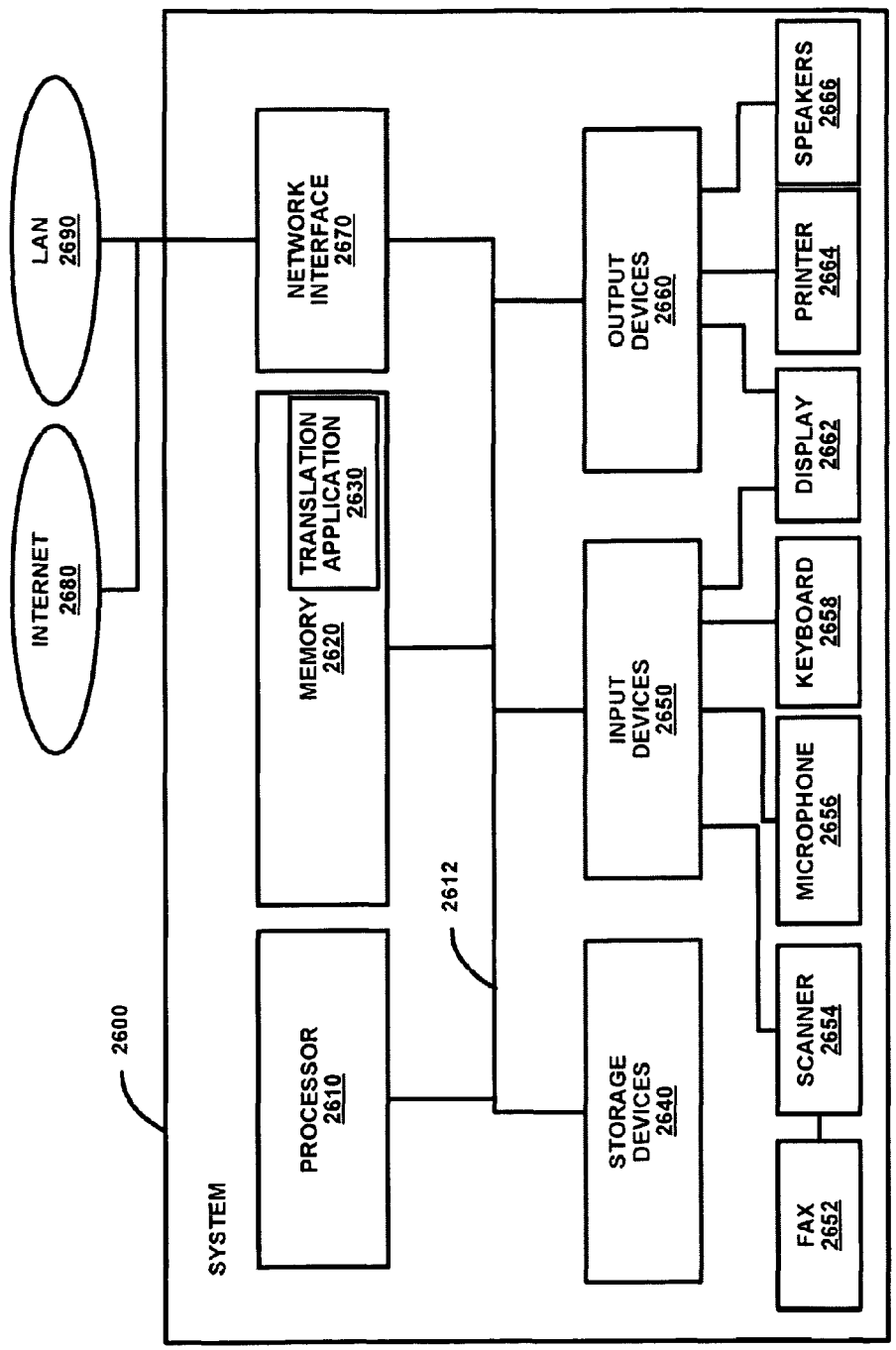
FIG. 26 illustrates another example of a computer system in accordance with one embodiment of the invention.

FIG. 26 illustrates another example of a system 2600 in accordance with one embodiment of the invention. The system 2600 may include a processing unit, such as a processor 2610, a memory 2620 and a network interface 2670. The memory 2620 may include a translation application 2630 adapted to perform translation of a source sentence into an output sentence using methods as described herein according to one or more embodiments of the invention. The translation application 2630 may be, for example, a machine translation program for translating a sentence from an input language into an output language.

The memory 2620 may also include computer storage media in the form of volatile and/or nonvolatile memory such as read only memory (ROM) and random access memory (RAM). A basic input/output system (BIOS), containing the basic routines is typically stored in ROM. RAM typically contains data and/or program modules that are immediately accessible to and/or presently being operated on by the processor 2610. These data and/or program modules are located in the memory 2620 or is loaded into memory when a program is called upon. Then the program is started and executed by the processor 2610 under the control of an operating system. For example, RAM may contain the operating system, various application programs, such as the translation application 2630, other program modules, and program data.

A translation database and dictionaries may be located in a storage devices 2640. The storage device 2640 may be represented by both volatile and nonvolatile, removable and non-removable storage media implemented in any method or technology for storage of information, such as computer readable instructions, data structures, program modules or other data. The storage device 2640 may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the system 2600. Any other removable/non-removable, volatile/nonvolatile computer storage media can be used.

A user may enter commands and information into the system 2600 through input devices 2650, such as a keyboard 2658, a microphone 2656, a scanner 2654 and a pointing device, such as a mouse, trackball or touch pad. Other input devices (not shown) may include a joystick, game pad, satellite dish, scanner, or the like.

These and other input devices are often connected to the processor 2610 through a user input interface that is coupled to the system bus 2612, but may be connected by other interface and bus structures, such as a parallel port, game port or a universal serial bus (USB). A monitor, a display 2662, or other type of display device is also connected to the system bus 2612 via an interface, such as a video interface. In addition to the display 2662, the system 2600 may also include other peripheral output devices, such as speakers 2666 and printers 2664, which may be connected through an output peripheral interface.

A source sentence to be translated by the translation application 2630 may be for example, entered from the keyboard 2658 and selected on the screen of the display 2662. As another example, a source sentence to be translated by the translation application 2630 may be received after being recognized from a graphical input (for example, being recognized as PDF, TIF, JPG, BMP, and other files) through optical character recognition (OCR) applications or after being sent by the fax 2652 and then scanned by the scanner 2654, etc. A microphone 2656 and a speech recognition system can also be used and adapted for machine translation.

The system 2600 may operate in a networked environment using logical connections to one or more remote computers. The remote computer may be a personal computer, a handheld device, a server, a router, a network PC, a peer device or other common network node, and typically includes many or all of the elements described above relative to the system 2600. The network connections depicted in FIG. 26 can include, for example, a local area network (LAN) 2690 or a wide area network (WAN), such as the Internet 2680. Such networking environments are commonplace in offices, enterprise-wide computer networks, intranets, and the Internet.

When used in a LAN networking environment, the system 2600 is connected to the LAN through a network interface 2670 or adapter. When used in a WAN networking environment, the system 2600 may additionally include a modem or other means for establishing communications over the WAN, such as the Internet. It will be appreciated that the network connections shown are exemplary and other means of establishing a communications link between the systems and computers may be used.

Figure 27:
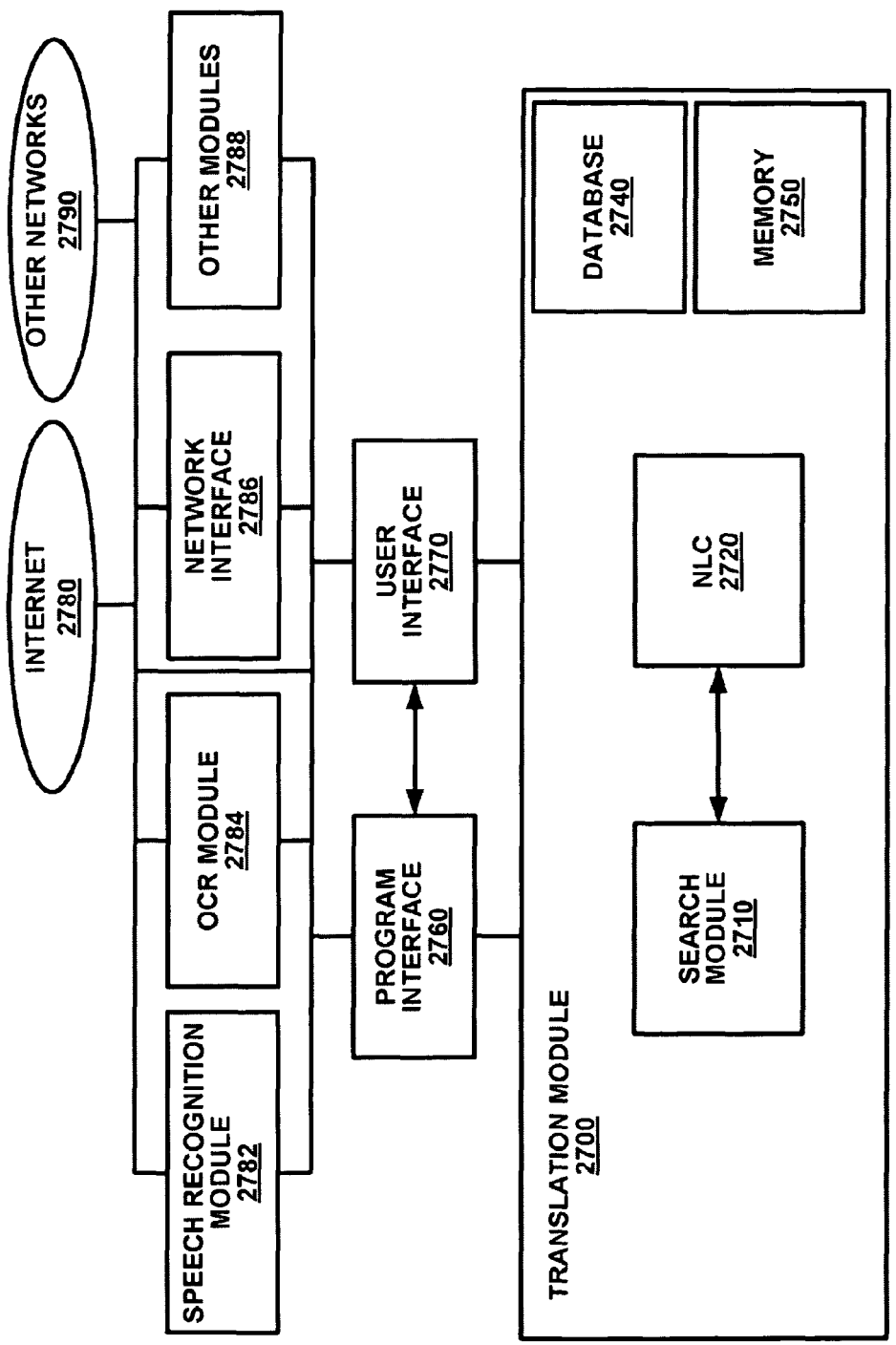
FIG. 27 is a block diagram of a translation system and its interaction with other applications in accordance with one embodiment of the invention.

FIG. 27 is an example of a translation module 2700 according to one embodiment of the invention. The translation module 2700 may include a search module 2710 and a NLC module 2720. The translation module 2700 may also interface with a program interface 2760 and a user interface 2770 to interact with other programs and a user, respectively. Additionally, the translation module 2700 may include a memory 2750 or/and a database 2740 for storing translations equivalents and various intermediate information.

The translation module 2700 may interact via the program interface 2760 with other applications. For example, the translation module 2700 may receive a source sentence from a speech recognition application 2782 after converting the source sentence into a text after speech recognition. As another example, a source sentence may be received from an optical character recognition (OCR) application 2784 after converting an image of the source sentence into a text after optical recognition of the image. The program interface 2760, the user interface 2720, and the network interface 2786, etc., are used to provide communication between the translation module 2700 and its users via a LAN or WAN, such as the Internet.

The invention is superior to the known art as it uses various linguistic descriptions of a given natural language to reflect all the real complexities of the natural language, rather than simplified or artificial descriptions, without the danger of a combinatorial explosion. A principle of integral and purpose-driven recognition, i.e. hypotheses about the structure of the part of a sentence are verified within the hypotheses about the structure of the whole sentence, is implemented as during the analysis stage as during the synthesis stage. It allow to avoid analyzing numerous parsing anomalous variants. All available information from linguistic descriptions of the output language is used.

While the foregoing is directed to embodiments of the present invention, other and further embodiments of the invention may be devised without departing from the basic scope thereof, and the scope thereof is determined by the claims that follow.

The invention claimed is:

1. A computer-implemented method of representing combinability of elements of linguistic descriptions, at least some of the linguistic descriptions are organized as hierarchies, wherein two of the elements are members of respective hierarchies, comprising:
    performing by a processor a semantic analysis of electronically-stored texts to determine combinability statistics between two or more elements of linguistic descriptions present in the texts; and
    storing one or more combinability statistics between the two elements of linguistic descriptions of the hierarchies as a sum of logarithms of combinabilities of one or more elements from the first hierarchy with one or more elements from the second hierarchy.

2. The computer-implemented method of claim 1 wherein the combinability statistics determined for higher levels of the hierarchies are used as combinability statistics for lower levels.

3. The computer-implemented method of claim 1, wherein said performing semantic analysis comprises:
    performing semantic analysis on a text in a source language; and
    performing semantic analysis on a text in a target language, which is a translation of the text in the source language.

4. The computer-implemented method of claim 3, wherein the method further comprises:
    matching one or more deep structures of sentences in the text in the source language to one or more deep structures of sentences in the text in the target language;
    determining a correspondence between two or more deep structure elements for sentences with similar deep structures; and
    identifying word combinations in the source language and in the target language that correspond to each other through corresponding deep structure elements as likely translations.

5. The method of claim 4 further comprising using the likely translations to generate one or more translation rules.

6. The method of claim 4 further comprising:
    identifying instances where translations of texts deviate from translations performed by a machine translation system so as to detect errors in language models and translation rules of the machine translation system.

7. The computer-implemented method of claim 1, wherein the elements from the second hierarchy have a same ancestor element.

8. A computer system comprising:
    a processor; and
    a storage medium coupled to the processor, the storage medium storing instructions which when executed by the processor cause the computer system to perform a method for representing combinability of elements of linguistic descriptions, where at least some of the linguistic descriptions are organized as hierarchies, wherein two of the elements are members of respective hierarchies, the instructions comprising:

performing semantic analysis of electronically-stored texts to determine combinability statistics between two or more elements of linguistic descriptions present in the texts; and storing one or more combinability statistics between the two elements of linguistic descriptions of the hierarchies as a sum of logarithms of combinabilities of one or more elements from the first hierarchy with one or more elements from the second hierarchy.

9. The computer system of claim 8 wherein the combinability statistics determined for higher levels of the hierarchies are used as combinability statistics for lower levels.

10. The computer system of claim 8, wherein said performing semantic analysis comprises further comprises:
performing semantic analysis on a text in a source language; and
performing semantic analysis on a text in a target language, which is a translation of the text in the source language.

11. The computer system of claim 10, wherein the instructions further comprise:
matching one or more deep structures of sentences in the text in the source language to one or more deep structures of sentences in the text in the target language;
determining a correspondence between two or more deep structure elements for sentences with similar deep structures; and
identifying word combinations in the source and in the target languages that correspond to each other through corresponding deep structure elements as likely translations.

12. The computer system of claim 11, wherein the instructions further comprise:
using the likely translations to generate one or more translation rules.

13. The computer system of claim 11, wherein the instructions further comprise:
identifying instances where translations of texts deviate from translations performed by a machine translation system so as to detect errors in language models and translation rules of the machine translation system.

14. The computer system of claim 8, wherein the elements from the second hierarchy have a same ancestor element.

15. A physical, non-transitory computer storage medium having stored thereon a sequence of instructions which when executed by a computer system cause said computer system to perform a method for representing combinability of elements of linguistic descriptions, at least some of the linguistic descriptions are organized as hierarchies, wherein two of the elements are members of respective hierarchies, the instructions comprising:
performing semantic analysis of electronically-stored texts to determine combinability statistics between two or more elements of linguistic descriptions present in the texts; and
storing one or more combinability statistics between the two elements of linguistic descriptions of the hierarchies as a sum of logarithms of combinabilities of one or more elements from the first hierarchy with one or more elements from the second hierarchy, wherein the elements from the second hierarchy have the same ancestor element.

16. The physical, non-transitory computer storage medium of claim 15, wherein the combinability statistics determined for higher levels of the hierarchies are used as combinability statistics for lower levels.

17. The physical, non-transitory computer storage medium of claim 15, wherein performing semantic analysis comprises:
performing semantic analysis on a text in a source language; and
performing semantic analysis on a text in a target language, which is a translation of the text in the source language.

18. The physical, non-transitory computer storage medium of claim 17, wherein the instructions further comprise:
matching one or more deep structures of sentences in the text in the source language to one or more deep structures of sentences in the text in the target language;
determining a correspondence between two or more deep structure elements for sentences with similar deep structures; and
identifying word combinations in the source and in the target languages that correspond to each other through corresponding deep structure elements as likely translations.

19. The physical, non-transitory computer storage medium of claim 18, wherein the instructions further comprise:
using the likely translations to generate one or more additional translation rules.

20. The physical, non-transitory computer storage medium of claim 18, wherein the instructions further comprise:
identifying instances where translations of texts deviate from translations performed by a machine translation system so as to detect errors in language models and translation rules of the machine translation system.

* * * * *